US008593418B2

(12) United States Patent
Blow et al.

(10) Patent No.: US 8,593,418 B2
(45) Date of Patent: Nov. 26, 2013

(54) METHOD AND SYSTEM FOR ADJUSTING DISPLAY CONTENT

(75) Inventors: Anthony T. Blow, San Diego, CA (US); Babak Forutanpour, Carlsbad, CA (US); Ted R. Gooding, San Diego, CA (US); David Bednar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 606 days.

(21) Appl. No.: 12/852,516

(22) Filed: Aug. 8, 2010

(65) Prior Publication Data

US 2012/0032979 A1    Feb. 9, 2012

(51) Int. Cl.
G06F 3/041    (2006.01)
G09G 5/00    (2006.01)

(52) U.S. Cl.
USPC .......................... 345/173; 345/156; 345/647

(58) Field of Classification Search
None
See application file for complete search history.

(56) References Cited

U.S. PATENT DOCUMENTS

| | | | |
|---|---|---|---|
| 6,441,824 B2* | 8/2002 | Hertzfeld | 345/472 |
| 7,221,357 B2* | 5/2007 | Von Essen et al. | 345/173 |
| 7,710,390 B2* | 5/2010 | Tokkonen | 345/156 |
| 7,877,707 B2* | 1/2011 | Westerman et al. | 715/863 |
| 2003/0234768 A1 | 12/2003 | Rekimoto et al. | |
| 2004/0027381 A1* | 2/2004 | Jaeger | 345/764 |
| 2004/0060000 A1* | 3/2004 | Jaeger | 715/502 |
| 2007/0097096 A1* | 5/2007 | Rosenberg | 345/173 |
| 2008/0158144 A1* | 7/2008 | Schobben et al. | 345/156 |
| 2008/0211779 A1* | 9/2008 | Pryor | 345/173 |
| 2008/0227489 A1* | 9/2008 | Huh | 455/556.1 |
| 2009/0122022 A1 | 5/2009 | Park et al. | |
| 2009/0146957 A1* | 6/2009 | Lee et al. | 345/168 |
| 2009/0184935 A1* | 7/2009 | Kim | 345/173 |
| 2009/0295753 A1 | 12/2009 | King et al. | |
| 2010/0020031 A1* | 1/2010 | Hwang et al. | 345/173 |
| 2010/0053215 A1* | 3/2010 | Coldicott et al. | 345/630 |
| 2010/0085317 A1* | 4/2010 | Park et al. | 345/173 |
| 2010/0090965 A1* | 4/2010 | Birkler | 345/173 |

(Continued)

FOREIGN PATENT DOCUMENTS

EP    1811360 A1    7/2007
EP    2077490 A2    7/2009

(Continued)

OTHER PUBLICATIONS

International Search Report and Written Opinion—PCT/US2011/046842—ISA/EPO—Dec. 23, 2011.

*Primary Examiner* — Kee M Tung
*Assistant Examiner* — Saptarshi Mazumder
(74) *Attorney, Agent, or Firm* — James T. Hagler

(57) ABSTRACT

Methods and systems are provided for detecting a grip event on a touchscreen display and adjusting the displayed content based on the location of the grip event. The content that is covered by a grip event is identified and moved out from under the grip event by adjusting the displayed content layout. The area of the grip event may be determined to allow for adjusting the layout of the displayed. Alerts may be implemented to alert a user when there is a change in a content that is covered by a grip event. The grip event outline may be estimated and menu icons or icons may be positioned and displayed in close contour profile to estimated outline of the grip event. A grip event location may be suggested based on a user's touch habits or display content layout.

92 Claims, 38 Drawing Sheets

(56) References Cited

U.S. PATENT DOCUMENTS

| | | | |
|---|---|---|---|
| 2010/0103098 A1* | 4/2010 | Gear et al. | 345/158 |
| 2010/0115455 A1* | 5/2010 | Kim | 715/781 |
| 2010/0134423 A1* | 6/2010 | Brisebois et al. | 345/173 |
| 2010/0192109 A1* | 7/2010 | Westerman et al. | 715/863 |
| 2010/0211920 A1* | 8/2010 | Westerman et al. | 715/863 |
| 2010/0229129 A1* | 9/2010 | Price et al. | 715/863 |
| 2010/0238138 A1* | 9/2010 | Goertz et al. | 345/175 |
| 2010/0238139 A1* | 9/2010 | Goertz et al. | 345/175 |
| 2010/0253620 A1* | 10/2010 | Singhal | 345/157 |
| 2010/0273533 A1* | 10/2010 | Cho | 455/566 |
| 2010/0321316 A1* | 12/2010 | Homma et al. | 345/173 |
| 2011/0018827 A1* | 1/2011 | Wang et al. | 345/173 |
| 2011/0169749 A1* | 7/2011 | Ganey et al. | 345/173 |
| 2011/0202835 A1* | 8/2011 | Jakobsson et al. | 715/702 |
| 2012/0032891 A1* | 2/2012 | Parivar | 345/173 |
| 2012/0229406 A1* | 9/2012 | Wu | 345/173 |

FOREIGN PATENT DOCUMENTS

| | | | |
|---|---|---|---|
| GB | 2468891 A | * | 9/2010 |
| JP | 11327788 A | | 11/1999 |
| JP | 2008217704 A | * | 9/2008 |
| WO | 2006020305 A2 | | 2/2006 |

* cited by examiner

METHOD AND SYSTEM FOR ADJUSTING DISPLAY CONTENT

FIELD OF THE INVENTION

The present invention relates generally to mobile computing devices, and more particularly to computing devices configured to adjust displayed content to reveal content concealed by a user's hand.

BACKGROUND

The demand for computing devices that are powerful yet portable, compact yet fully featured, is ever increasing. This trend is particularly evident in the evolution of mobile electronic devices (mobile devices), such as cellular telephones, that now function as telephones, video and audio capture devices, video and audio players, web access terminals, and multipurpose computers.

As mobile devices grow in sophistication, the variety and sophistication of application software is increasing, thereby turning mobile devices into multipurpose productivity tools. Yet, the usefulness of mobile devices and their applications are limited by the small area available for the user-interface. To provide additional user-interface area, mobile device display screens are becoming larger and larger portions of the surface area of devices. As the area of mobile device display screens occupies more space on the mobile device, there is less area in the bezel surrounding the display that users can use to grip the mobile device without covering a portion of the display screen.

SUMMARY

Various embodiment devices and methods accommodate a user's grip of a touchscreen display surface by adjusting the displayed content based on grip event parameters. In an embodiment, a mobile device may adjust the displayed image to move displayed content that may be covered by a user's fingers so that it remains visible. In response to detecting a grip event on the touchscreen display, the mobile device may determine the area concealed by a user's hand based on the nature of a grip event and the displayed content within the concealed area. The mobile device may then adjust the layout of the display so that the concealed content is presented in an uncovered portion of the display.

In a further embodiment, a mobile device may position menu icons close to a finger resting on a touchscreen display. The mobile device may estimate the outline of a user's finger or thumb based upon characteristics of the grip event and position menu icons in close proximity to the estimated outline of the finger.

In a further embodiment, a mobile device may alert users about changes in displayed contents obstructed by the user's finger(s). In response to detecting a grip event on the touchscreen display, the mobile device may determine the area concealed by a user's hand based on the nature of a grip event and the displayed content within the concealed area. The mobile device may determine when displayed content within the concealed area changes, and generate visual and/or auditory alerts to inform the user when the concealed portion of the display changes.

In a further embodiment, user-specific grip event and hand/finger position parameters (e.g., size and shape) may be stored a database maintained by the mobile device to enable determination of concealed areas based on detected grip event parameters and that user's identity.

In a further embodiment, a mobile device may adjust or relocate displayed menu icons based on a grip event location. In this embodiment, if the grip event is located on a side of a touchscreen display, the mobile device may relocate displayed menu icons to the same or opposite side of the display as the location of the grip event.

In a further embodiment, a mobile device may relocate displayed menu icons as the location of the touch moves across the touchscreen surface. In this embodiment, as the touch event location reaches a predetermined distance from displayed icons, the mobile device may position the menu icons close to the touch event and move the displayed icons along with the location of the touch event as it moves across the touchscreen surface.

In a further embodiment, a mobile device may display a prompt indicating a usual or preferred grip location. In this embodiment, the mobile device may monitor a user's grip events and determine a location where the user usually grips the touchscreen display. Upon a user log-in, the mobile device may display a contour indicating the user's usual grip location.

In a further embodiment, a mobile device may determine from the layout of the displayed content a grip location that would result in a minimum adjustment to the presentation display, and display a contour to prompt the user to grip the device at the determined location.

In a further embodiment, a mobile device may determine from the layout of the displayed content and the grip location that there are multiple adjusted display options. A computed least disruptive option may be displayed briefly, followed by one or more alternate display configuration displays. Shifting a finger in a rolling motion, e.g., towards the direction of a desired option may allow the user to select a preferred adjusted display configuration. With no user intervention, the first option computed as least disruptive may be selected by default.

BRIEF DESCRIPTION OF THE DRAWINGS

The accompanying drawings, which are incorporated herein and constitute part of this specification, illustrate exemplary aspects of the invention, and, together with the general description given above and the detailed description given below, serve to explain features of the invention.

FIG. 30 is a process flow diagram of an embodiment method for retrieving stored grip event parameters for a user based on a user log-in.

DETAILED DESCRIPTION

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

As used herein, the term "mobile device" is used interchangeably and refer to any one of various cellular telephones, personal mobile television receivers, tablet computers, personal data assistants (PDA's), palm-top computers, laptop computers, wireless electronic mail receivers (e.g., the Blackberry® and Treo® devices), and Internet enabled cellular telephones (e.g., the Blackberry Storm®), and similar personal electronic devices equipped with a touchscreen display. A mobile device may include a programmable processor and memory as described more fully below with reference to FIG. 38.

As used herein, the terms "touchscreen" and touchscreen display refer to computing device displays which can sense the location of a finger or touch to the display surface. Touchscreen displays are well known and used as a display in several current mobile devices. Touchscreen displays detect or sense a touch (or press) by a user finger (or an implement) and interpret that touch as an input to the mobile device. The sensing of a touch and the input data provided by the touchscreen to a processor of the mobile is referred to herein as a "touch event." A protracted touch event, consistent with a user gripping the mobile device on a portion of the touchscreen, is referred to herein as a "grip event." Touch event and grip event data provided by a touchscreen to a device processor may include the location, area, and shape of the touchscreen surface touched a user's finger tip. Sensing the touch location and/or shape of a fingertip on a touchscreen surface can be accomplished using any of a variety of known technologies. For example, touchscreen displays may include pressure sensing surfaces, capacitance-sensing surfaces, and induction-sensing surfaces, all of which directly detect a user's touch. Another example touch sensor may use sound or vibration measurements to detect and determine the location of a user touch, such as an ultrasound sensor that can detect a touch based upon the effect of ultrasound traveling through the cover glass, or sound or vibration sensors that can determine the location of a touch based upon triangulation of received vibration or sound from the touch on the cover glass.

Figure 2:
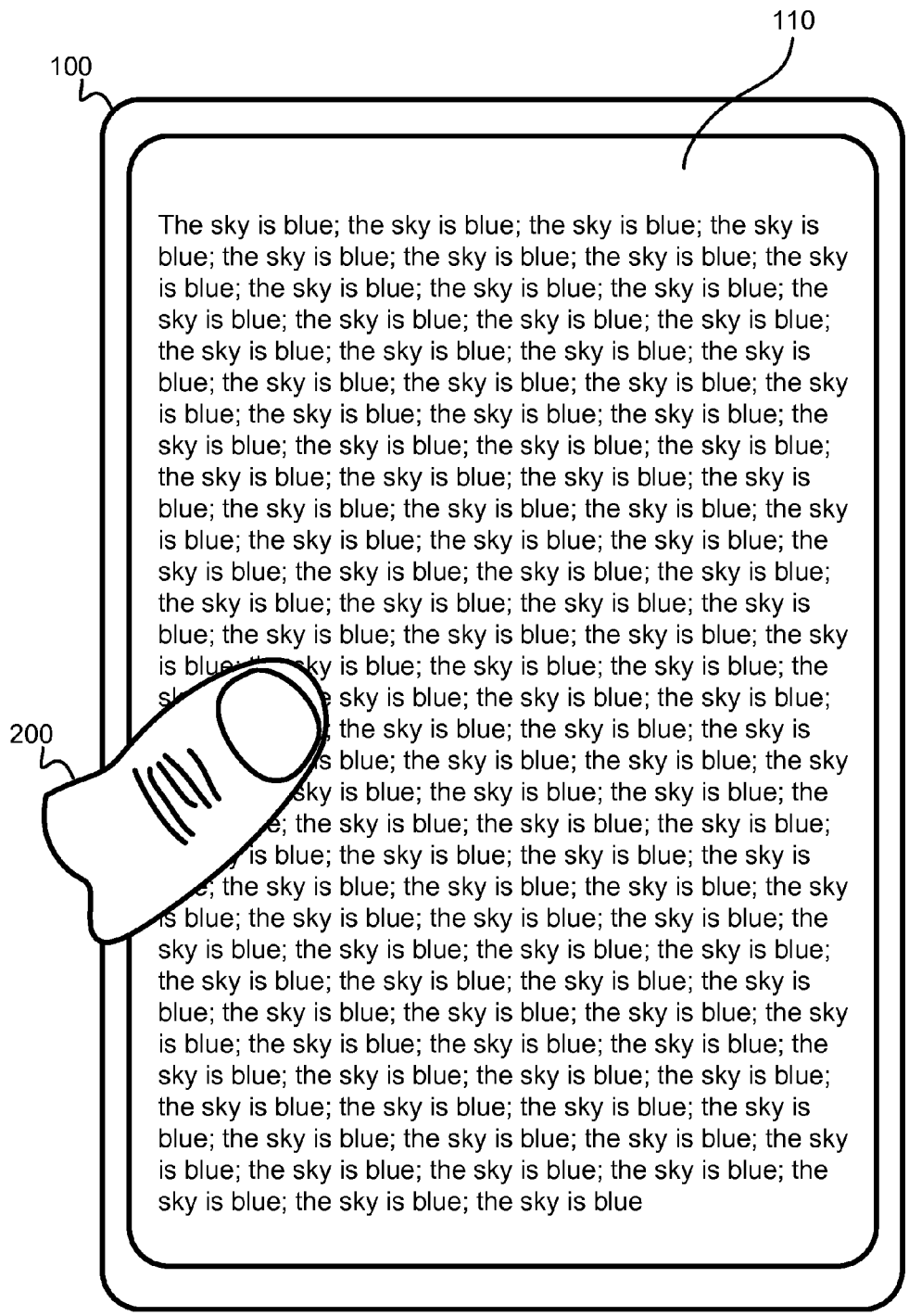
FIG. 2 is a frontal view of a mobile device with a user's thumb gripping the display.

With the advent of mobile devices capable of displaying multimedia content, such as videos, games and television programs, consumers have pushed for mobile devices with larger displays. The use of touchscreen displays has enabled manufacturers to increase the size of the displays on mobile devices by eliminating keypads and buttons, relying instead on virtual keys presented on the touchscreen display. Without the need for keypads, the size of mobile devices can be minimized while providing a large display by reducing the portion of the device case that surrounds the display, which is referred to herein as the "bezel." This trend of ever thinner bezels on mobile devices is expected to continue until the front surface of mobile devices is taken up almost entirely by the touchscreen display. As a result, it is expected that mobile devices will soon require users to grip a portion of the touchscreen display when holding the mobile device in one hand. Thus, in mobile devices with a very thin bezel, a user's finger may cover a portion of the touchscreen area when the user grips the mobile device in one hand. As a result, the user will be unable to view the portion of the display covered and concealed by the user's hand. This problem is illustrated in FIG. 2 which shows a mobile device 100 being gripped by a user's thumb 200 covering a portion of the touchscreen display 110.

The various embodiments include methods and mobile devices that can accommodate a user's grip (or other extended duration touches) on a touchscreen display by adjusting the positioning and orientation of displayed content and/or menu icons based on grip event location, size, shape and orientation. By measuring the location, shape, size and orientation of a grip event (i.e., the surface area of the touchscreen display engaged by a user's finger or thumb) the mobile device processor may estimate the area of the display that is concealed or blocked from the user's vision by the user's hand, including both on-glass and off-glass portions of the user's hand that lie between the display and the user's eyes. In various embodiments, the processor may adjust the display presentation so that displayed content and/or icons concealed by the user's hand are repositioned to an unblocked portion of the touchscreen display. Adjustments to the display presentation may be accomplished in a variety of ways according to alternative embodiments. Adjustments to the display presentation may also take into account the position and total area concealed by the user's hand in order to reveal the concealed content in a user friendly manner. To facilitate activation by a user, menu icons may be repositioned close to or distant from a user's finger or thumb gripping the touchscreen display. User preferences, finger sizes and grip orientations may be stored in user setting files so that adjustments to the display presentation accommodate a particular user's fingers, grip and preferences. Mobile devices may also present training routines to enable users to adjust the manner in which display content is repositioned, such as to reflect the size of a user's fingers or orientation of a user's grip. In a further embodiment, mobile devices may temporarily indicate a typical grip location for a logged-in user to help users grip the mobile device in a manner that is consistent with a trained configuration. In a further embodiment, mobile devices may analyze the layout of the display content and temporarily display an outline of a grip location that will cover the least amount of content or minimize distortion of the displayed content. In a further embodiment, mobile devices may determine the portions of the touchscreen display covered by a user's fingers and hand, assess the amount of the concealed displayed content and the remaining available non-concealed display area and display resolution, and determine a suitable adjustment to the display presentation that provides a minimum font size (e.g., 6 point) or implements no more than a maximum amount of distortion of the displayed images. In a further embodiment, the display presentation may return to normal (i.e., non-distorted) after the user's finger or thumb is removed from the touchscreen display for a threshold duration. In a further embodiment, the user may lock the display so that the display presentation does not change when the user removes or adjusts his/her grip (either to distort or change the distortion of the display presentation), and return the display presentation to normal in response to a defined user input gesture (e.g., a double tap). In a further embodiment, mobile devices may not move the presentation of some content or icons covered by a user's grip, and instead indicate when concealed content has changed. In a further embodiment, mobile devices may sense a user's hands on a side or back surface of the device and determine a recommended grip location based on the sensed location of the user's hand. In a further embodiment, mobile devices may briefly display alternative adjustments to the presentation display in response to a grip event and accept a user selection of a preferred one of the alternative adjustments.

The various embodiments may be implemented anytime a user touches the touchscreen. However, the movement of displayed content in response to every manipulation of the touchscreen may be annoying to users. Therefore, the embodiments may be configured to adjust the presentation display only in response to an extended duration grip event. In this manner, the embodiments may be applied when a user is gripping a portion of the touchscreen display. Mobile devices may recognize when a finger is gripping the touchscreen based upon the duration of the touch event (e.g., when the touch event exceeds a threshold duration with little or no movement). Thus, the duration of a touch event may be used to distinguish a grip event from a normal touch gesture performed on a touchscreen. This approach also enables the embodiments to adjust the presentation display when a user is merely resting one or more fingers on the display.

Figure 1:
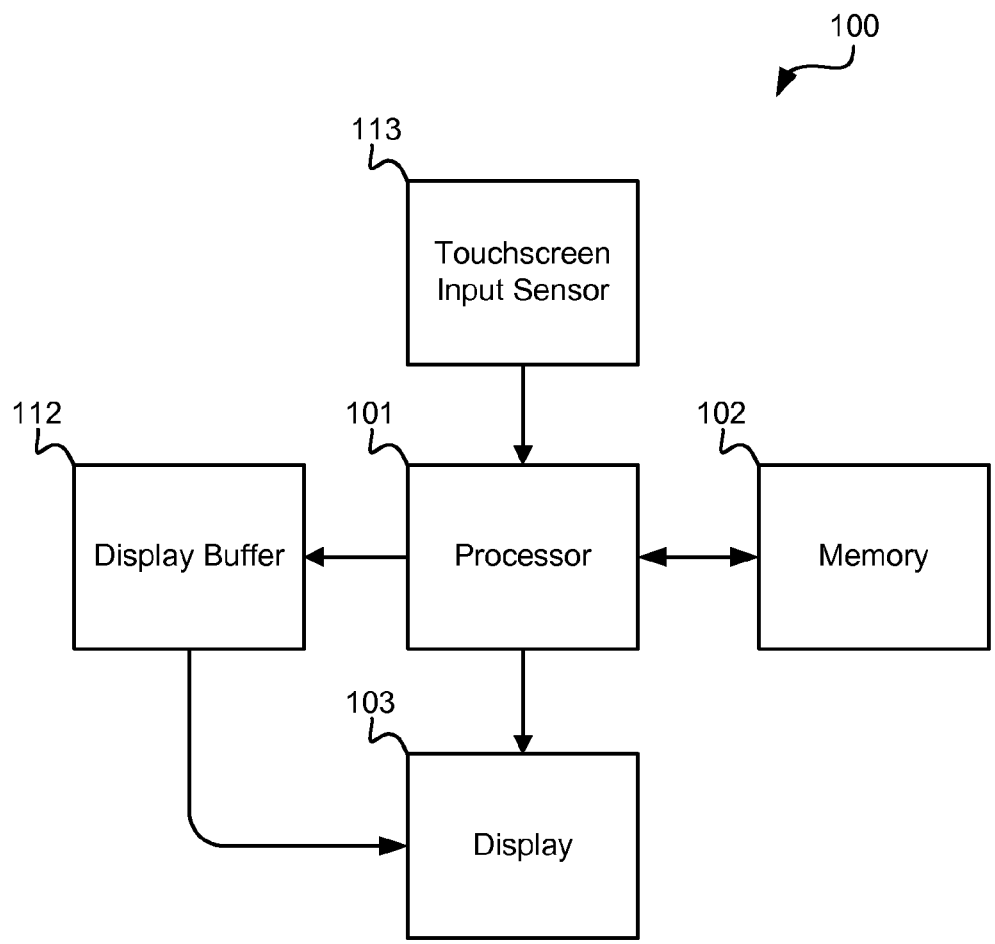
FIG. 1 is a hardware/software architecture diagram of a prior art mobile device.

A hardware/software architecture of a mobile device 100 suitable for use with the embodiments is illustrated in FIG. 1. A mobile device will typically include a processor 101 that is coupled to memory 102, and a touchscreen display 103 that includes an input sensor 113. The processor 101 generates images for presentation on the display 103 which are stored in a display buffer 112. The contents of the display buffer 112 are then presented on the display 103 in response to display control commands from the processor 101. User touches to the touchscreen will be sensed by the touchscreen input sensor 113 which provides a touch event signal to the processor 101. In the various embodiments, the processor 101 receives location, size and orientation information regarding the nature of the user's grip on the touchscreen display in the form of touch events from the touchscreen input sensor 113, which the device processor may recognize as a grip event when the touch event exceeds a threshold duration. Using preferences and settings stored in memory 102 in conjunction with the location, size and orientation of the grip event (i.e., the portion of the user's digit "on glass"), the processor 101 determines how the display images should be adjusted to accommodate the portions of the display concealed by the user's grip. The adjustments to the presentation display are provided to the display buffer 112 resulting in the changes appearing on the display 103.

Figure 3:
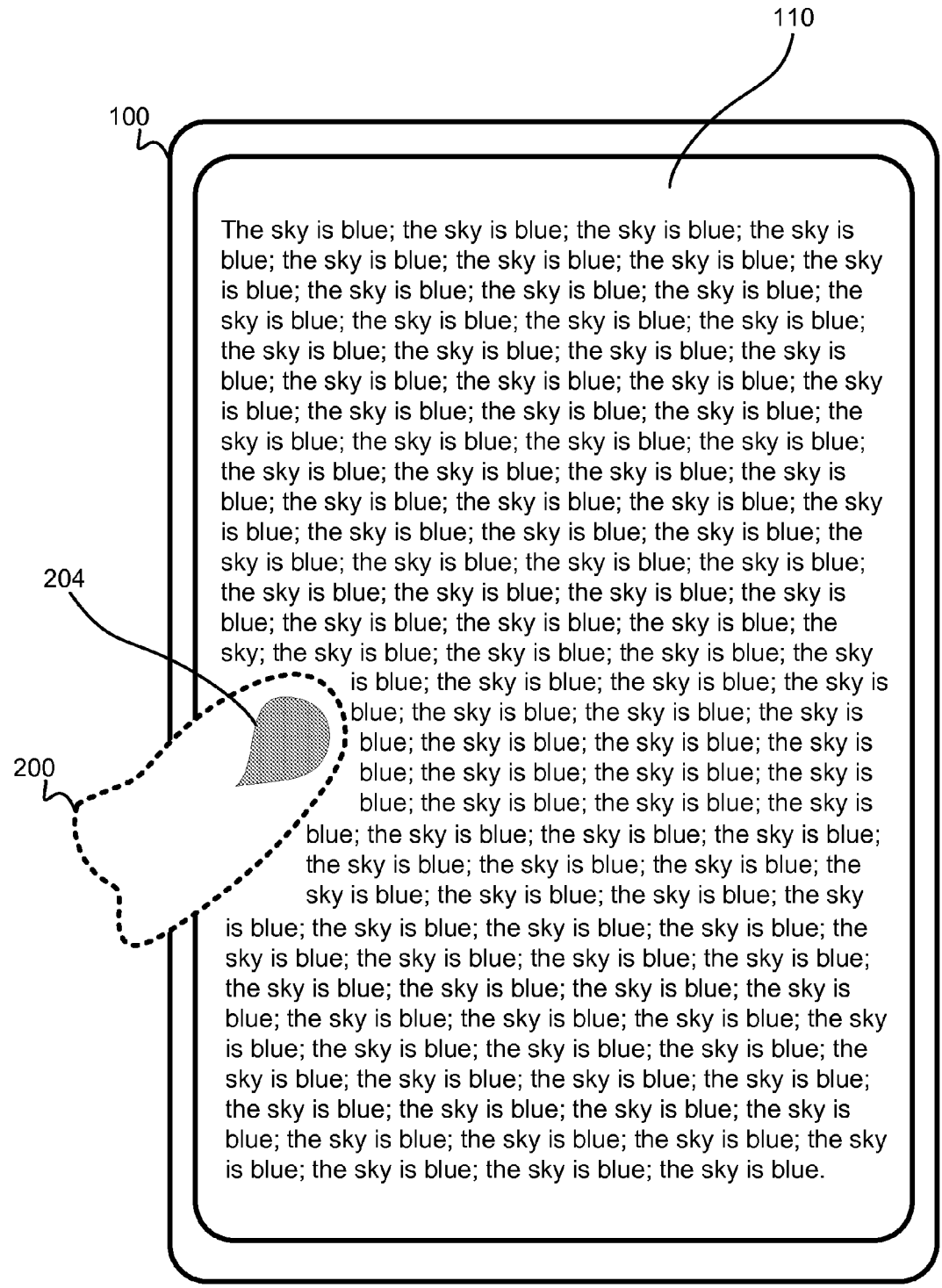
FIG. 3 is a frontal view of a mobile device illustrating an embodiment that adjusts the displayed contents based on the area touched by the user.
Figure 4:
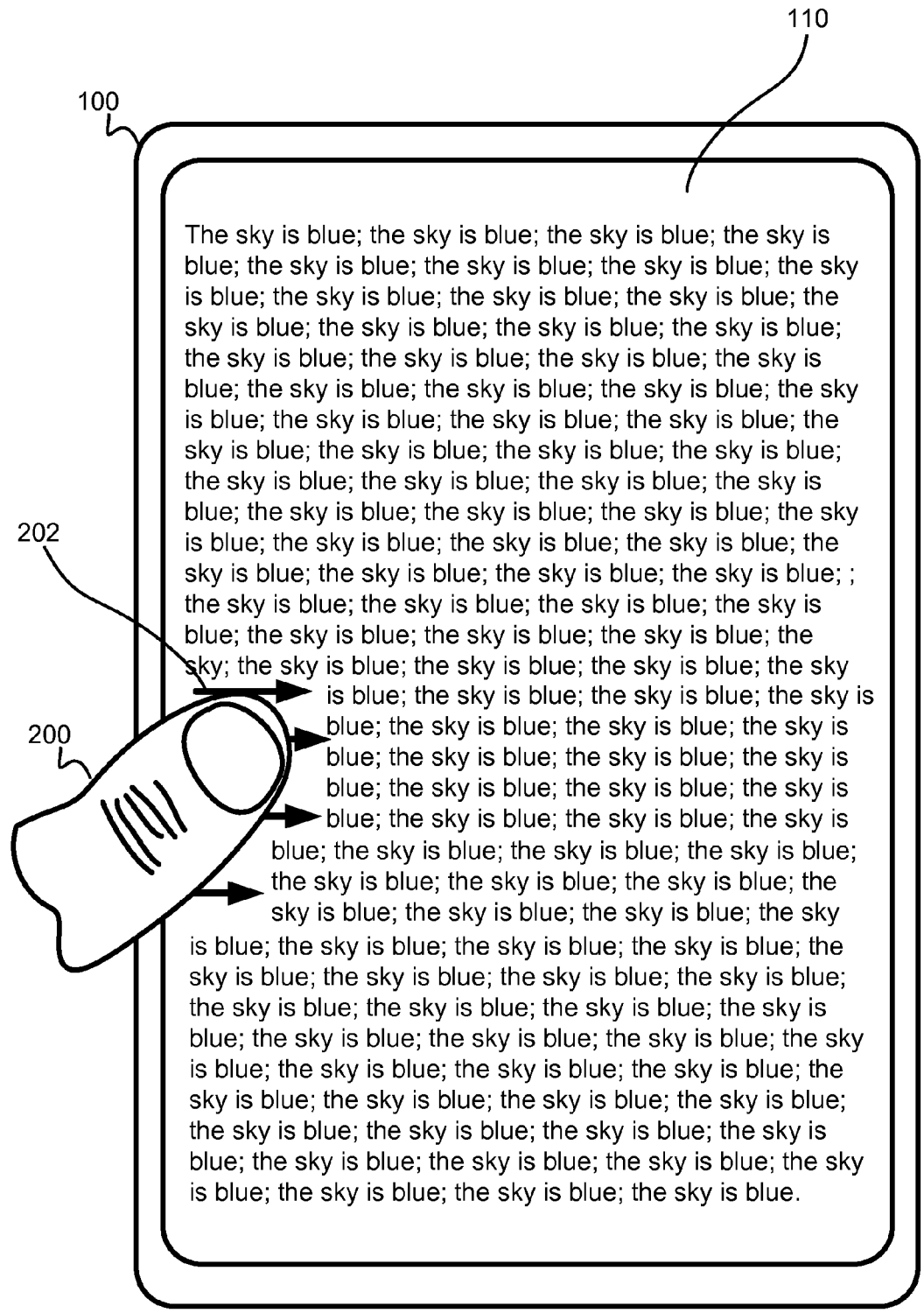
FIG. 4 is a frontal view of a mobile device illustrating a teardrop shape of the grip event associated with the user's thumb gripping the display.

Operation of an embodiment is illustrated in the sequence of FIGS. 2-4. As illustrated in FIG. 2, a user may grip the mobile device 100 with a finger or thumb 200 on the touchscreen display 110. As a consequence, a part of the display content becomes concealed by the user's thumb 200, including both the portion of the thumb touching the display ("on-glass") and the off-glass portion of the thumb positioned over the display. As illustrated in FIG. 3, when a user grips a touchscreen display, only a portion of the user's thumb 200 actually contacts the surface, illustrated by the teardrop shaped shaded region 204.

A touch event resulting from the user gripping the mobile device 100 in the manner illustrated in FIG. 3 may include information defining the location, area and orientation of the touched portion 204. Such information may be in the form of screen coordinates or display pixels that are being touched (i.e., are within the touched area 204). Based upon this touch event information, a processor of the mobile device 100 may determine the location, size, shape and orientation of the touched portion of the screen 204, which can provide information regarding which finger is touching the screen and the orientation of the user's finger. For example, the touched portion 204 (which is generally referred to herein as the grip event area) may be larger when it is a thumb 200 that is touching the screen than when it is a finger. In a gripping situation (as contrasted to a fingertip touching event), the touched portion of the screen 204 will typically be asymmetrical, such as oblong or tear shaped. The long axis of such an asymmetrical shape may provide information regarding the orientation of the user's thumb or fingers with respect to the display. In the example shown in FIG. 3, the tail of the teardrop shape 204 points to the left side of the touchscreen display 110 and along the axis of the thumb 200. Thus, by analyzing the size, shape and configuration of the grip event area, the processor can estimate the likely contours of the user's finger or thumb 200, and thus estimate the portion of the display concealed by the user's hand, as shown in the dashed line in FIG. 3.

As mentioned above, a touch event may be recognized as a grip event (i.e., the user's hand is going to remain in the same position for an extended portion of time warranting adjustment of the display presentation) based upon the duration of the event. Thus, adjustment of the presentation display may occur after a delay of 2 to 3 seconds. A grip event may also be identified by the user executing a command or input gesture commanding the device to recognize a touch event as a grip event, or to reconfigure the presentation display based upon the user's current grip.

In an embodiment, the adjustment of the concealed content may depend on the location of the touch event as well as the recognized thumb or finger. For example, if the teardrop 204 shape orientation points to the left of the touchscreen display, the mobile device 100 may determine that the touch event is made with a finger of the left hand, and therefore the content covered by the finger 200 may be adjusted to the right. In the case of a left handed grip event appearing on the left hand side of the display, the mobile device may determine that only a small amount of the display is concealed by the user's hand, so the concealed content can be easily revealed by adjusting the text to the right as illustrated in FIG. 4. In contrast, if the teardrop shape 204 orientation points to the right of the touchscreen display, the mobile device 100 may determine that the touch event was made with a finger of the right hand. In the case of a right handed grip touch event appearing on the left hand side of the display, the mobile device may determine that too much of the display is concealed by the user's hand reaching across the display to adjust the text to the left, and so may adjust text (or other image elements) up and/or down to reveal the concealed content.

Once the mobile device processor has determined the portion of the display that is concealed by the user's finger or thumb 200, the processor can adjust the display presentation, such as to move concealed content to an unobstructed portion of the display as illustrated in FIG. 4. In the example illustrated in FIG. 4, the mobile device 100 processor has shifted the content in the direction indicated by the arrows 202 so that the concealed content is moved to it an unobstructed portion of the display. In an embodiment suitable for free-flowing text blocks, such movement may be accomplished by adjusting the margin in the vicinity of the grip event so the text flows around the concealed area. In a free-flowing text field, text at the bottom or top of the display may scroll beyond the viewed portion. In another embodiment, such shifting of the concealed text may be accomplished by reducing the font size or character spacing for some or all of the display content so that such movement of text can be accomplished without obscuring other portions of the displayed content. The amount of changes to font size and characteristics may depend upon the size of the concealed area, as well as the display size and resolution. For example, if the finger 200 covers a large area of text, the mobile device 100 may have to reduce the font size of all text shown in the display 110 in order to reveal the concealed portion of the content without causing some of the text to scroll beyond the margins of the display. By reducing the font size of the entire text, the mobile device 100 may fit the entire content on the display screen. In an embodiment, the computing device 100 may be configured to avoid reducing the font size below a predefined minimum (which may be a user defined preference) to ensure the display remains readable. Other mechanisms for adjusting the presentation display to reveal otherwise concealed content are described below. When the user removes his/her finger or thumb 200 from the touchscreen display, thereby uncovering the concealed portion of the display, the presentation display may return to normal.

Figure 5:
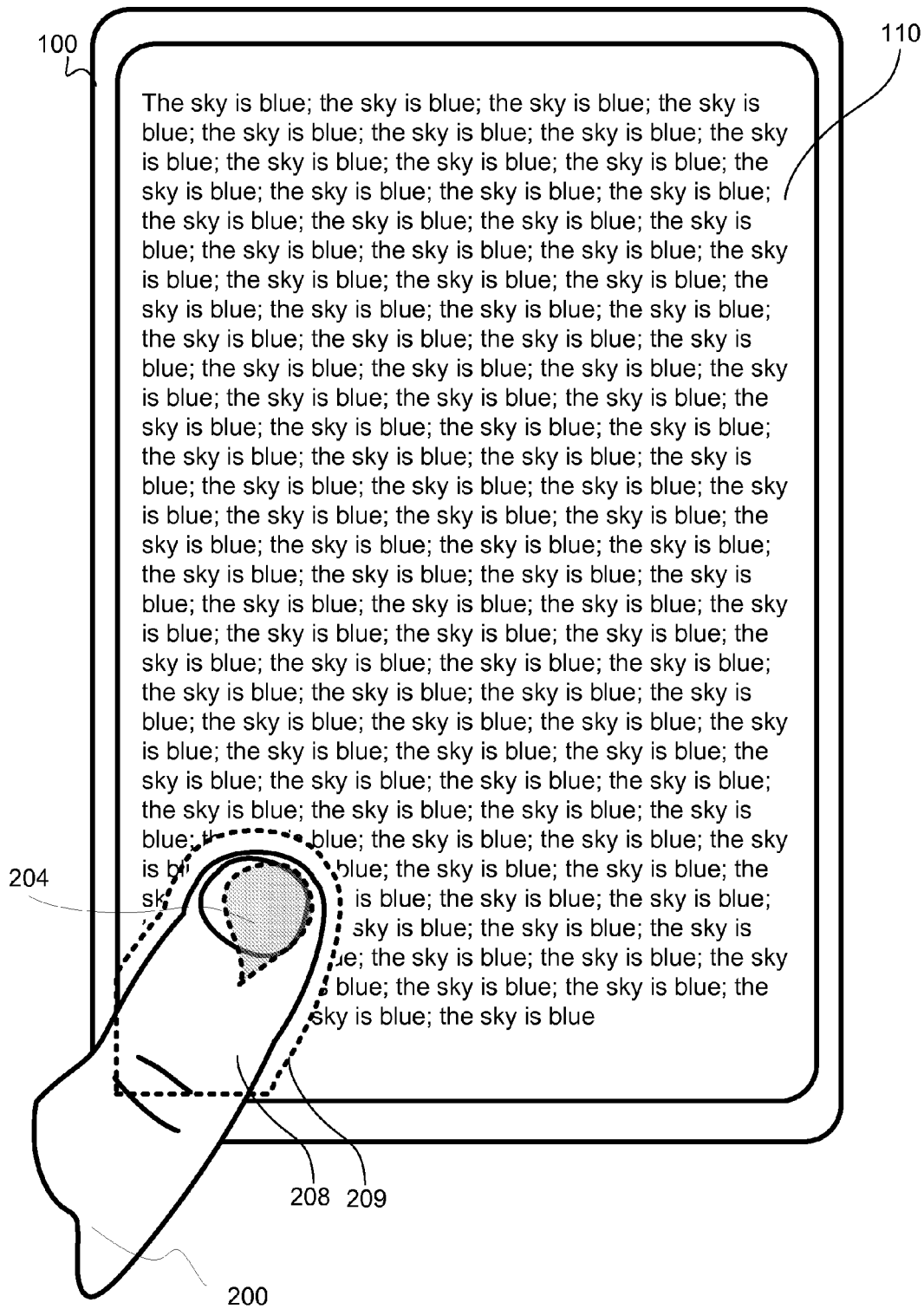
FIGS. 5-7 are frontal views of a mobile device illustrating how a concealed portion of the display may be estimated based upon the location, shape and orientation of a grip event area.
Figure 6:
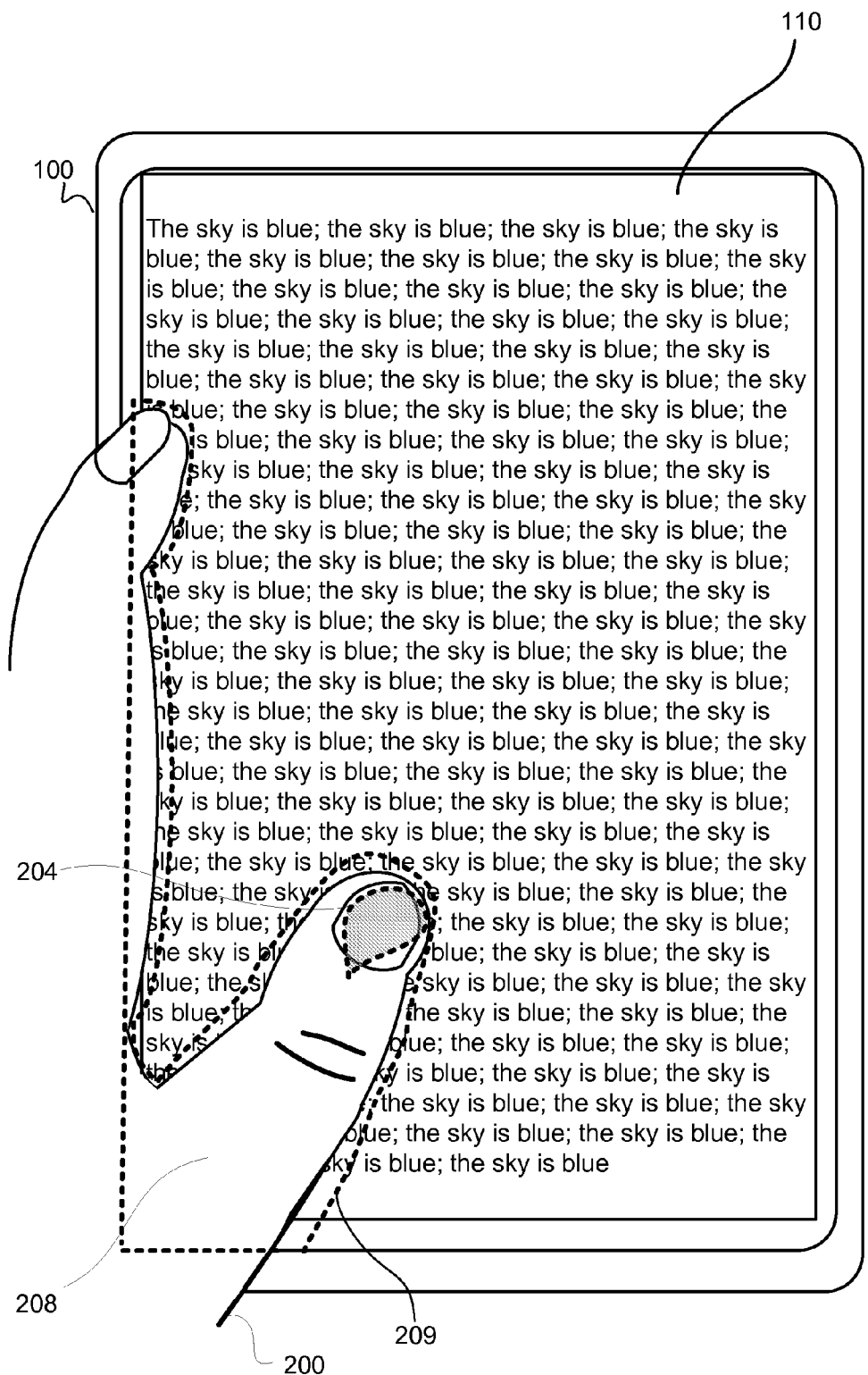
Figure 7:
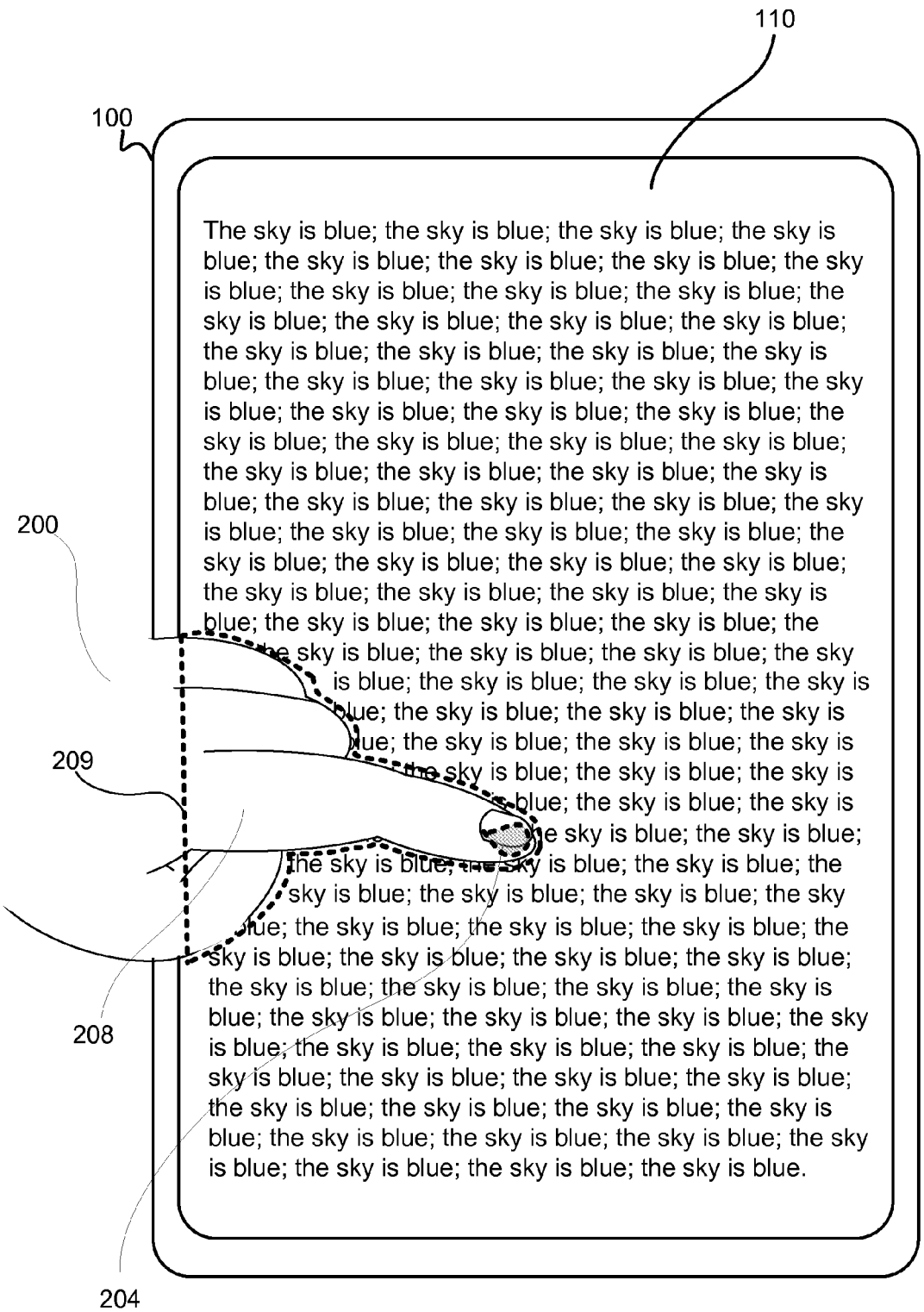

In estimating the area concealed by a user's hand based on the characteristics of a touch event, the mobile device may account for the user's palm and other fingers. FIGS. 5-7 illustrate examples of how the estimated concealed area 208 may depend on the location, size and the orientation of the touch event in order to account for the rest of the user's hand. In the example illustrated in FIG. 5, a mobile device 100 may determine from a touch event featuring a tear drop shaped touched area 204 in the lower left corner with an orientation towards the left and bottom portions of the display that the concealed area 208, which is shown by the dashed line 209, is relatively small and limited to a single finger. In the example illustrated in FIG. 6, a mobile device 100 may determine from a touch event closer to the center of the display 110 with a tear drop shaped touched area 204 indicating that the touch event results from a finger of the left hand oriented from lower left toward upper right, that the concealed area 208, which is shown by the dashed line 209, is larger and encompasses fingers and a portion of the palm. In the example illustrated in FIG. 7, a mobile device 100 may determine from a touch event closer to the center of the display 110 with a tear drop shaped touched area 204 indicating that the touch event results from a finger of the left hand oriented approximately horizontally, that the concealed area 208, which is shown by the dashed line 209, is larger and encompasses fingers and a portion of the hand in an orientation different from that determined in FIG. 6.

The examples in FIGS. 5-7 illustrate how the orientation of the long axis of the grip event shape can be used in combination with the position of the touch event to determine the orientation of the user's hand. With some knowledge about the user (e.g., from user training as described below) and/or models of typical human hand dimensions, the mobile device can be configured to calculate an estimate of the concealed area 208, including other fingers and the palm, even though most of the user's hand is not in contact with the touchscreen surface. Having determined the conceal area, the mobile device can determine how to reconfigure the displayed image in order to reveal the concealed content.

As discussed above with reference to FIGS. 2-4, the mobile device may adjust the presentation display of text by shifting the margin and scrolling the text on the display, or by adjusting font size or character spacing and shifting the display around the concealed area. These methods work well for text blocks as illustrated in FIG. 2. These methods also work well for grip events along an edge of the display, since the amount of concealed content can easily be shifted to the left or right. However, other methods for adjusting the presentation display may be implemented that may be better suited to accommodating larger concealed areas.

Figure 8:
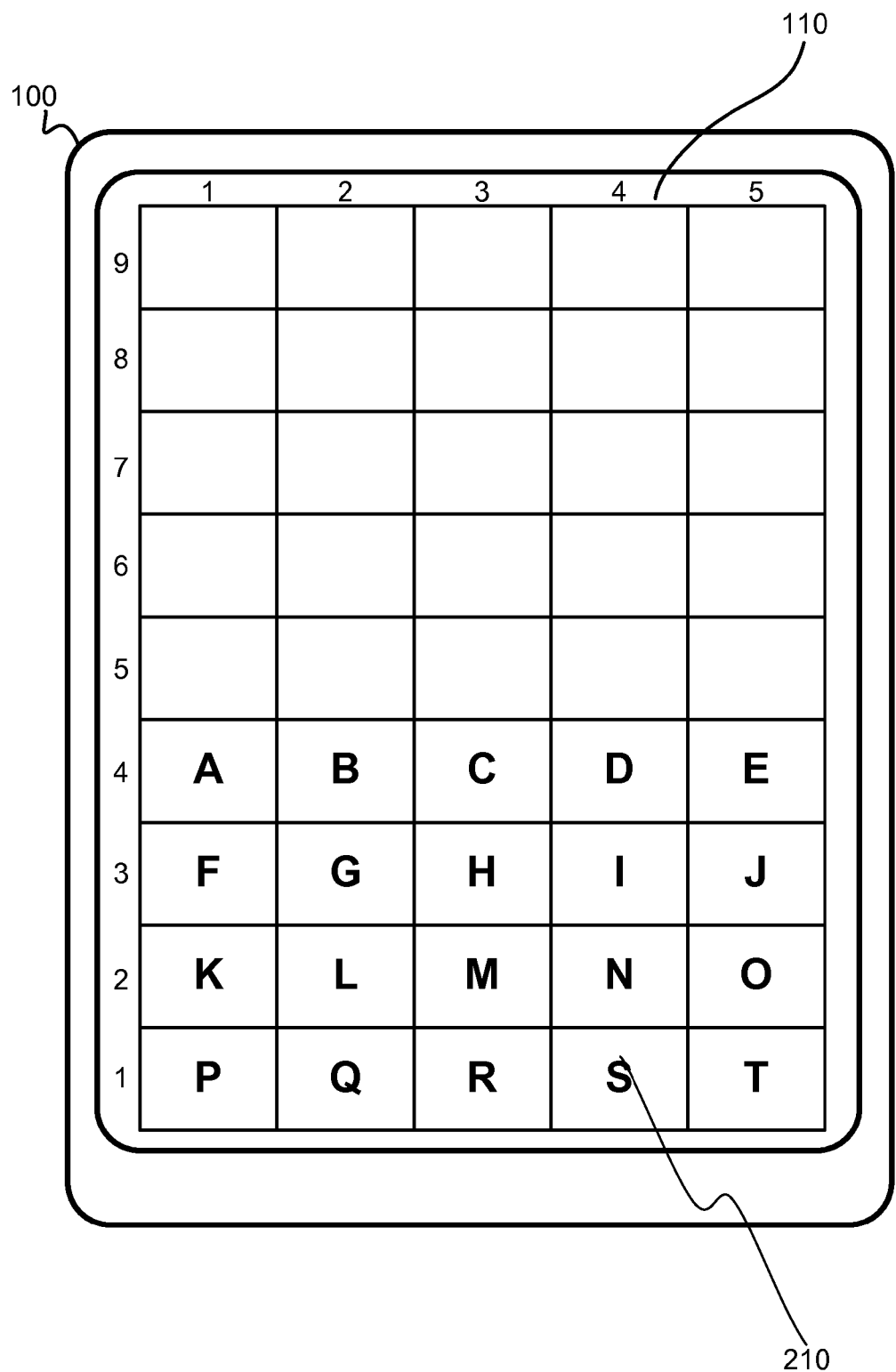
FIGS. 8 and 9 are illustrations of a display of a mobile device in which displayed content is divided into tiles according to an embodiment.
Figure 9:
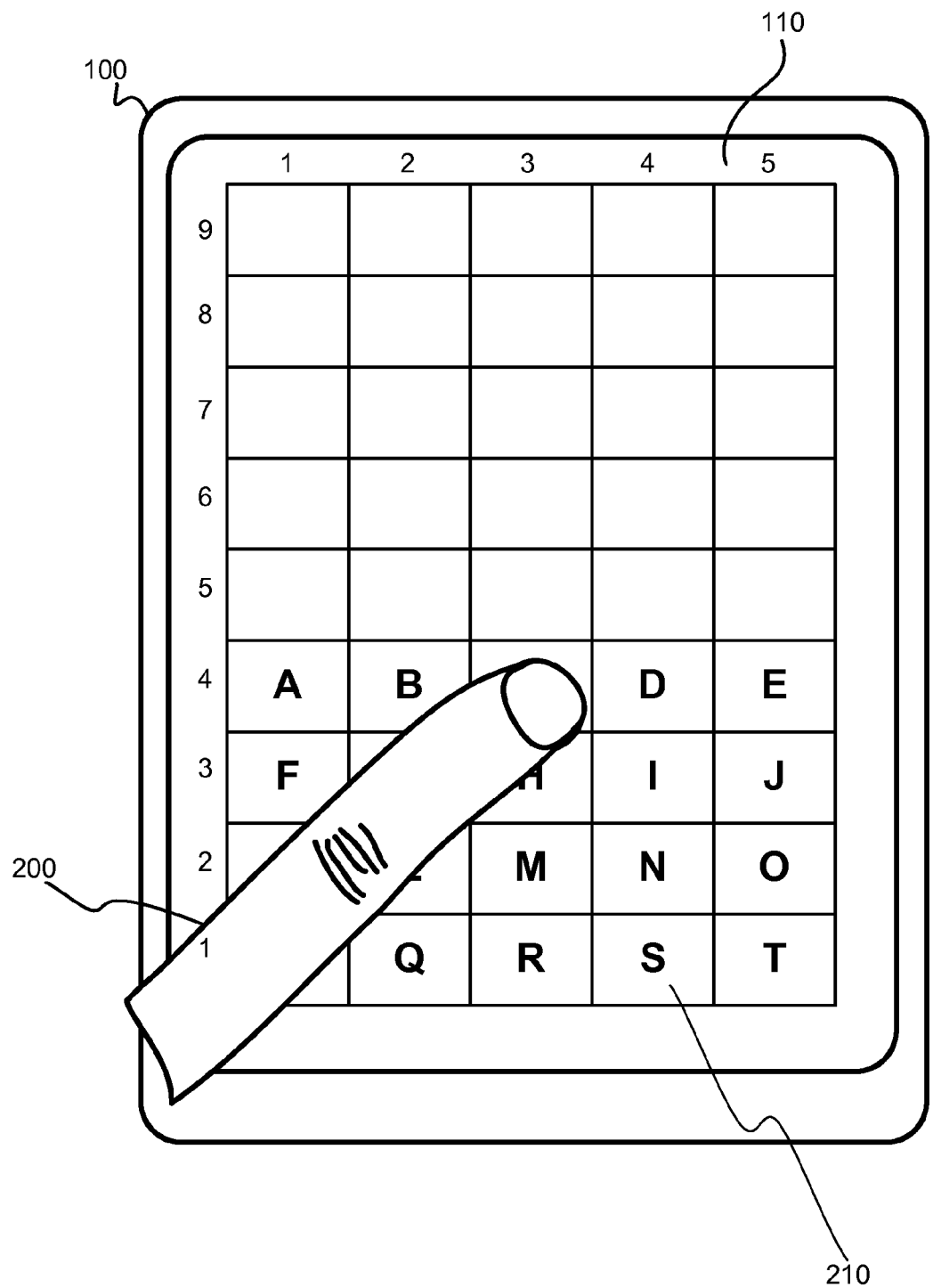
Figure 10:
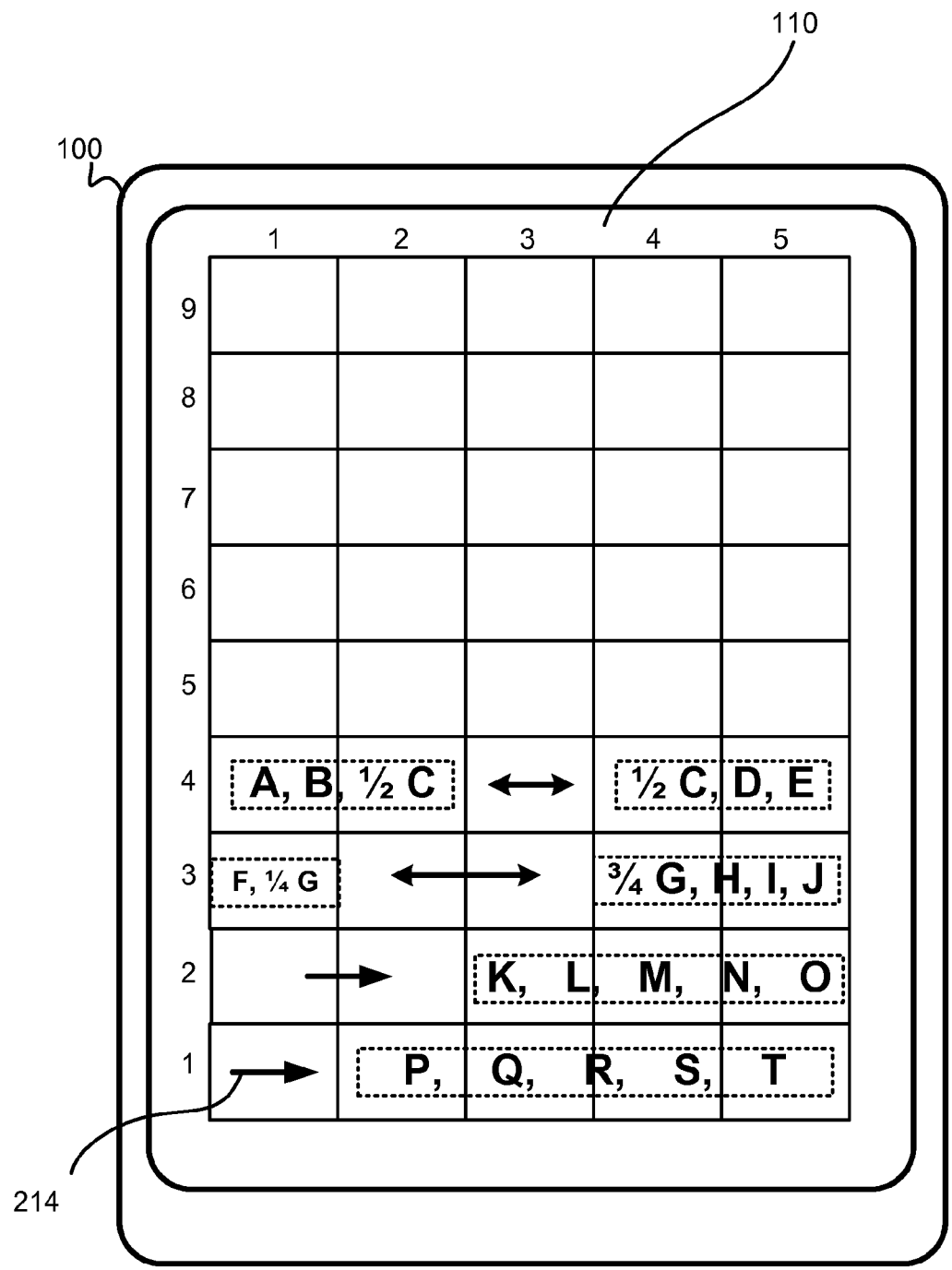
FIG. 10 is an illustration of a display of a mobile device showing how displayed content may be adjusted in response to a grip event according to an embodiment.

An embodiment method for adjusting the presentation display to reveal concealed content is illustrated in FIGS. 8-10. To reposition a wide variety of content types (e.g., text, images, formatted text, graphics, etc.) the mobile device may be configured to analyze displayed content in terms of a plurality of tiles 210 as illustrated in FIG. 8. Such tiles may be in the form of rows and columns as illustrated in FIG. 8, or in the form of polygons that may be of regular or irregular size shape. The tiles 210 are shown in FIG. 8 for illustrative purposes only, and will typically not appear on the touchscreen display 110 during normal operation. For ease of reference, the tiles illustrated in FIG. 8-10 are identified according to their row and column, as may be implemented in an embodiment employing rectangular tiles. However, the mobile device may use any system of reference for tracking tiles. With the display area organized into a plurality of tiles 210, each tile 210 may include certain displayed content that the mobile device may keep track of. In the illustrated example, the content in each tile is represented by a letter. For example, FIG. 8 shows that the tile in row 4 column 1 (referred to as 4,1) includes the content "A," the tile at 4,2 includes the content "B," etc. A variety of known algorithms may be used for segmenting a displayed image into tiles having M×N dimensions. For example, a 1024×768 display could be broken into 64×48 tiles, where each tile is 16×16. The tiles underneath a user's fingers and hand may be combined with the tiles to the left or right of the fingers and hand, where they may be joined and resized to fit the smaller, unobstructed area on the display.

Segmenting the displayed content into a plurality of tiles 210 may enable the mobile device to recognize segments concealed by a user's hand and repositioned such content in a user-pleasing manner without having to process the entire displayed content. Segmenting the display into a plurality of tiles 210 can facilitate determining the concealed content as illustrated in FIG. 9. In the illustrated example, the users finger 200 is gripping the display at the tile at 4,3, with the finger covering tiles at: 3,2; 3,3; 2,1; 2,2; and 1,1. Thus, in various embodiments the mobile device may use the location, shape and orientation of the grip event in the tile at 4,3 in combination with stored user parameters or anatomical models to determine the area blocked by the user's finger 200, and correlate that area to the tiles that are fully or partially concealed. By knowing the content in each tile, the mobile device can determine the concealed content, which in the illustrated example includes content items C, G, H, K, L and P. Having determined the concealed content, the mobile device may process the displayed content within each concealed tile to determine how best to reposition such content on the uncovered portion of the display 110.

The displayed content within each concealed tile may be repositioned to an uncovered portion of the display in a variety of manners, depending upon the implementation, the display size, the nature of the content (e.g., image, text, etc.), and the total concealed area. For example, if a small portion of the display is concealed, the concealed content may be shifted left, right, up and/or down, such as illustrated in FIG. 10. In this example, the mobile device may be configured to adjust or shift the concealed content to move it into adjacent uncovered tiles. The arrows 214 illustrate how the content of each covered tile 210 may be shift to render it uncovered. In the example illustrated in FIG. 10, half of the covered content C of the tile at location 4,3 is shifted to the right and squeezed into the tile at location 4,4, while the other half of content C is shifted to the left and squeezed into the tile at 4,2. As a result of this adjustment to the display presentation, tiles at 4,1 and 4,2 include the content elements A, B and half of C, while the tiles at 4,4 and 4,5 include the content elements D, E and half of C. Similarly, the adjustment of the presentation display may result in the tile at 3,1 including content element F and a fourth of G; the tiles at 3,4 and 3,5 including content elements J, I, J and three-quarters of G; the tiles at 2,3 through 2,5 including content elements K, L, M, N and O; and the tiles at 3,4 and 3,5 including content elements J, I, J and three-quarters of G; the tiles at 1,2 through 1,5 including content elements P, Q, R, S and T. As part of this adjustment to the presentation display, the concealed tiles may not include any content.

In the example illustrated in FIG. 10, concealed content is shifted only in the horizontal direction, and thus the displayed content in tiles of rows 5 and above will be unaffected by the presentation display adjustment. It should be noted that this example is premised on the concealed area being relatively narrow as illustrated in FIG. 9, which enables the content to be uncovered shifting it slightly in the horizontal direction. If the grip event indicated a wider concealed area, the mobile device may determine that concealed content should be revealed by shifting at least some of the content in the vertical direction. For example, if the user's finger 200 are oriented horizontally instead of diagonally as illustrated in FIG. 9, the adjustment to the presentation display may perform a similar shifting of content among the display tiles in the vertical direction, such as by shifting half of the content to tiles above the covered area and half of the content down to tiles below the covered area. Further, some grip events may require the mobile device to shift concealed content both vertically and horizontally, such as when the mobile device determines that a portion of the user's palm and other fingers are blocking a relatively large horizontal and vertical portion of the display.

A variety of algorithms may be used for repositioning and distorting the content within concealed the tiles in order to reveal the concealed content. For example, the entire display may be reduced in magnification and the content elements adjusted so that all of the content tiles appear in the uncovered portion of the display but in a smaller size. In another embodiment, the mobile device may apply well known warping algorithms, such as spherical distortion algorithms used in image processing applications, in order to reveal the concealed content. In this embodiment, as spherical distortion may be applied to the image so that the concealed portion appears as a highly warped ring about the user's finger with the degree of image warping decreasing as the distance from the finger increases. In a further embodiment, the concealed content may be presented in a window box that appears to float above in another portion of the display.

In a further embodiment, the tiles 210 may be non-uniform in size and shape, and may change dynamically to adjust to the content displayed. For example, when the area covered by a user's finger is smaller than a tile encompassing the grip event, the mobile device may be configured to leave the display undistorted, since the user can see around his/her finger. In such a scenario, the content of the tile that is larger than the finger may remain intact and may not shift or be adjusted on the touchscreen display. As another example, if the display image includes a fine detail, the size of the tiles may be reduced so that the redistribution and/or distortion of the concealed content can better accommodate the nature of the image. As a further example, areas of the image which have a font size (e.g., 20 point font) may have larger tiles than areas where there is a small font size (e.g., 10 point font). In an embodiment of tile size selection, a Hough Transform—which is a feature extraction technique used in image analysis, computer vision, and digital image processing that can recognize linear elements within the display image—can be used to segment the image into tiles in a manner that will facilitate moving content without cutting through letters or important graphics. Once the system knows where there are lines with no content separating areas of important content, e.g., sentences of text or pictures, tiles sizes can be set accordingly.

In a further embodiment, the manner in which the presentation display is adjusted to reveal covered content will depend upon the orientation in which the mobile device is being held. Mobile devices suitable for use with the various embodiments typically include an accelerometer which enables the devices to determine whether they are being held in a vertical orientation (i.e., with the long axis of the mobile device approximately parallel to the gravity gradient) or a horizontal orientation (i.e., with the long axis of the mobile device approximately perpendicular to the gravity gradient), and adjust the display of content accordingly. When the mobile device is being held in a vertical orientation, there may be more uncovered display area above or below a grip location than to the right or left; while the reverse may be true when the mobile device is being held in a horizontal orientation. Therefore, the mobile device may be configured to take into account the orientation of the device when determining how best to adjust the presentation display to reveal concealed content while minimizing any distortion applied to the remaining displayed content.

As mentioned above, once the image has been adjusted to reveal the concealed content, the resulting display image may remain in the adjusted configuration even after the user moves or lifts the finger that initiated the grip event off of the touchscreen. This implementation avoids the problem of the display frequently reconfiguring in response to small movements of the user's finger, which may become distracting to the user. Also, once the display is configured to match a user's grip, the user may prefer to maintain that display orientation so the user can re-grip the mobile device without the need for the display to reconfigure. In an embodiment, the adjustment to the display presentation may be retained for a predetermined duration (which may be configurable as a user preference setting) after the user's finger is removed from the touchscreen. In another embodiment, the adjustment to the display presentation may be maintained until the user executes a user command (such as in the form of a predefined touch gesture like a double tap) directing the mobile device to return the display to its normal configuration. In a further embodiment, the manner in which the presentation display returns to normal configuration after the user removes a finger from the touchscreen may be configurable by a user preference setting or menu selection.

The various embodiments may be implemented as stand alone utilities or as part of a device display driver or operating system so that applications generating the displayed content need not be concerned with shifting or warping. In such embodiments, applications on a mobile device, such as game or web browser applications, do not need modified to support the shifting or warping of the display content based on touch events.

Figure 11:
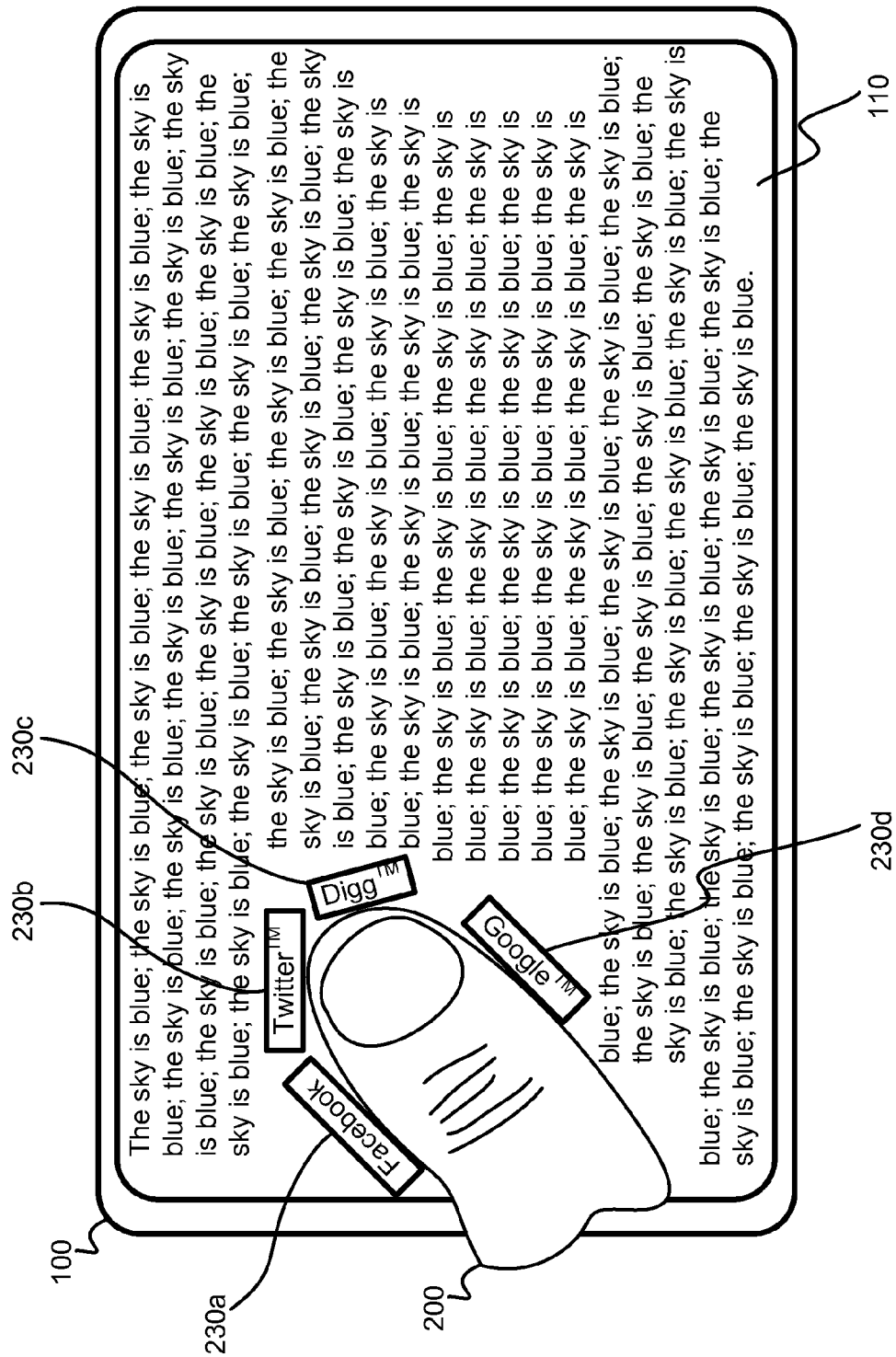
FIG. 11 is an illustration of a display of a mobile device showing how menu icons may be repositioned in response to a grip event according to an embodiment.

The various embodiments are not limited to adjusting the displayed content as described above, and may also or alternatively be applied to the displayed virtual buttons and menu icons. In this manner, the mobile device can be configured to present virtual buttons and menu icons in close proximity to the user's grip. By doing so, the mobile device can facilitate the one hand operation of the device. An example of this embodiment is illustrated in FIG. 11, which shows menu icons 230a, 230b, 230c, 230d positioned close to a user's thumb 200 to allow the user to access common functions with ease. When the mobile device determines the area covered by user's finger 200 based on the location, size and orientation of the grip event, the mobile device 100 adjust the concealed content as described above, and reposition menu icons 230a, 230b, 230c, 230d in close proximity to the estimated profile of the covered area. Positioning menu icons in close contour profile of a touch event may allow the user easy access to important menu icons, since the user may shift the position of a thumb or finger 200 only a small amount to engage a menu icon. While FIG. 11 illustrates the menu icons 230a, 230b, 230c, 230d oriented in parallel with the contour of the user's thumb 200, the icons may also be oriented horizontally (or any other orientation) to render them easier to read.

To select and activate a menu icon 230a, 230b, 230c, 230d positioned next to the user's finger or thumb 200, the user may shift or roll the digit in the direction of the selected icon. For example, a user may select a menu icon by rolling his/her finger or thumb 200 towards that icon, which will shift the shape and location of the grip event as measured by the touchscreen towards the icon, a movement which the mobile device may be configured to recognize as a menu icon activation, similar to a virtual button press touch gesture. Alternatively, the user may lift the finger and touch the selected menu icon since the reconfigured display presentation may remain for a period of time after the grip event ends as described above.

Alternatively or additionally, the user may increase or decrease the pressure applied to the touchscreen display to select a menu icon 230. For example, the mobile device may be configured to detect and increase of pressure of the touch event and select a different menu icon 230 at different pressure parameters. Thus, the mobile device may be configured to sequentially select each menu icon near the user's grip finger or thumb 200 with each incremental increase in applied pressure. The selected icon may be highlighted, such in a color shade or light intensity or a blinking configuration, to indicate which icon is currently selected. The user may then confirm selection of an icon by sustaining the same pressure or executing a further gesture with the grip finger, such as a double squeeze gesture. The mobile device may be configured to enable a user to execute a menu icon 230 selection by a variety of different methods. For example, when a certain pressure gradient is reached, the mobile device 100 may be configured to execute the selection of the menu icon 230 when/if the user lifts the grip finger 200 from the touchscreen display. In a further example, the mobile device 100 may be configured to execute selection of a menu icon 230 at a certain pressure gradient if a constant pressure at that pressure gradient is maintained by the user for a predetermined amount of time.

Figure 12:
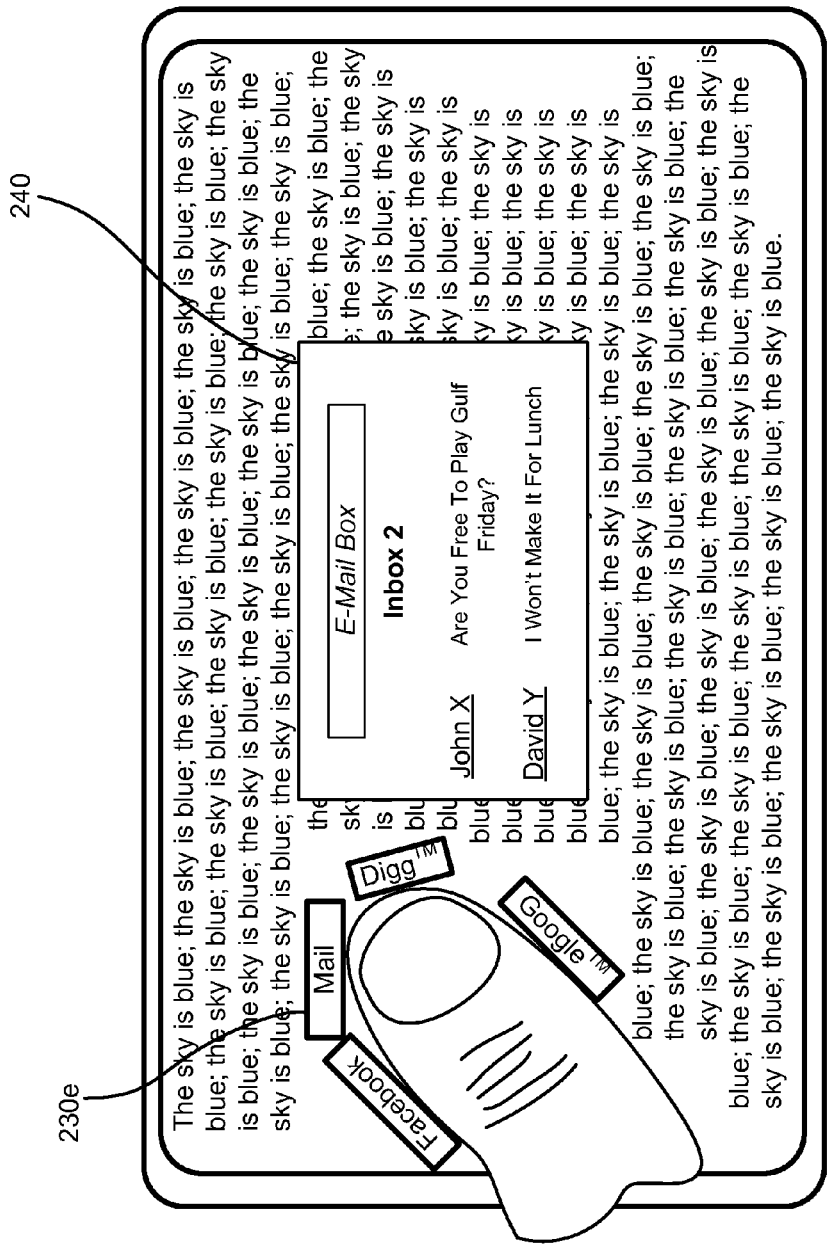
FIG. 12 is an illustration of a display of a mobile device showing how touching a menu icon repositioned in response to a grip event can activate a further menu according to an embodiment.

In an embodiment illustrated in FIG. 12, once a menu icon 230 is executed, the mobile device 100 may be configured to display an intermediary menu window 240 to allow the user to preview requested data or select from a secondary menu. For example, upon selecting a mail application menu icon 230e, the mobile device 100 may display a preview window 240 enabling the user to preview a selection of the items in the user's inbox. The user may use another finger 200 to select an item in the preview window 240. For example, in response to sensing a touch event on the "John X" portion of the preview window 204, the mobile device 100 may present the user with another display (not shown) showing the entire email message.

Figure 13:
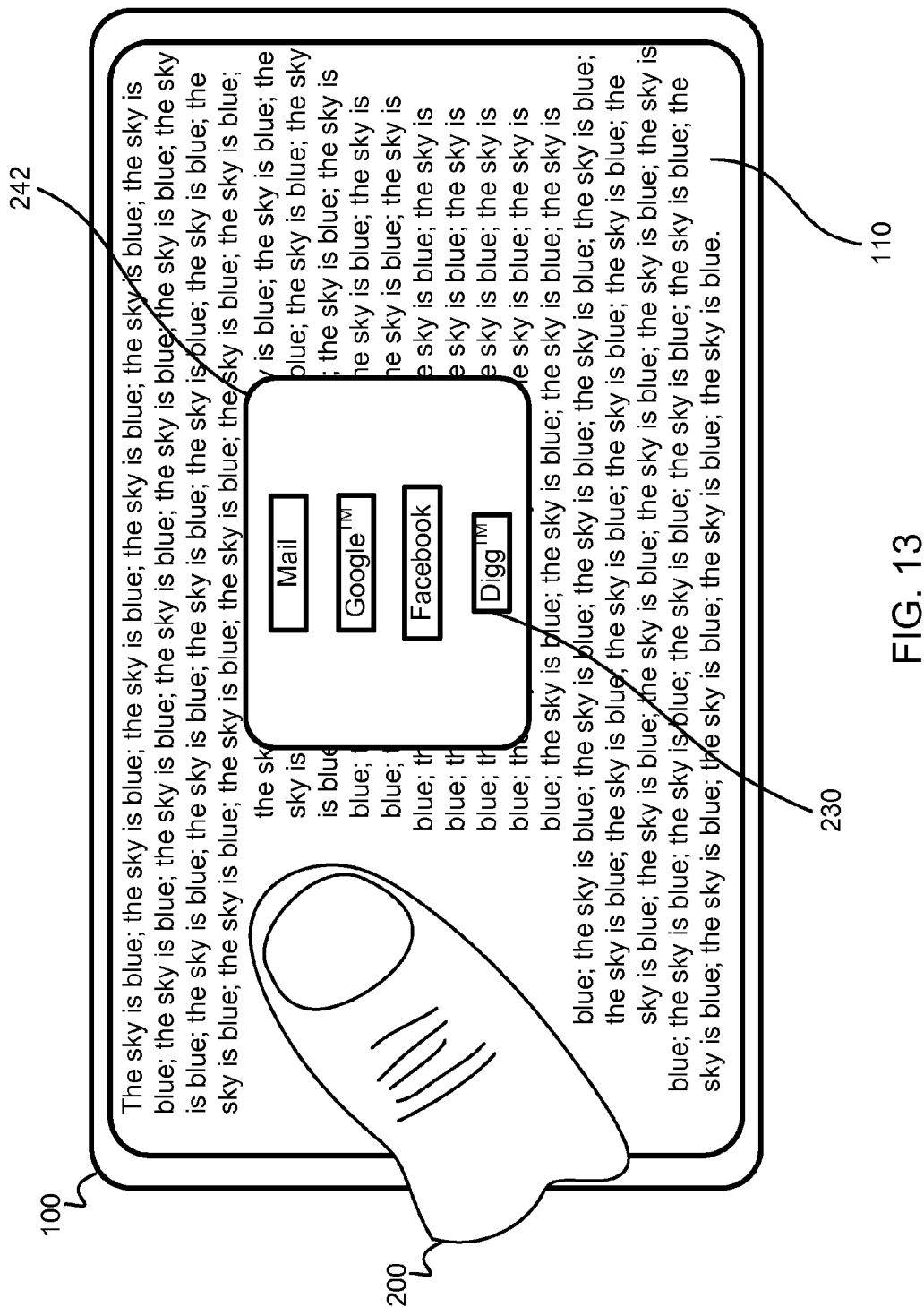
FIG. 13 is an illustration of a display of a mobile device showing how menu icons may be repositioned in response to a grip event according to another embodiment.

In another embodiment illustrated in FIG. 13, instead of displaying menu icons close to the grip event, the mobile device 100 may display a menu window 242 in response to the amount of pressure applied in the grip event. For example, if the user squeezes the touchscreen display 110 with a pressure above a threshold value, the mobile device 100 may display a menu window 242. The user may then use another finger to select a menu icon 230 within the menu window. Icons and information presented in such a menu window 242 may include static information, variable information and linking information. Static information may include data, such as text, that does not change over time and hyperlinks to other content. Variable information may include data that changes over time, such as data about contents of an electronic mail inbox. For example, inbox data may change when new electronic mail is received.

Figure 14:
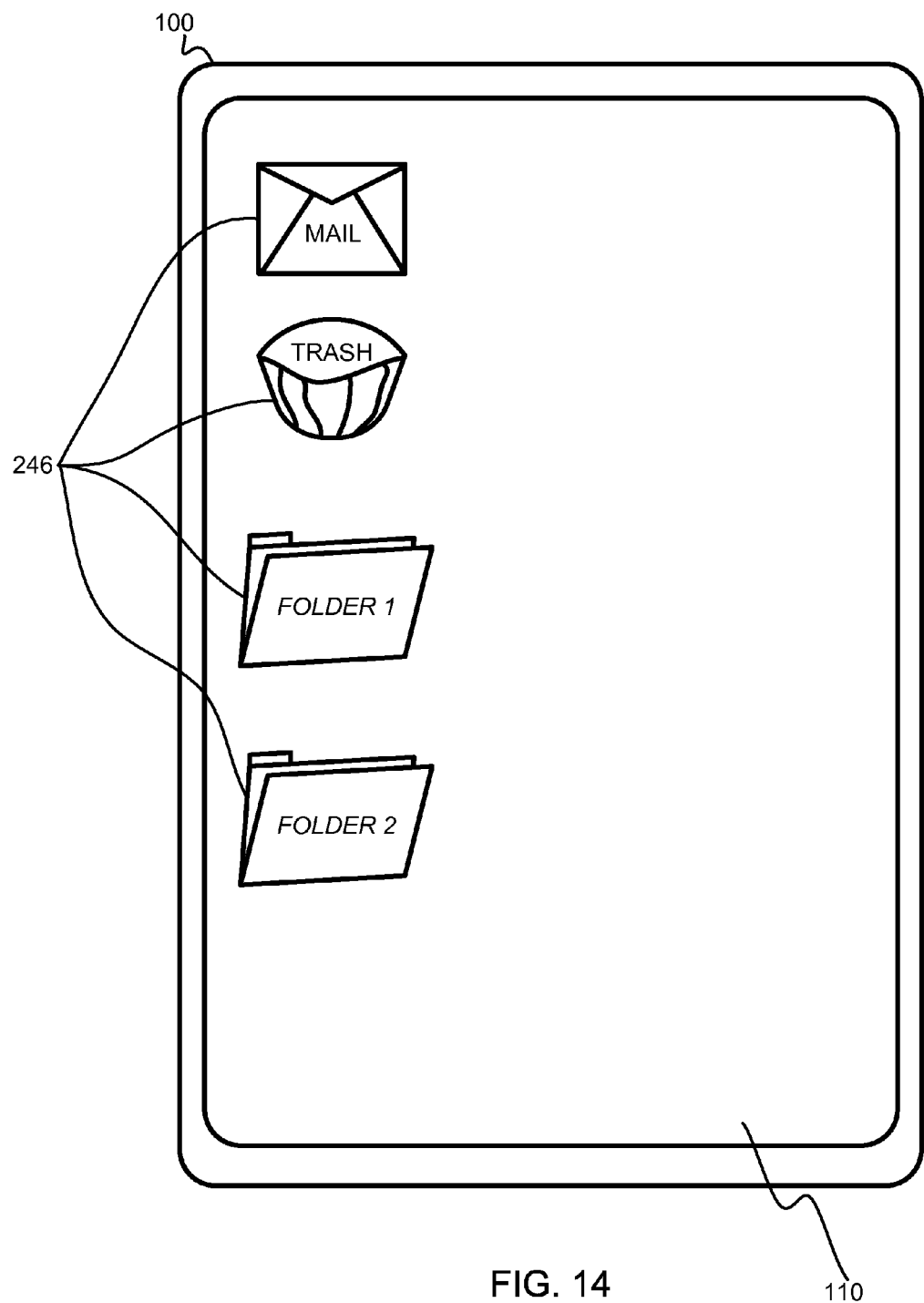
FIGS. 14 and 15 are illustrations of a display of a mobile device showing how menu icons may be repositioned in response to a grip event according to another embodiment.
Figure 15:
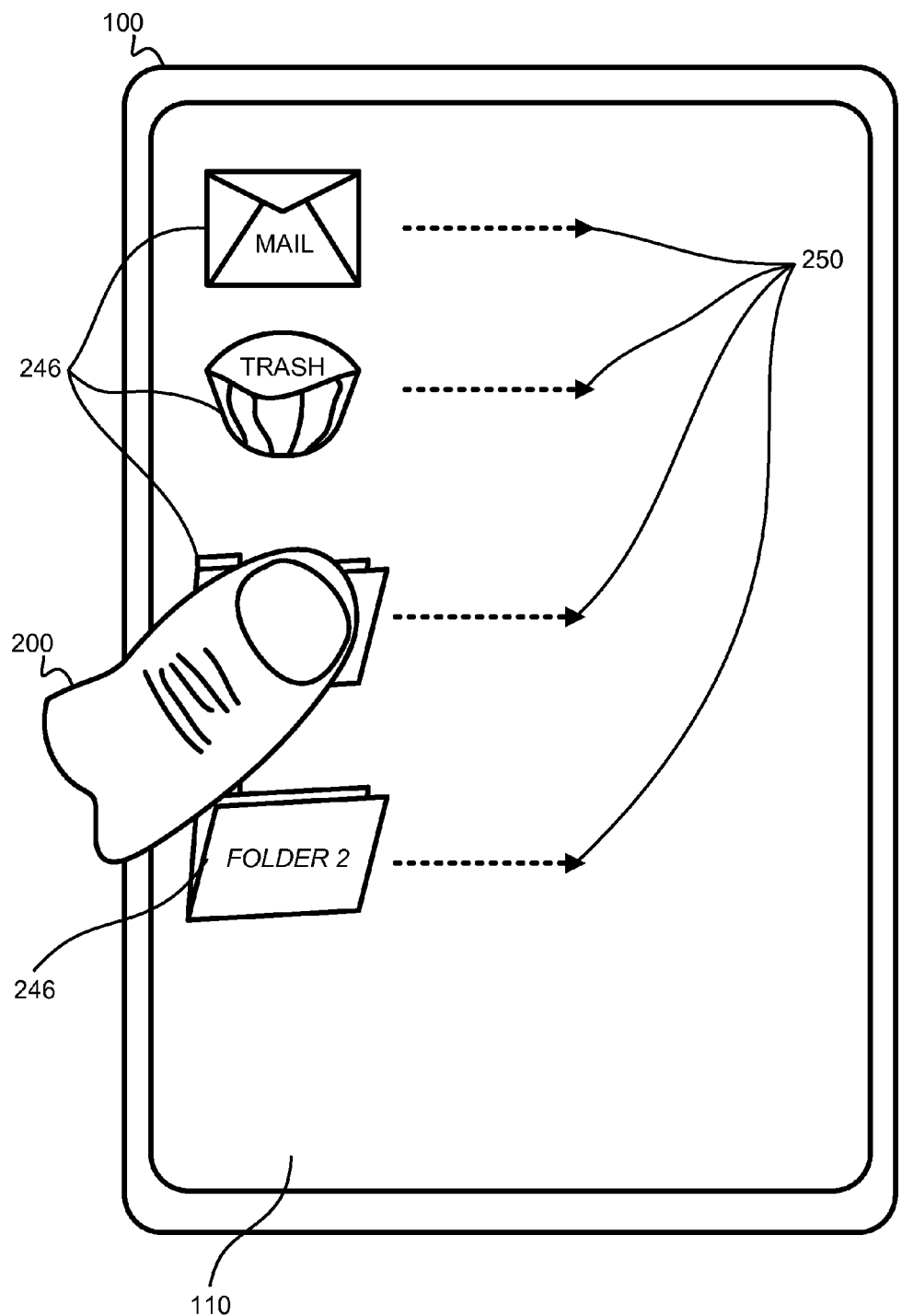
Figure 16:
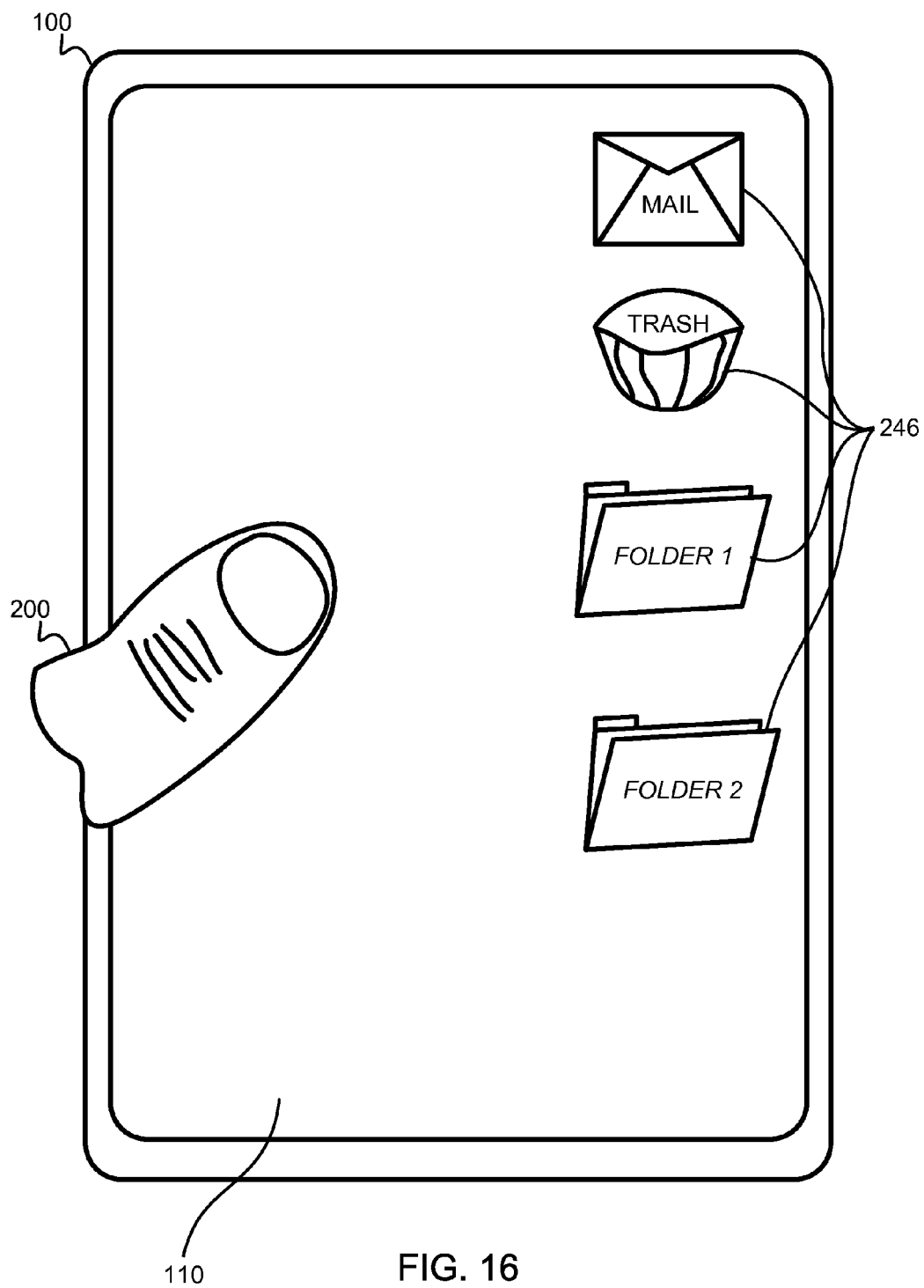
FIGS. 16-18 are illustrations of a display of a mobile device showing how menu icons may be repositioned in response to a grip event according to another embodiment.

FIGS. 14-16 illustrate another embodiment that relocates icons 246 on a touchscreen display 110 based on the location of a grip event so that the icons are removed from the gripping finger and, thus, readily accessible to the user's other hand. In the example illustrated in FIG. 14, menu icons 246 are presented on the left-hand side of the touchscreen display 110 before the initiation of a grip event. In response to detecting a grip event on the left-hand side of the touchscreen, the mobile device in this embodiment may shift the displayed location of the menu items to the other side of the touchscreen as illustrated in FIG. 15. As a result, the menu icons 246 are shifted to the right hand side of the touchscreen display 110 as illustrated in FIG. 16.

Figure 17:
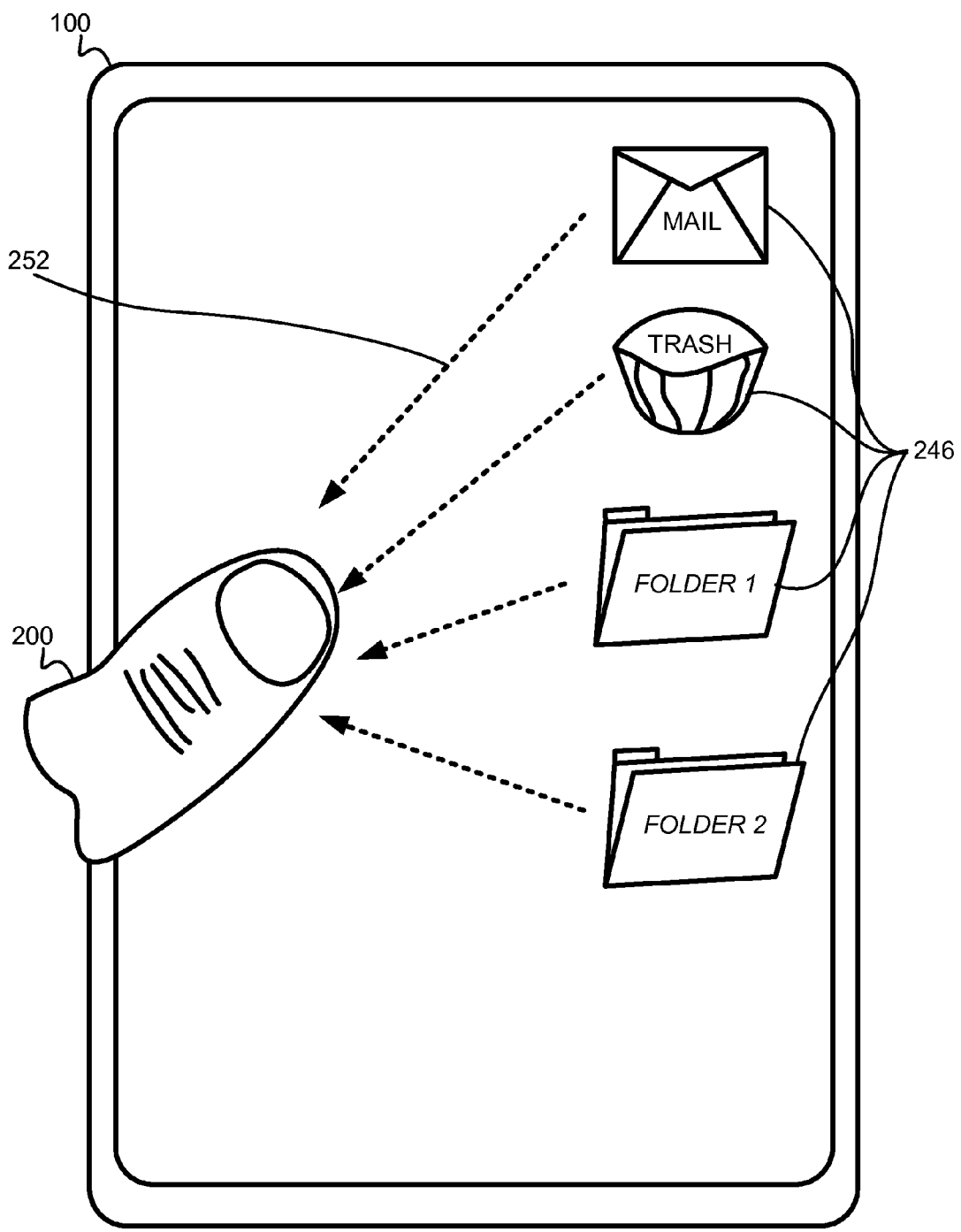
Figure 18:
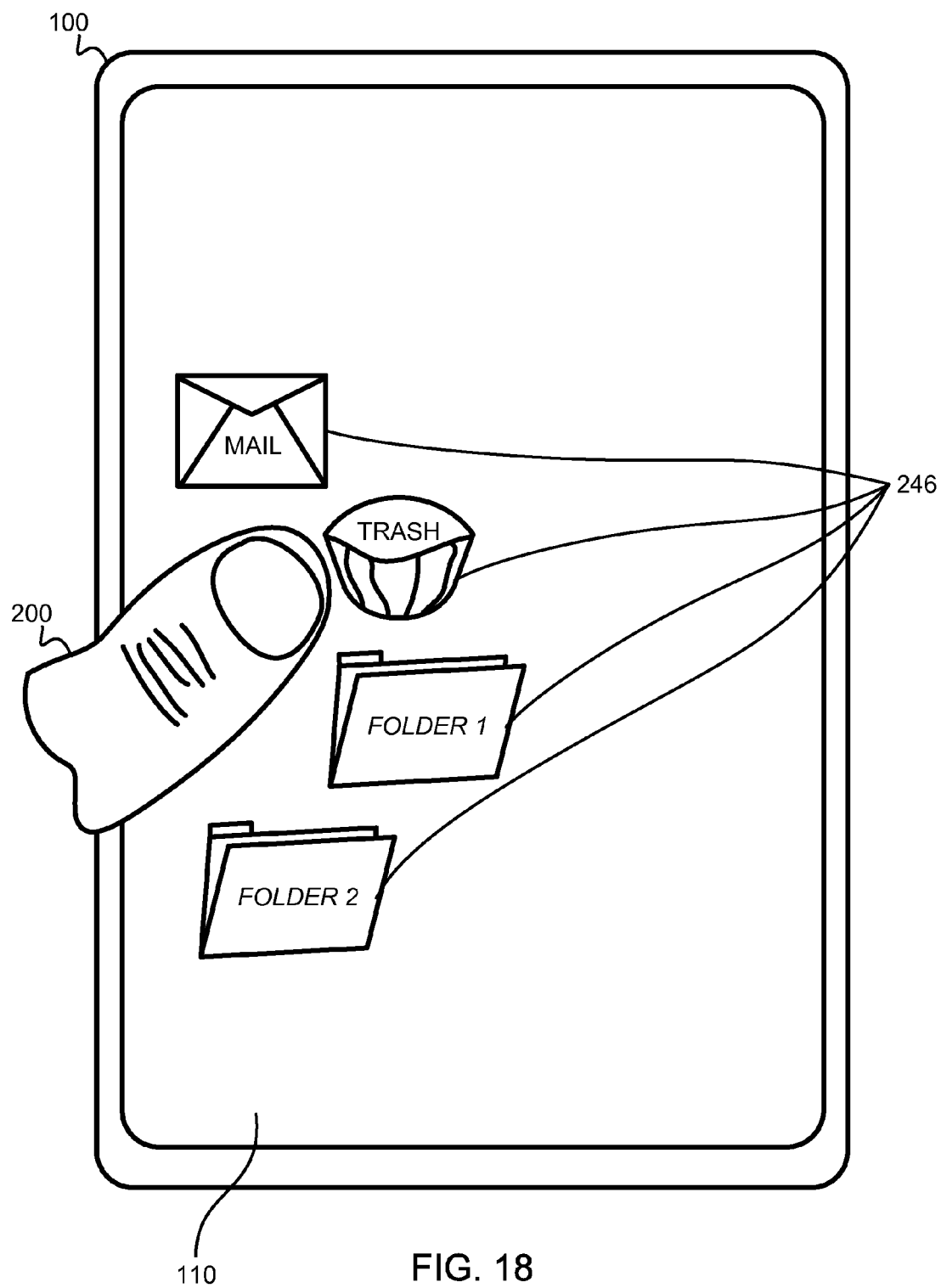

FIGS. 17 and 18 illustrate another embodiment that relocates icons 246 on a touchscreen display 110 based on the location of a grip event so that the icons are removed from the gripping finger and, thus, readily accessible to the user's grip hand. In the example illustrated in FIG. 17, menu icons 246 position on the right-hand side of the touchscreen 110 Icons 246 may be shifted in the direction of a grip event. As a result of this adjustment of the presentation display, the menu icons 246 may be positioned closest to the user's gripping finger or thumb 200 as illustrated in FIG. 18. So positioned, the menus can be easily activated by the user's gripping finger 200.

Figure 19:
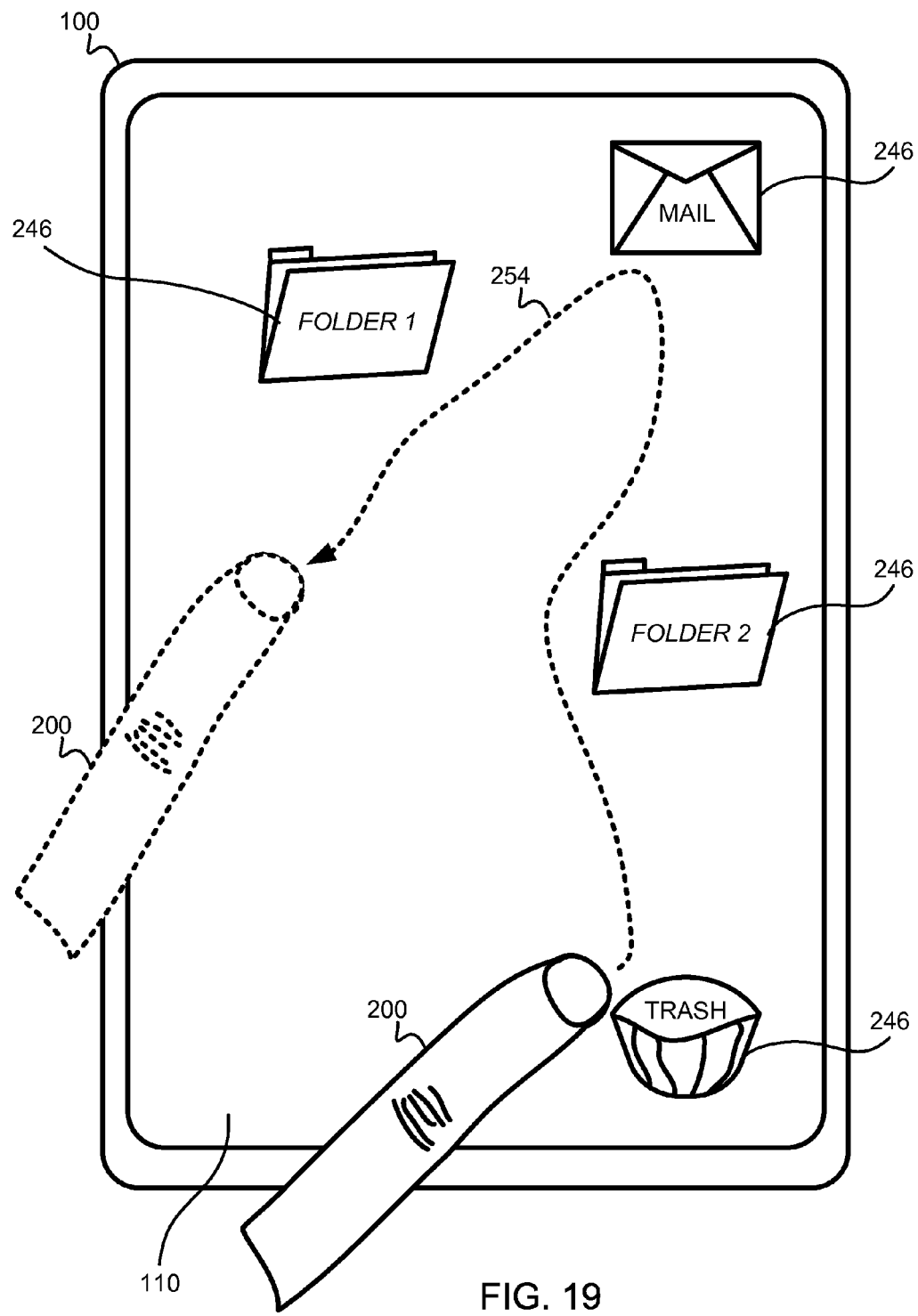
FIGS. 19 and 20 are illustrations of a display of a mobile device showing how menu icons may be repositioned in response to a grip event according to another embodiment.
Figure 20:
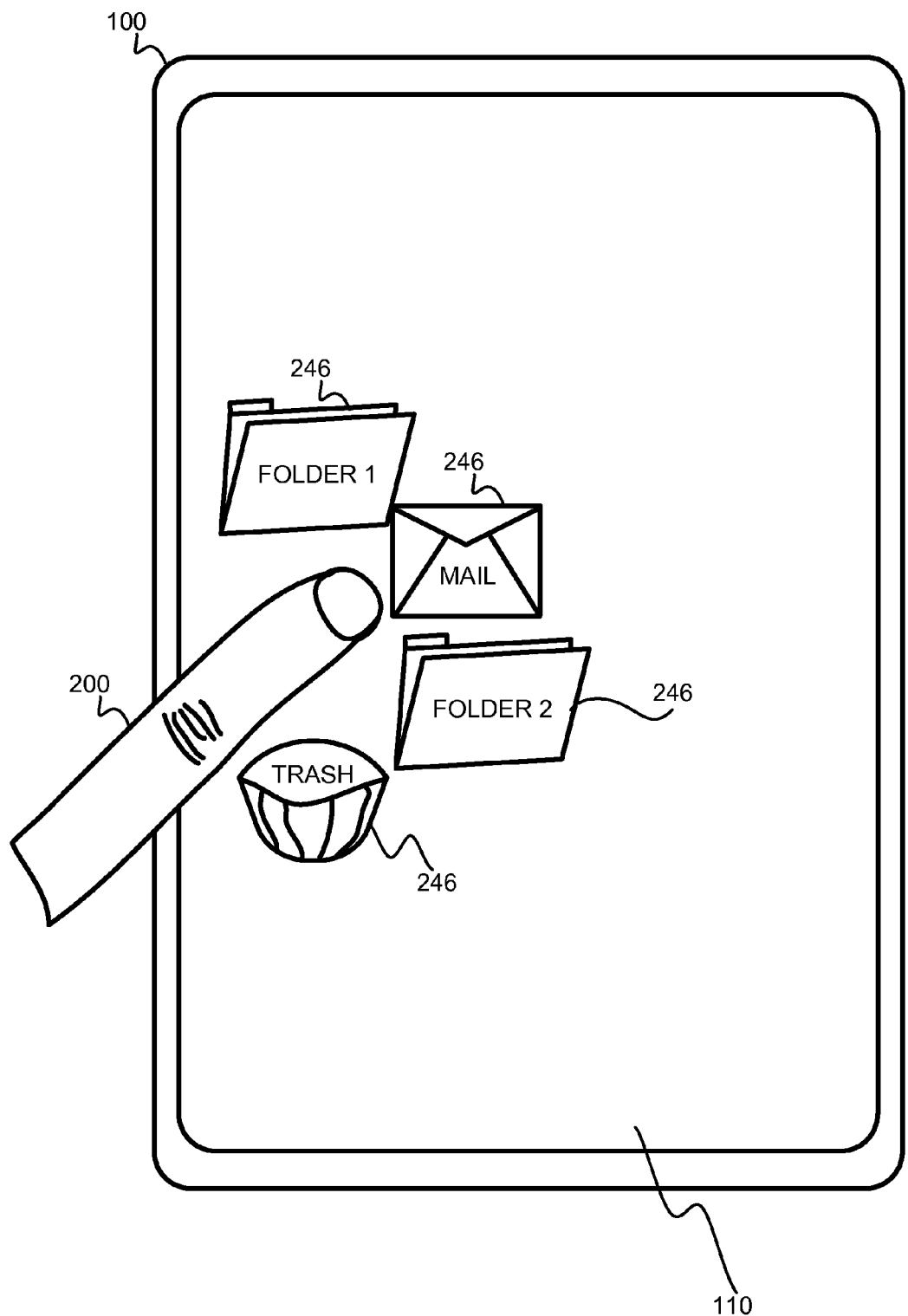

In a further embodiment illustrated in FIG. 19, the mobile device may enable a user to select a particular menu icons positioned close to the user's gripping finger. In this embodiment, a user may trace a path 254 that passes over or near selected menu icons 246. By tracing a path 254, the user informs the mobile device 100 of the menu icons that should be gathered about the user's gripping finger. In this embodiment, a user may touch the touchscreen display 110 with a finger 200 and move the finger 200 across the display so that the path 254 passing near or over selected icons 246. The end position of the menu icons close to the gripping finger 200 is illustrated in FIG. 20.

In a further embodiment, a mobile device may not move content concealed by a grip event, and instead may alert the user to changes in the concealed content. As part of this embodiment, menu icons and virtual buttons concealed by a grip event may be deactivated so long as the gripping finger remains in contact with touchscreen surface. These embodiments may be preferred by users in some applications where distortion of the displayed image would be distracting. For example, an application may present menu icons along the left-hand margin of the display, in which case repositioning the icons might be distracting or distort the displayed content (e.g., a game display, photographs or text). In such an application, users may prefer to grip the device in the margin encompassing the menu icons without affect the rest of the displayed content. To enable this, one or more menu icons concealed by the grip event may be deactivated so that the user gripping the device does not unintentionally activate a menu functionality. To activate a menu icon concealed by a grip event, the user may lift a finger from the touchscreen and then double tap the icon (or perform some other touch gesture). In this embodiment, the mobile device may inform the user about changes in the concealed content by flashes or other changes to the display in the vicinity of the user's finger. For example, an outline of the user's finger may glow or flash when the mobile device determines that concealed content has changed. An example of this embodiment is illustrated in FIGS. 21 and 22.

Figure 21:
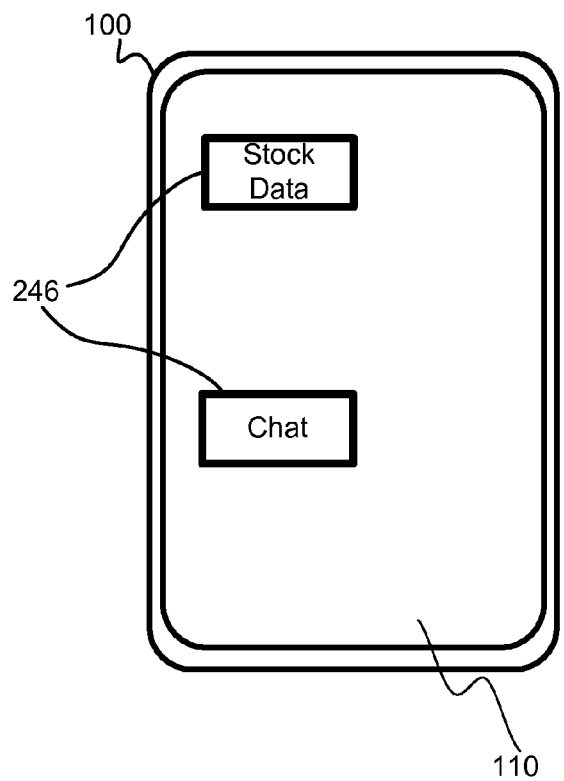
FIGS. 21 and 22 are illustrations of a display of a mobile device showing an indication that a covered portion of the displayed content has changed.
Figure 22:
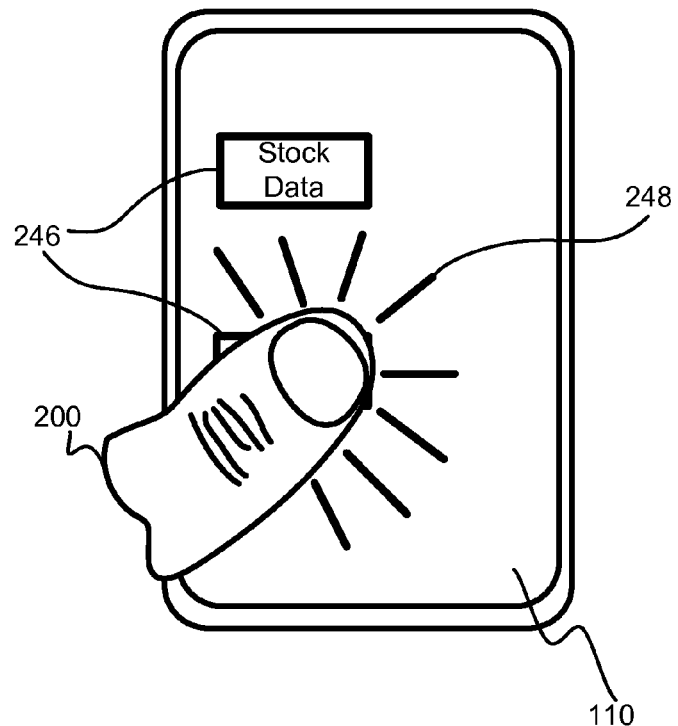

In the example illustrated in FIG. 21, the mobile device 100 displays two icons 246 along the left-hand side of the touchscreen display 110. When the user grips the device with a thumb 200 in a manner that conceals one of the menu icons as illustrated in FIG. 22, the concealed icon may be deactivated for the duration of the grip event (i.e., so long as the user's thumb 200 remains in contact with the touchscreen display 100). If during the duration of the grip event the concealed content changes (for example, a new chat is received which causes the functionality of the "Chat" icon to change to "read"), the mobile device 100 may alert the user by visual and/or audible indicators, such as by displaying a glowing animation 248 around the estimated contour of the user's finger. Such an alert informs the user that the concealed area has changed, enabling the user to disregard the concealed content until there is something new worth viewing.

Figure 23:
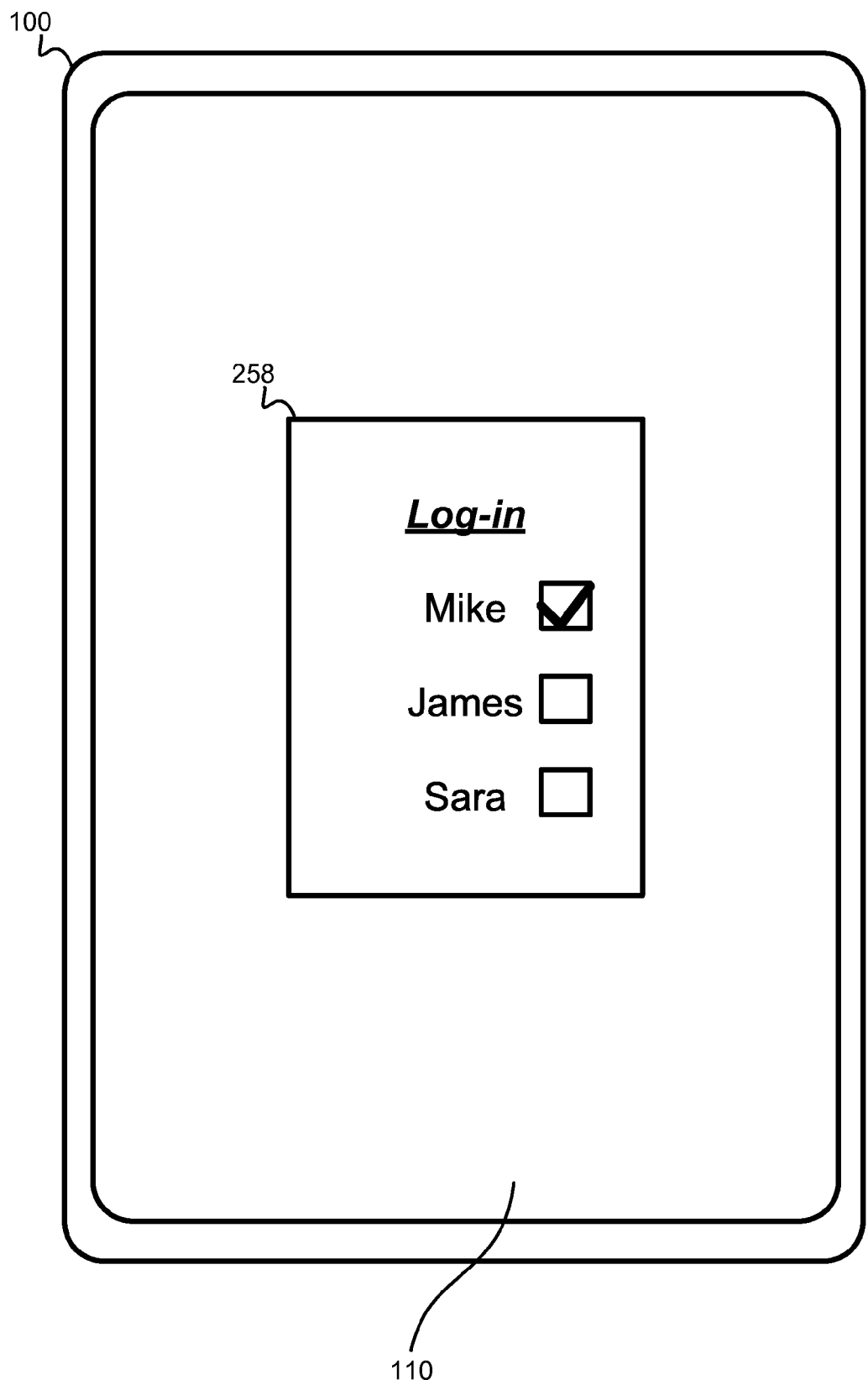
FIG. 23 is an illustration of a display of a mobile device showing an example user login display.
Figure 24A:
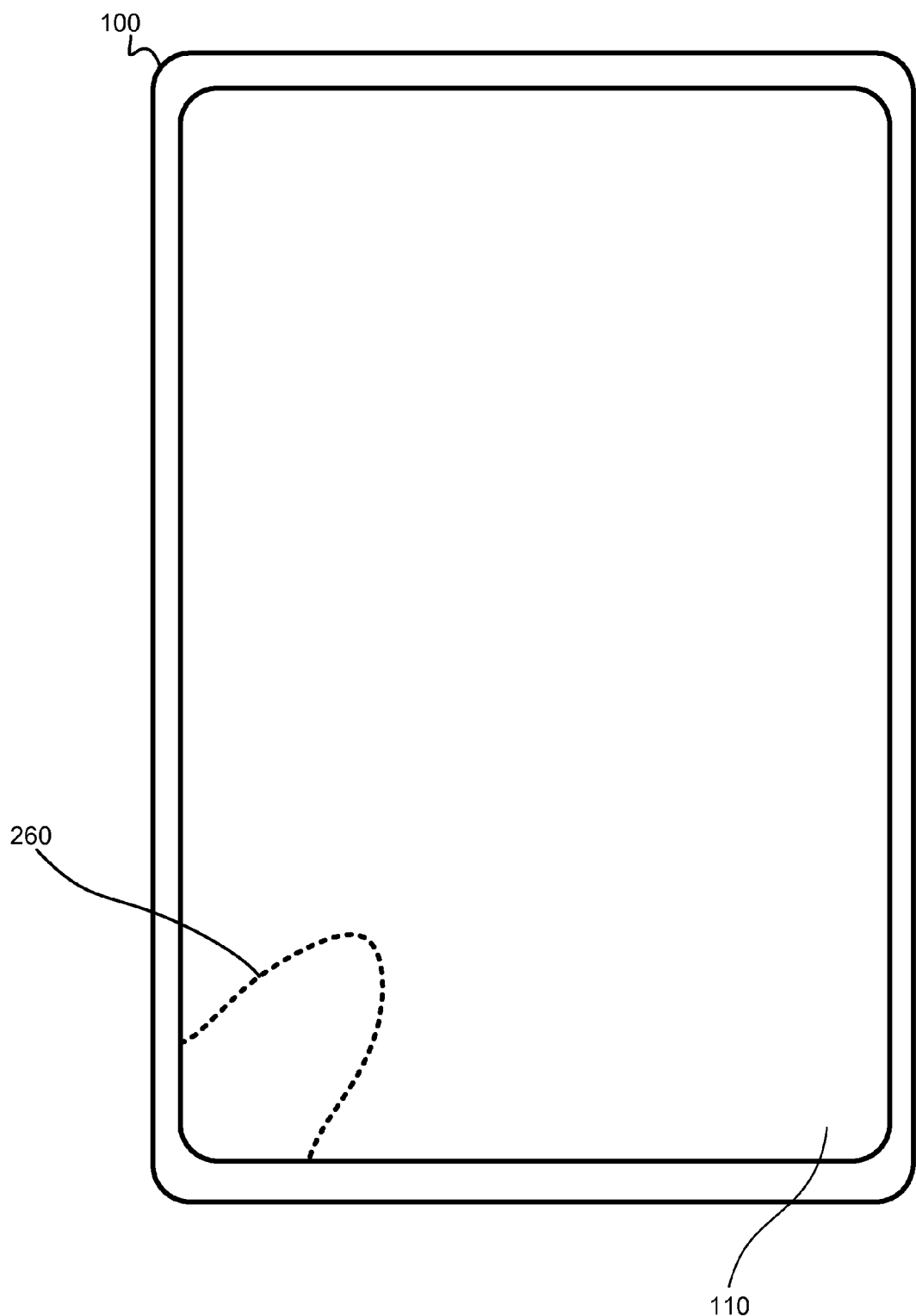
FIGS. 24A and 24B are illustrations of a display of a mobile device showing an outline of a suggest grip location for a user according to alternative embodiments.

FIGS. 23 and 24A illustrate an embodiment method for suggesting an area 260 on the touchscreen display 110 on which the user may grip the device. Such a grip locations may be based upon typical usage as reported by the mobile device or upon user training or designations, both of which may be stored in memory for particular users. In order to recognize a current user, a mobile device 100 may display a login menu 258 as illustrated in FIG. 23. Such a login menu may list the users for which the mobile device has stored preferences and settings. In this example login window, the user may indicator identity by clicking on the appropriate checkbox. In response to a user login, the mobile device may access the user's grip profile from an internal database, and display an outline 260 of the user's preferred location for gripping the mobile device as illustrated in FIG. 24A. The mobile device 100 may display the preferred grip location 260 for a predetermined amount of time, after which the indication may be removed from the display. Also, once the user grips the mobile device, the preferred grip location indication may be removed from the display.

Figure 24B:
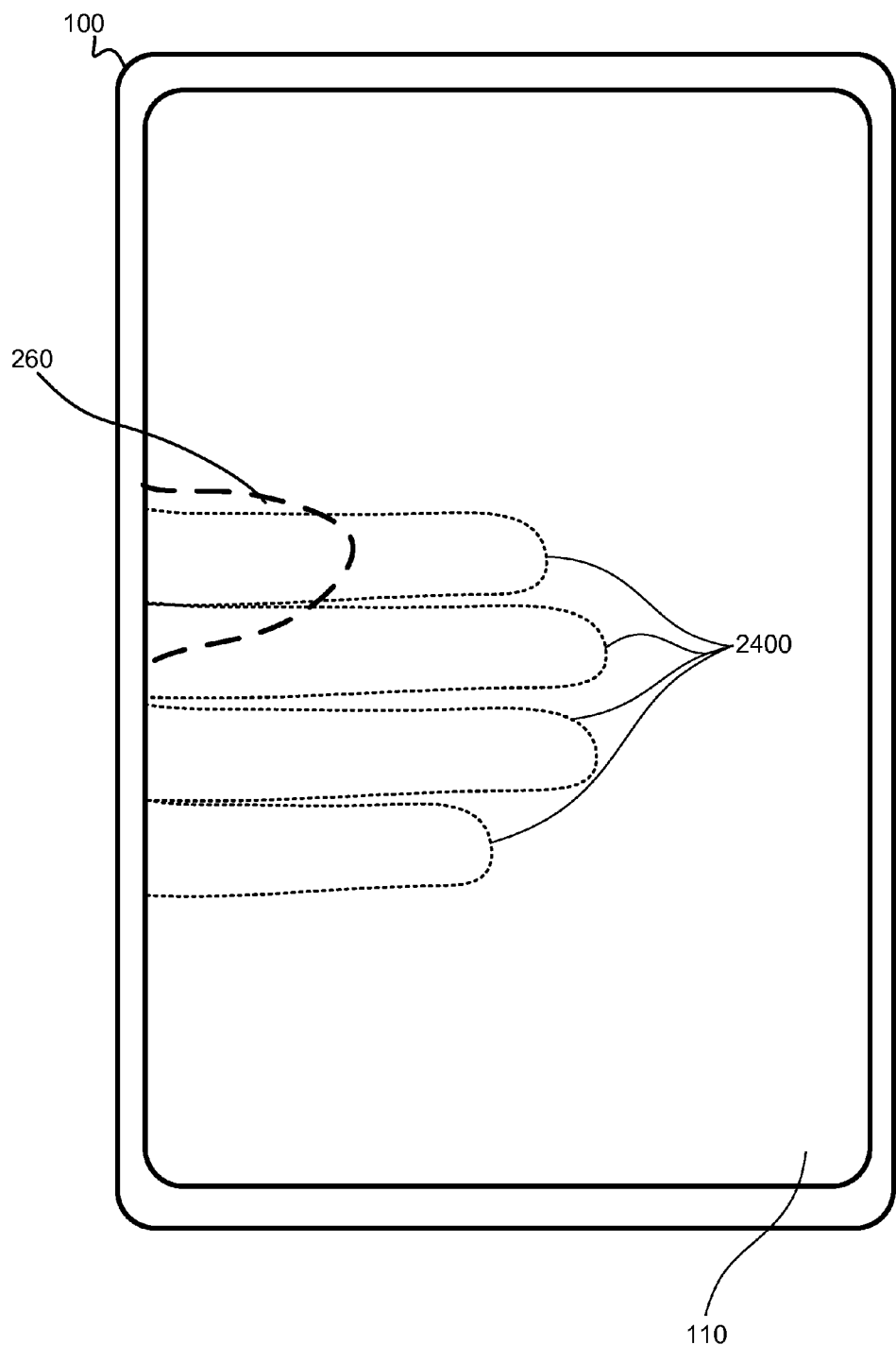

In a further embodiment illustrated in a FIG. 24B, the mobile device may be configured to display a suggested correct location 260 based upon other sensor information indicating the manner in which the mobile device is being held. Some mobile devices may be equipped with touch sensors which can recognize and locate the position of a user's fingers 2400 positioned on the back of the device case. In the embodiment illustrated in FIG. 24B, the mobile device 100 may be configured to the determined the location of the user's fingers 2400 positioned on the back of the device case, and based on this information display a suggested location 260 for the user's thumb that will result in a comfortable grip. In an embodiment, the mobile device 100 may determine which of the sensed fingers 2400 is the user's index finger or middle finger, such as by order and relative length (e.g., the index finger is typically longer than the little finger), and position the suggested thumb location display 260 and proximity to the determined index finger or middle finger locations as illustrated in FIG. 24B. The aligning of the suggested thumb location with index finger or middle finger (or other finger) may be a user preference setting. The mobile device may be configured to recognize the user's finger based upon their order in a series of touches, such as by determining the vertical direction (e.g., by use of an accelerometer which senses the gravity vector), and assuming the first finger touch from the top of the device is the index finger, the second finger touch from the top of the device is the middle finger, and so forth. The positioning of the suggested thumb location display 260 may take into account the positions of displayed content or presented on the display as well as the positions of the user's fingers 2400. Further, the positioning of the suggested thumb location display 260 based upon the sensed locations of the user's fingers 2400 may take into account user preferences, such as may be generated in a training routine. While FIG. 24B illustrates positioning the suggested thumb location display 260 based upon the sensed location of the user's fingers 2400 on the back of the mobile device 100, this embodiment may also take into account the sensed location of the user's fingers upon other parts of the mobile device, such as the sides and bezel of the device in mobile devices equipped with touch sensors configured on such surfaces. Further, the mobile device 100 may be configured to sense the touch of other parts of a user's hand, such as the palm along an edge of the device, and you such information to position the suggested thumb location display 260.

Mobile devices 100 may employ different methods for determining the user's preferred location for gripping the device. In one method, mobile devices may record a user's touch event locations on the touchscreen display 110 over a period of time and determine an average or most frequent grip location. When a user first begins to use a mobile device, the preferred location may be the user's last grip location. Over time, the mobile device may update the preferred grip location information stored in the internal database for the user to reflect the most frequently employed grip location. In another method, the mobile device may prompt the user to indicate a preferred grip location during a training routine, and store the user's input within the internal database for the user.

In a further embodiment, the mobile device 100 may recommend a grip location 260 based on the layout of the display contents. In doing so, the mobile device may take into account the positioning of content items within the touchscreen display to determine if there is a location that will not conceal any content or will result in the least amount of distortion. For example, a webpage may have regions of no content or low priority content (e.g., fine print, logos or static shapes) along an edge which can be gripped without blocking any of the substantive content. The suggested recommended grip location 260 may be displayed such as in the form of a dotted outline of a finger 200 as illustrated in FIG. 24. The mobile device 100 may display the recommended grip location 260 for a predetermined amount of time, after which the indication may be removed from the display. Also, once the user grips the mobile device, the recommended grip location indication may be removed from the display. If the user grips the mobile device in the recommended grip location, the mobile device may not alter the presentation display if the location was selected so that no content or low priority content is covered by the user's finger. If the user grips the mobile device in a location other than the recommended grip location, the mobile device may adjust the presentation display in accordance with an embodiment described above.

Figure 25:
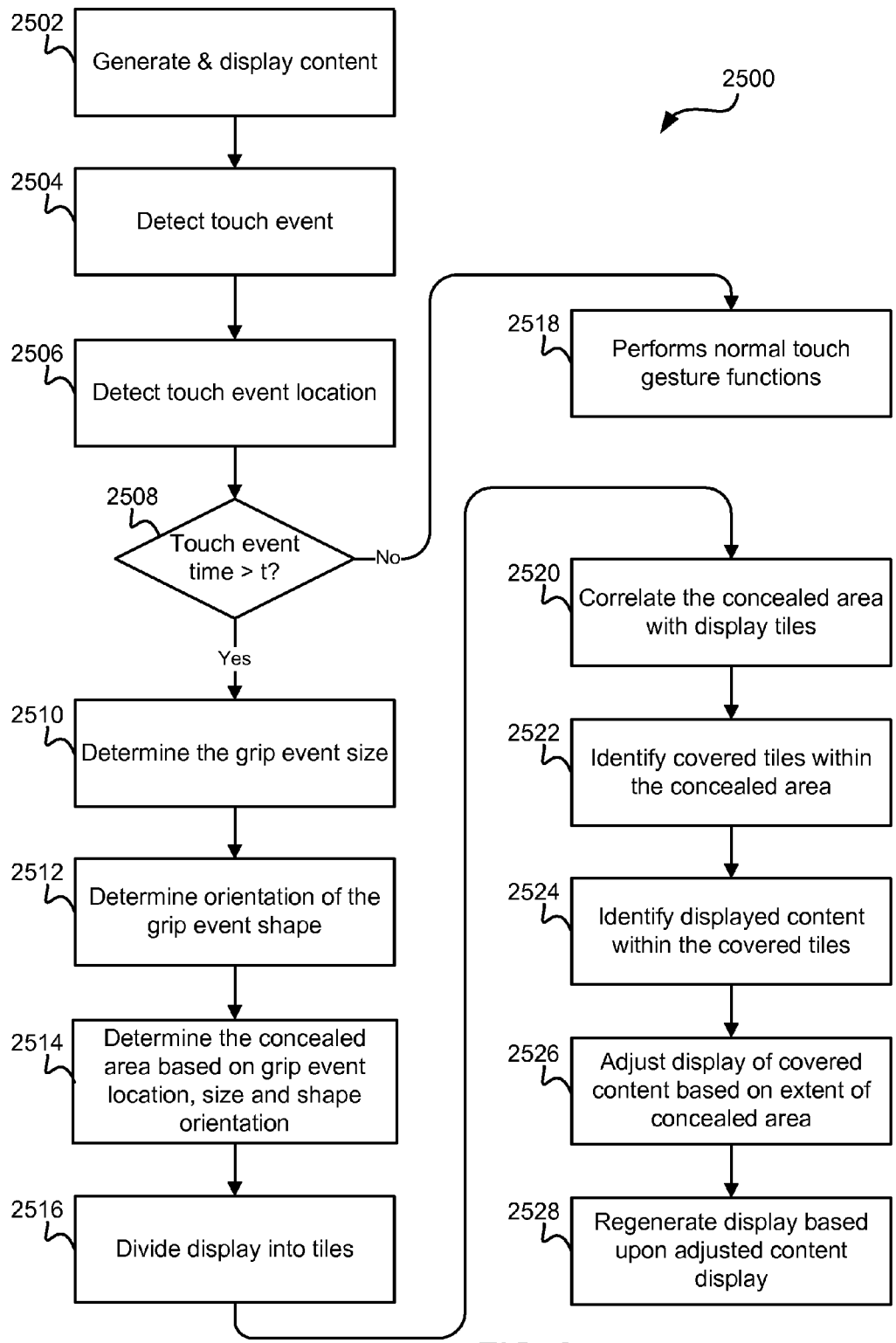
FIG. 25 is a process flow diagram of an embodiment method for adjusting displayed content based on a grip event.

FIG. 25 illustrates an embodiment method 2500 that may be executed by a processor of a mobile device for adjusting display content based on a grip event. The mobile device 100 may generate and display content to the user in step 2502. When a user touches the touchscreen display 110, the mobile device 100 may detect the touch event, step 2504, and the touch event location, step 2506. The mobile device may recognize a grip event by determining whether the touch event remains in contact with the touchscreen display 110 at the same location for a predetermined threshold duration "t" in determination step 2508. If the touch event remains in contact with the touchscreen display 110 for a time period less than the threshold duration (i.e., determination step 2508="No"), the mobile device 100 may continue the normal function based on the touch event, step 2518. If the touch event remains in contact with the touchscreen display 110 longer than the threshold duration (i.e., determination step 2508="Yes"), the mobile device 100 may treat the event as a grip event and determine the grip event size (i.e., the area of the on-class contact), step 2510, and the shape and orientation of the grip event, step 2512. In determining the orientation of the grip event in step 2512, the mobile device may analyze the shape of the touchscreen area contacted by the user's finger to determine the long and short axes of the shape, the relative orientation of the shape's long axis and, optionally, a measure of the degree to which the shape is asymmetrical (e.g., teardrop or oval in shape). In step 2514, the mobile device 100 may determine estimate the display area concealed by the user's hand based upon the location, size and orientation of the grip event. As described below, this may be accomplished in a variety of ways, including using the location, size and orientation of the grip event as lookup criteria in a data table corresponding to the user. In step 2516, the mobile device 100 may be segment the touchscreen display 110 into tiles, and correlate the concealed area particular display tiles in step 2520. In step 2522, the mobile device 100 may identify the display tiles concealed by the grip event area 208, and identify content within the concealed tiles in step 2524. In step 2526, the mobile device 100 may adjust the presentation display in order to reveal the estimated concealed content in an uncovered portion of the display, and regenerate the display based upon the adjustments in step 2528.

Figure 26:
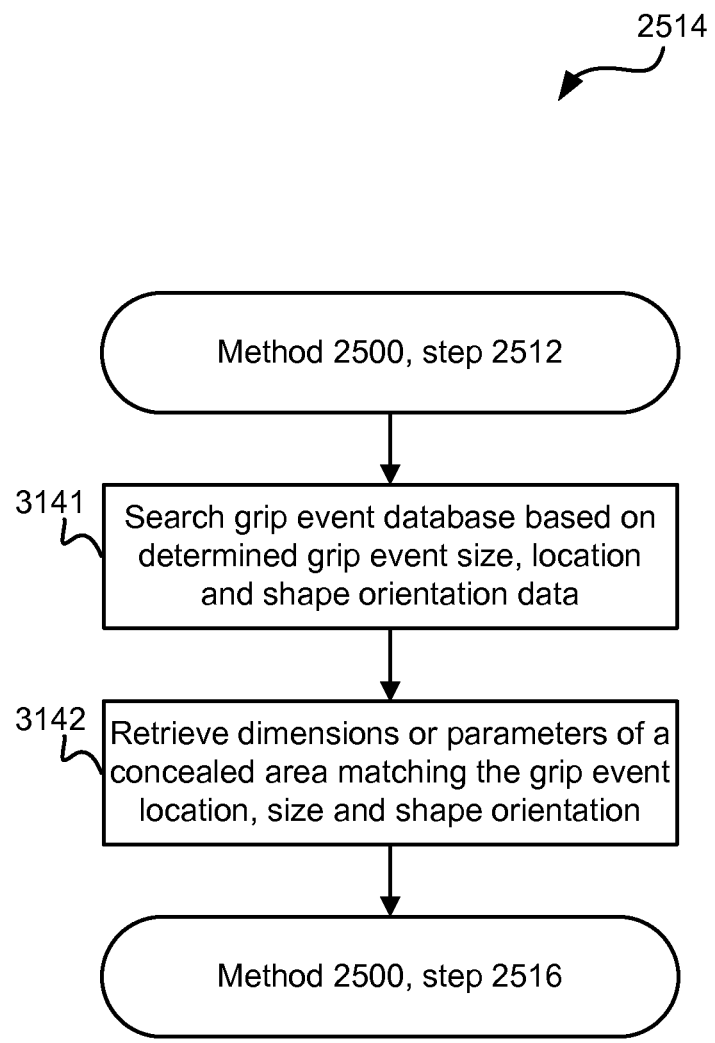
FIG. 26 is a process flow diagram of an embodiment method for determining the area of a grip event.

A mobile device 100 may determine the concealed area in step 2514 of method 2500 using a variety of methods. In one example method, the mobile device may estimate the concealed area by applying the parameters of the location, size and orientation of the grip event in an algorithm that models a user's hand. For example, and algorithm may extend a parameter beyond the boundary of the grip event and extend that boundary will be nearly towards an edge of the display along the line defined by the long axis of the grip event shape. In a second example method, the mobile device may estimate the concealed area by using the location, size and orientation of the grip event shape as lookup parameters in a database. An example of such a method is illustrated in FIG. 26. In this example method 2514, the shape and orientation of the grip event determined in step 2512 of method 2500 is used as search criteria for identifying a closest match within a database or data table for the current user, step 3141. When a closest match to the input grip event parameters is identified, the mobile device may retrieve coordinates or shape parameters from the database in step 3142 that will enable the device to estimate the concealed area of the display by performing steps 2516 to 2528 of method 2500.

Figure 27:
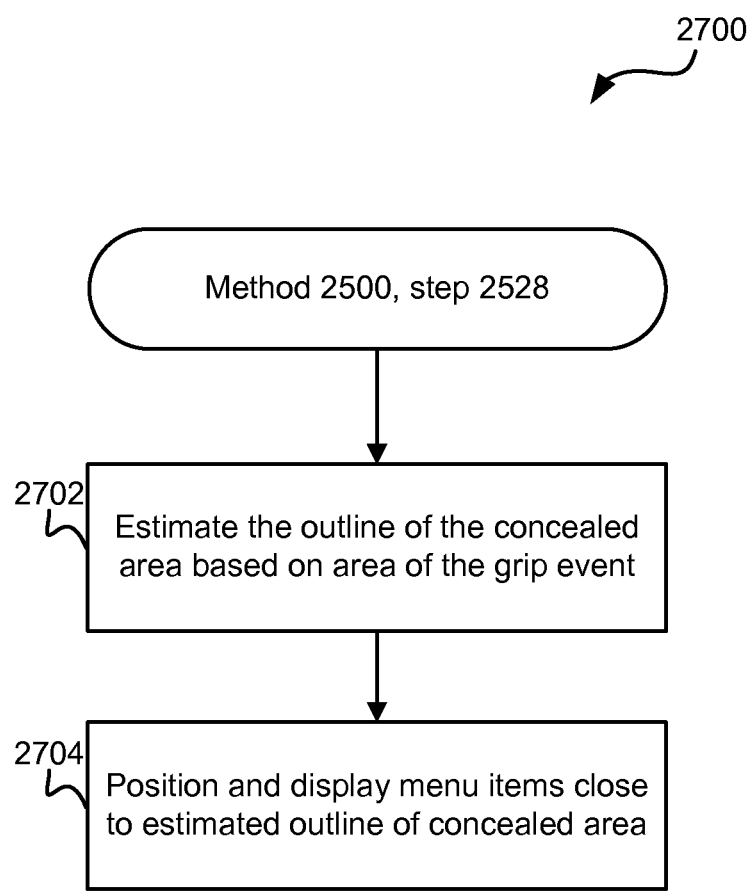
FIG. 27 is a process flow diagram of an embodiment method for positioning menu icons in close to the estimated outline of a user's finger.

FIG. 27 illustrates an embodiment method 2700 that may be executed by a processor of a mobile device for positioning and displaying a menu icon 230 around the estimated outline of the concealed area as described above with reference to FIG. 11. Once the display is regenerated based upon the adjusted content display as described in method 2500, step 2528, the mobile device may estimate the outline of the concealed area (such as the outline of the user's finger 200 as viewed by the user) based on the location, area, shape and orientation of the grip event in step 2702. In step 2704, the mobile device may reposition and display menu icons close to the estimated concealed area.

Figure 28:
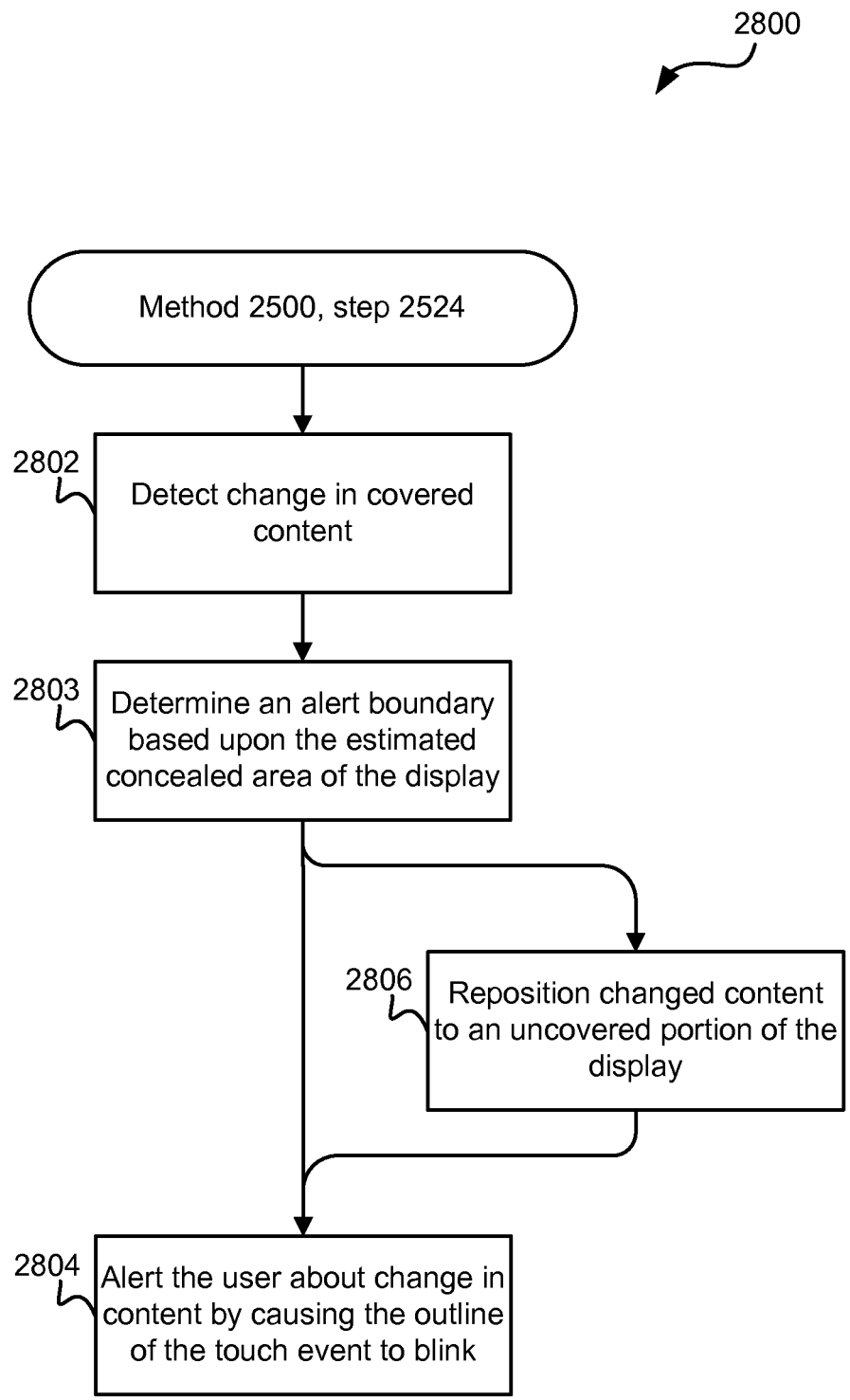
FIG. 28 is a process flow diagram of an embodiment method for alerting the user about change in displayed contents that are concealed by a user's grip.

FIG. 28 illustrates an embodiment method 3000 that may be executed by a processor of a mobile device for alerting users about a change in a display content that is covered by a grip event. Once the area and orientation of the grip event is determined and the content within the covered tiles is identified in method 2500, step 2524, the mobile device may detect a change in the content that is within the concealed area 208 in step 2802. In step 2802, the mobile device may determine an alert boundary on the display based upon the determined concealed area of the display in step 2514 of method 2500. In an embodiment, the alert boundary may be a line that is just beyond the concealed area so that the user can see it but the alert will not interfere with a substantial portion of the remainder of the displayed content. The mobile device may alert the user that a change in covered displayed content has occurred by causing the alert boundary to blink, glow or otherwise exhibit a visual indication. An auditory alert may also be used for alerting the user about changes in the displayed covered contents.

Alternatively, when the mobile device determines that there has been a change in concealed content, the mobile device may reposition the concealed content to an uncovered portion of the display in optional step 2806. For example, if the changing concealed content is a menu icon, the menu icon may be repositioned closely about the contour of the estimated concealed area, such as illustrated in FIG. 11. As part of this alternative embodiment, the mobile device may also alert the user about the change in the display content by visual or auditory, step 2804. In an embodiment, the user may configure the mobile device, such as with the user preference setting, generate the alert (step 2804), reposition the changed content (step 2006), or both.

In various embodiments, users can calibrate a mobile device in a training routine to more accurately estimate the area covered by a user's hand based upon the detected location, size, shape and orientation of the detected grip event. Parameters or factors determined by such a training routine may be stored in a database or data table associated with each user so that the outline of the covered area can be estimated by applying the measured location, size, shape and orientation of the detected grip event. In such a training routine, the mobile device may prompt the user to press the touchscreen at a particular location, receive the resulting grip event size, shape and orientation, estimate the area blocked by the user's hand based on the grip event measurements and default or the user's parameters, display an image of the estimated blocked area, receive user feedback regarding the fit of the area, and adjust the user's parameters based on the feedback.

Figure 29:
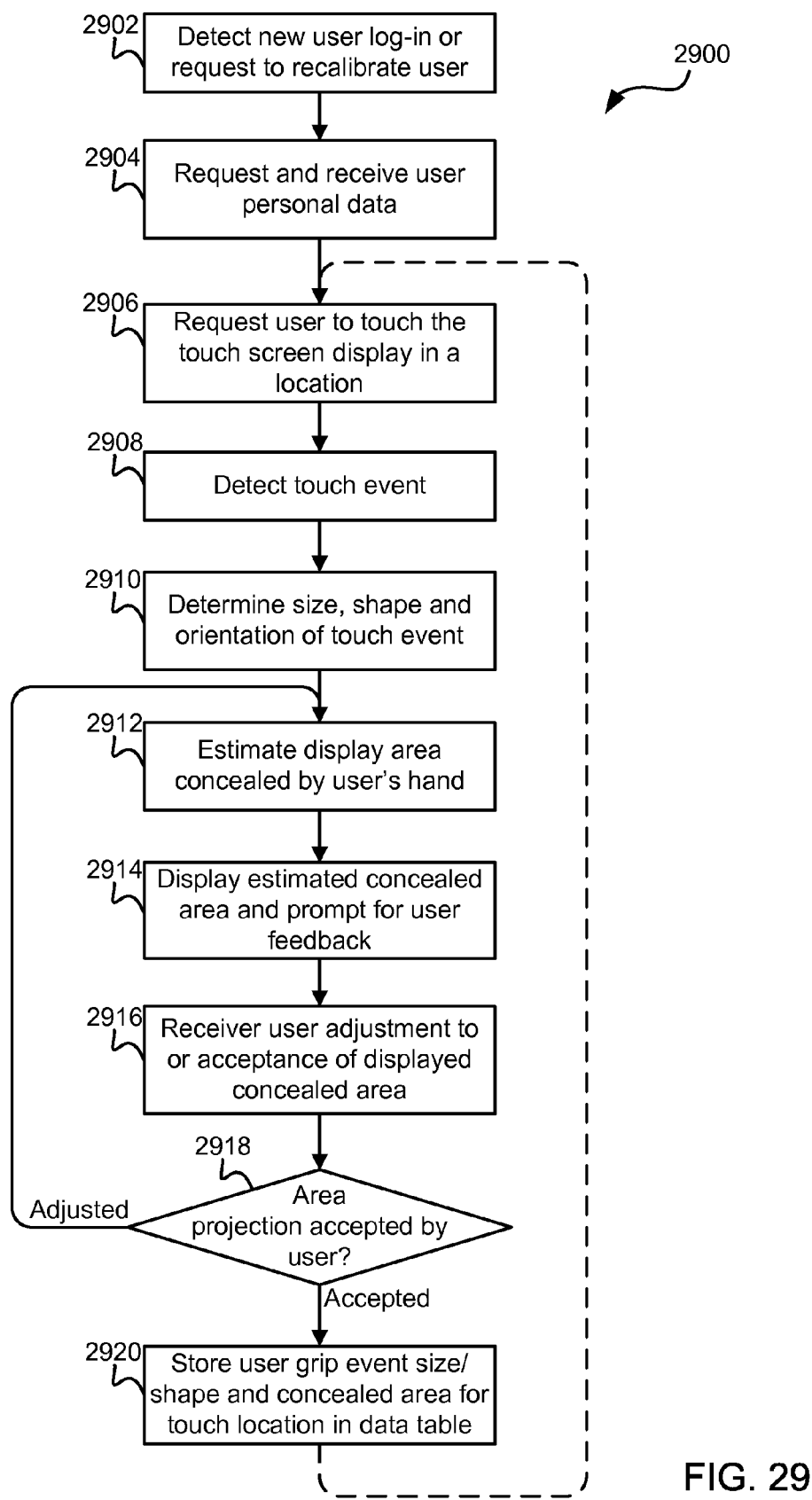
FIG. 29 is a process flow diagram of an embodiment method for storing user specific grip event parameters.

FIG. 29 illustrates an embodiment training routine method 2900 that may be executed by a processor of a mobile device for calibrating and storing user grip event parameters. In method 2900 in step 2902, the mobile device may detect a new user log-in or a request to recalibrate a user's settings. In step 2904, the mobile device may display a user input interface that requests and receives user identifier information, such as the user's name. In step 2906, we mobile device 100 may display a prompt requesting the user to touch the touchscreen display 110 at designated locations. In step 2908, the mobile device may detect a touch event in the vicinity of the indicated look location, and analyze the detected touch event to determine the size, shape and orientation of the touch event in step 2910. In step 2912, the mobile device may estimate the display area covered by the user's hand based upon the determined location, size, shape and orientation of the touch event. This estimation of the concealed area may use an anatomical model or default a parameter is the first time a measurement is obtained for particular user and a particular location on the touchscreen. Thereafter, results from prior calibration measurements may be used to estimate the concealed area in step 2912. In step 2914, the mobile device may display an image or shape encompassing the estimated concealed area, and generate a prompt requesting the user to indicate whether the concealed area is accurately determined. Such a display of the estimated concealed area and opportunity for user input enables the user to indicate whether the area should be expanded or contracted based upon the user's view of the display, which the mobile device receives in step 2916. If the displayed estimated concealed area extends beyond the user's finger so the user can view it, the user may push the boundaries of the display area that using a second finger to touch the boundaries on the touchscreen. If the displayed estimated concealed area does not encompass the entire area locked by the user's hand, the user may drag the boundary out to the edge of the user's finger as used by the user with another finger. In determination step 2918, the mobile device may determine whether the user input accepted or adjusted the boundary of the estimated concealed area. If the user adjusted the estimated concealed area boundary (i.e., determination step 2918="adjusted"), the mobile device may return to step 2912 to reach estimate the concealed area and generate an updated display of that estimated concealed area in step 2914. Once the user is satisfied that the displayed estimated concealed area acceptably matches the area blocked by the user's hand (i.e., determination step 2918="accepted"), the mobile device may store the parameters defining the estimated concealed area (e.g., coordinates, algorithm factors, pixels, etc.) along with the measured grip event parameters (i.e., location, size, shape and orientation) in a database or data table corresponding to the user is in step 2920. In this manner, the user can fit the estimated concealed area to the actual concealed area and observed by the user for a particular grip location. This training process may, optionally, continue with the mobile device returning to step 2906 to request the user to grip the touchscreen in another location. Repeating the training process for a number of grip locations may allow the mobile device to build up a database to enable it to estimate the area covered by a user's hand based upon the grip event information (location, size, shape and orientation) for grip events anywhere on the touchscreen display. Also, repeating the process for numerous closely spaced locations may enable the mobile device to develop a statistically averaged model of the user's hand that accounts for normal variability in hand and finger placements. The training routine may continue until all grip locations have been calibrated, a maximum number of calibrations have been achieved, the user does not adjust the estimated concealed area for three or more locations (indicating that the database model is sufficiently refined) or the user chooses to end the training session by commanding the routine to exit (not shown).

As part of a training routine, the mobile device may prompt the user to touch the touchscreen display at the user's preferred grip location, rather than specifying a particular location touch in step 2906. The training routine may proceed as described above, and when the estimated concealed area is accepted by the user (i.e., determination step 2918="accepted"), the mobile device may store the estimated concealed area as the user's preferred grip location in the same database or data table. In this manner, the user can train the device for the user's preferred grip location, so that the device can subsequently present an outline of the preferred grip location to the user as described above with reference to FIG. 24.

Figure 30:
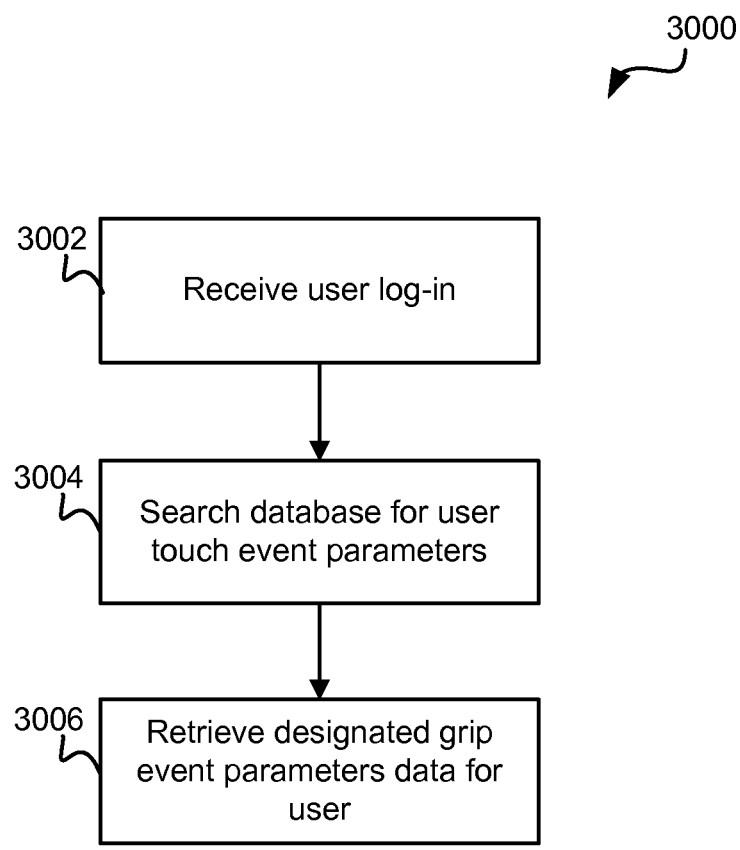

FIG. 30 illustrates an embodiment method 3000 that may be executed by a processor of a mobile device for retrieving a user's grip event parameters based on the user's log-in information. The mobile device may receive a user log-in information in step 3002, and use the login information to search for the user's grip event and concealed area estimating parameters in a database in step 3004. The mobile device may retrieve the user's grip event and concealed area estimating parameters from the database in step 3006.

Figure 31:
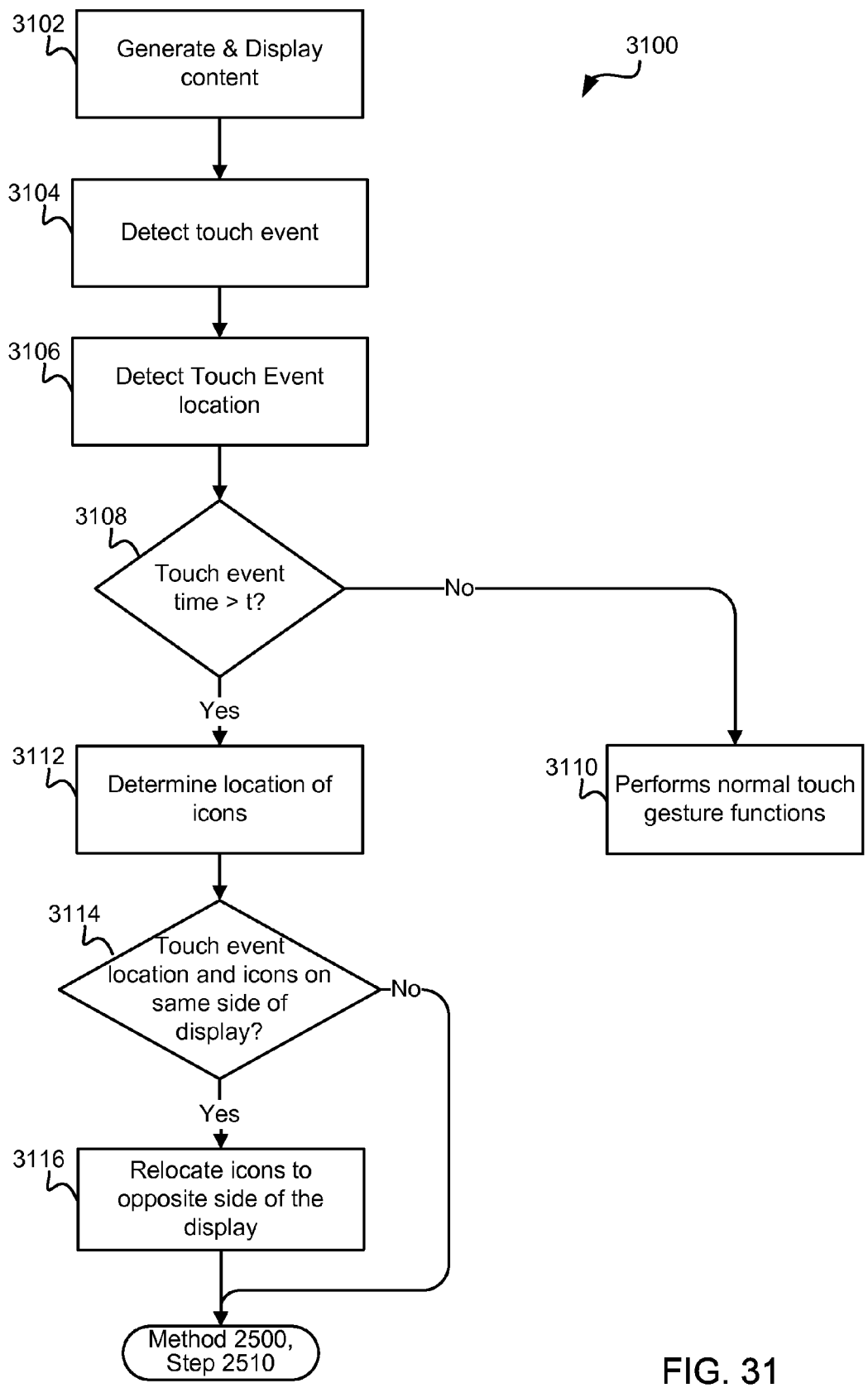
FIG. 31 is a process flow diagram of an embodiment method for relocating icons based on the grip event location.

FIG. 31 illustrates an embodiment method 3100 that may be executed by a processor of a mobile device for moving menu icons away from a grip event. A mobile device may generate and display content on the touchscreen display in step 3102. In step 3104, the mobile device may detect a touch event, and determine the touch event's location in step 3106. The mobile device may recognize the event as a grip event by determining whether the touch event remains at the same location on the touchscreen for a threshold duration "t" in determination step 3108. If the touch event remains in contact with the touchscreen display 110 at the same location for less than the threshold duration (i.e., determination step 3108="No"), the mobile device may respond to the touch event as a normal touch gesture in step 3110. If the touch event remains in contact with the touchscreen display at the same location for the threshold duration or longer (i.e., determination step 3108="Yes"), the mobile device 100 may treat it as a grip event, and determine the location of menu icons on the presentation display in step 3112. The mobile device may determine whether the locations of the grip event and menu icons are on the same side of the touchscreen display in determination step 3114. If the grip event and menu icons are located on the same side of the touchscreen display (i.e., determination step 3114="Yes"), the mobile device may relocate the menu icons to the opposite side of the display in step 3116, and proceed with step 2510 in method 2500 as described above. If the location of the grip event and menu icons are not on the same side of the touchscreen display (i.e., determination step 3114="No"), the mobile device may proceed with step 2510 in method 2500 as described above.

Figure 32:
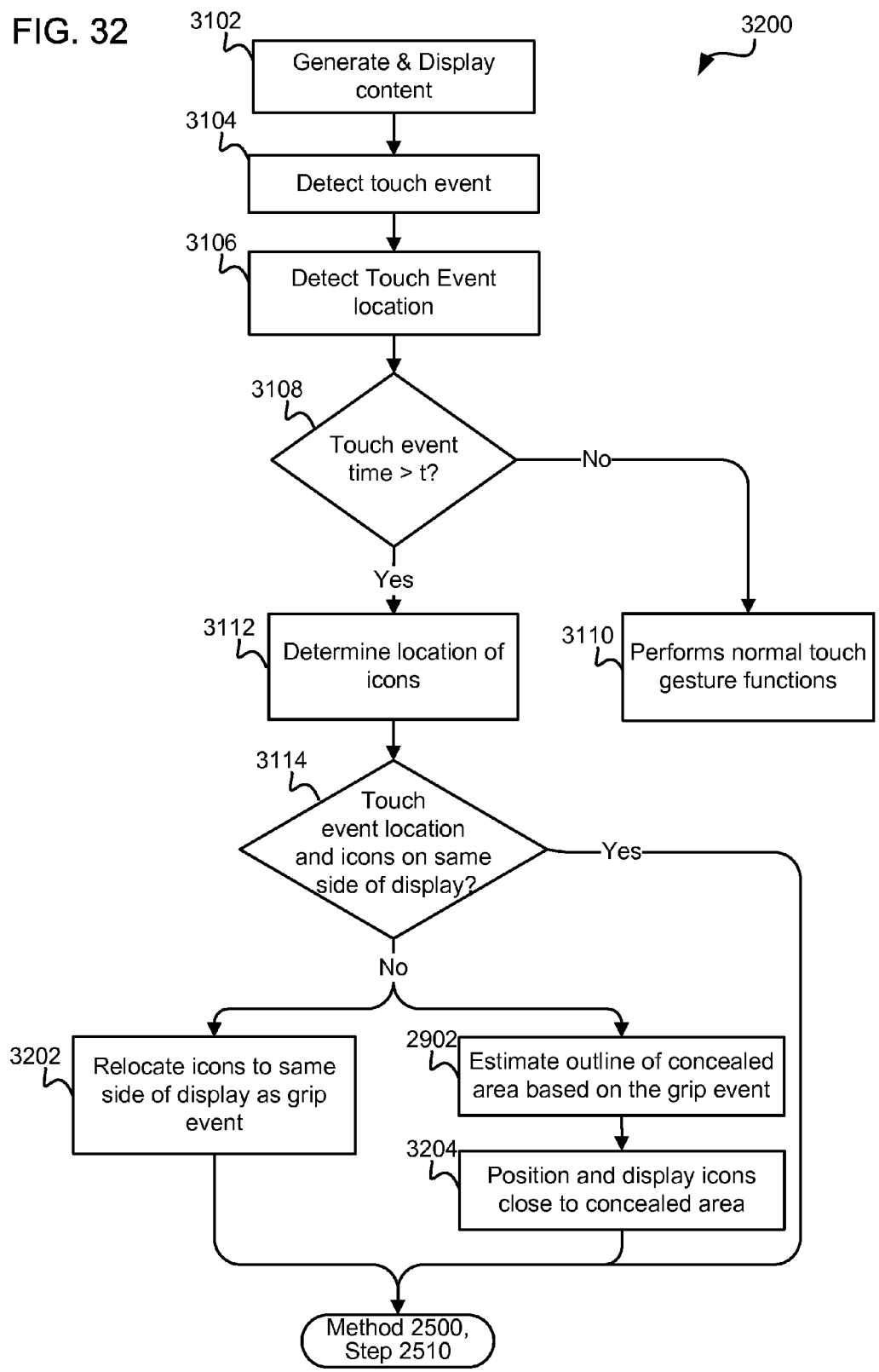
FIG. 32 is a process flow diagram of another embodiment method for relocating icons based on the grip event location.

FIG. 32 illustrates an embodiment method 3400 that may be executed by a processor of a mobile device for relocating menu icons to the same side of the touchscreen display 110 as the grip event. A mobile device may generate and display content on the touchscreen display in step 3102. In step 3104, the mobile device may detect a touch event, and determine the touch event's location in step 3106. The mobile device may recognize the event as a grip event by determining whether the touch event remains at the same location on the touchscreen for a threshold duration "t" in determination step 3108. If the touch event remains in contact with the touchscreen display 110 at the same location for less than the threshold duration (i.e., determination step 3108="No"), the mobile device may respond to the touch event as a normal touch gesture in step 3110. If the touch event remains in contact with the touchscreen display at the same location for the threshold duration or longer (i.e., determination step 3108="Yes"), the mobile device 100 may treat it as a grip event, and determine the location of menu icons on the presentation display in step 3112. The mobile device may determine whether the locations of the grip event and menu icons are on the same side of the touchscreen display in determination step 3114. If the grip event and the icons are located on the same side of the touchscreen display (i.e., determination step 3114="Yes"), the mobile device may proceed with step 2510 in method 2500 as described above. If the grip event and the icons' 246 are located on opposite sides of the touchscreen display (i.e., determination step 3114="No"), the mobile device 100 may relocate the icons to the side of the touchscreen display 110 on which the grip event is located in step 3202, before or after proceeding with step 2510 in method 2500 as described above.

Alternatively, if the grip event and the icons are located on opposite sides of the touchscreen display (i.e., determination step 3114="No"), the mobile device may estimate the outline of the concealed area based on the location, size and orientation of the grip event in step 2902, and reposition the icons close to the estimated outline of the concealed area in step 3204, before or after proceeding with step 2510 in method 2500 as described above. In a further embodiment, a user may specify a preferred location for icons moved in response to the detection of a grip event, such as by means of a user preference setting.

Figure 33:
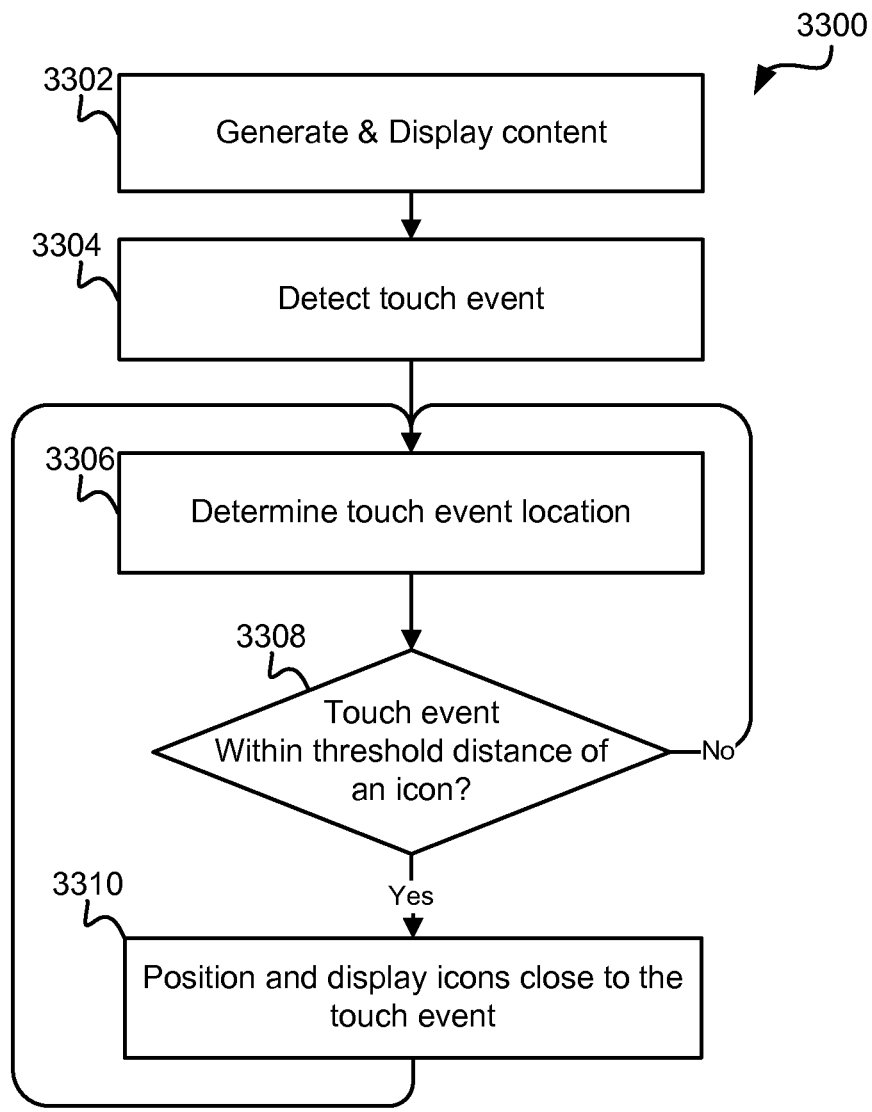
FIG. 33 is a process flow diagram of an embodiment method for positioning icons close to a user's finger as the touch event moves across the touchscreen surface.

FIG. 33 illustrates embodiment method 3500 that may be executed by a processor of a mobile device for positioning icons close to a touch event as a finger 200 moves across the touchscreen display. The mobile device may generate and display content in step 3302 and detect a touch event in step 3304. The mobile device may detect a touch event in step 3304 and begin tracking its location in step 3306. While tracking the location of the touch event, the mobile device may determine whether the touch event comes within a threshold distance of an icon in determination step 3308. If the touch event location does not come within the threshold distance of an icon (i.e., determination step 3308="No"), the mobile device may continue to track the location of the touch event, returning to step 3306. If the touch event comes within the threshold distance of an icon (i.e., determination step 3308="Yes"), the mobile device may reposition the icon close to the current position of the touch event in step 3310 step 3404. In this manner, user can gather up selected menu icons on the display by tracing a continuous touch event has a comes close to or passes over the selected icons. As each icon eight is approached within the threshold distance, it will stick to the touch event and continue to follow it. This process may continue until the user lifts a finger from the touchscreen display or stops moving the user's finger. If the user lifts the finger from the touchscreen, the icons may return to their original position, as such as after a predetermined delay. If the user leaves the finger in the same location for a threshold duration, the mobile device may determine that it is a grip event and proceed with processing of the various embodiments, such as executing method 2500 described above with reference to FIG. 25.

Figure 34:
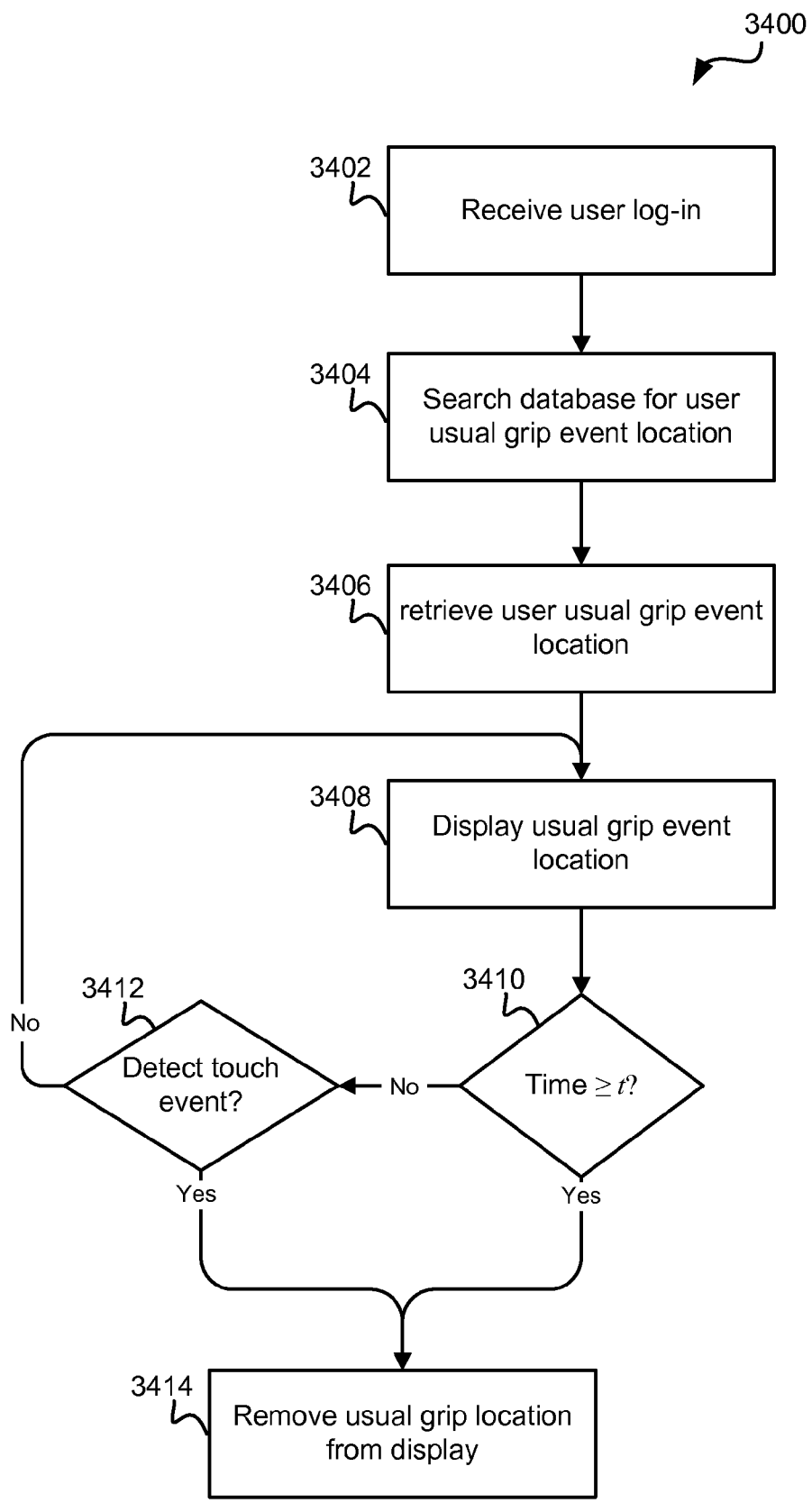
FIG. 34 is a process flow diagram of an embodiment method for displaying a usual grip location of a user.

Each user may grip a mobile device touchscreen display in a unique manner. For example, a user may grip the mobile device with a thumb on the lower left hand corner of a touchscreen display. A mobile device may store in a database one or more locations on the touchscreen display at which a user usually grips the device. FIG. 34 illustrates an embodiment method 3400 that may be executed by a processor of a mobile device for displaying a user's preferred grip location on the touchscreen display. A mobile device may receive a user's log-in information in step 3402, such as from the user clicking on a user identifier menu, such as illustrated in FIG. 23. Using the user identification, the mobile device may retrieve the user's usual grip location from a database in step 3404. As mentioned above with reference to FIG. 29, users may use the training routine to inform the mobile device of their preferred location. Alternatively, the mobile device may determine the user's usual grip location by averaging the user's grip locations over time. The mobile device may retrieve the user's usual grip location from the database in step 3406, and display the preferred grip location in step 3408. The mobile device may continue to display the preferred grip location for a predetermined period of time "t," such as by starting a clock and determining whether the clock has expired in determination step 3410. If the clock has not expired (i.e., determination step 3410="no"), the mobile device may determine whether a grip event is detected in determination step 3412. If a grip event is not detected (i.e., determination step 3412="No"), the mobile device may continue to display the usual grip event location on the touchscreen display, returning to step 3408. If a grip event is detected (i.e., determination step 3412="Yes"), the mobile device may clear the preferred grip location indication from the display in step 3414 since the indication is no longer necessary. Similarly, when the clock expires (i.e., determination step 3410="Yes"), the mobile device may remove the preferred grip location indication from the display in step 3414.

Figure 35:
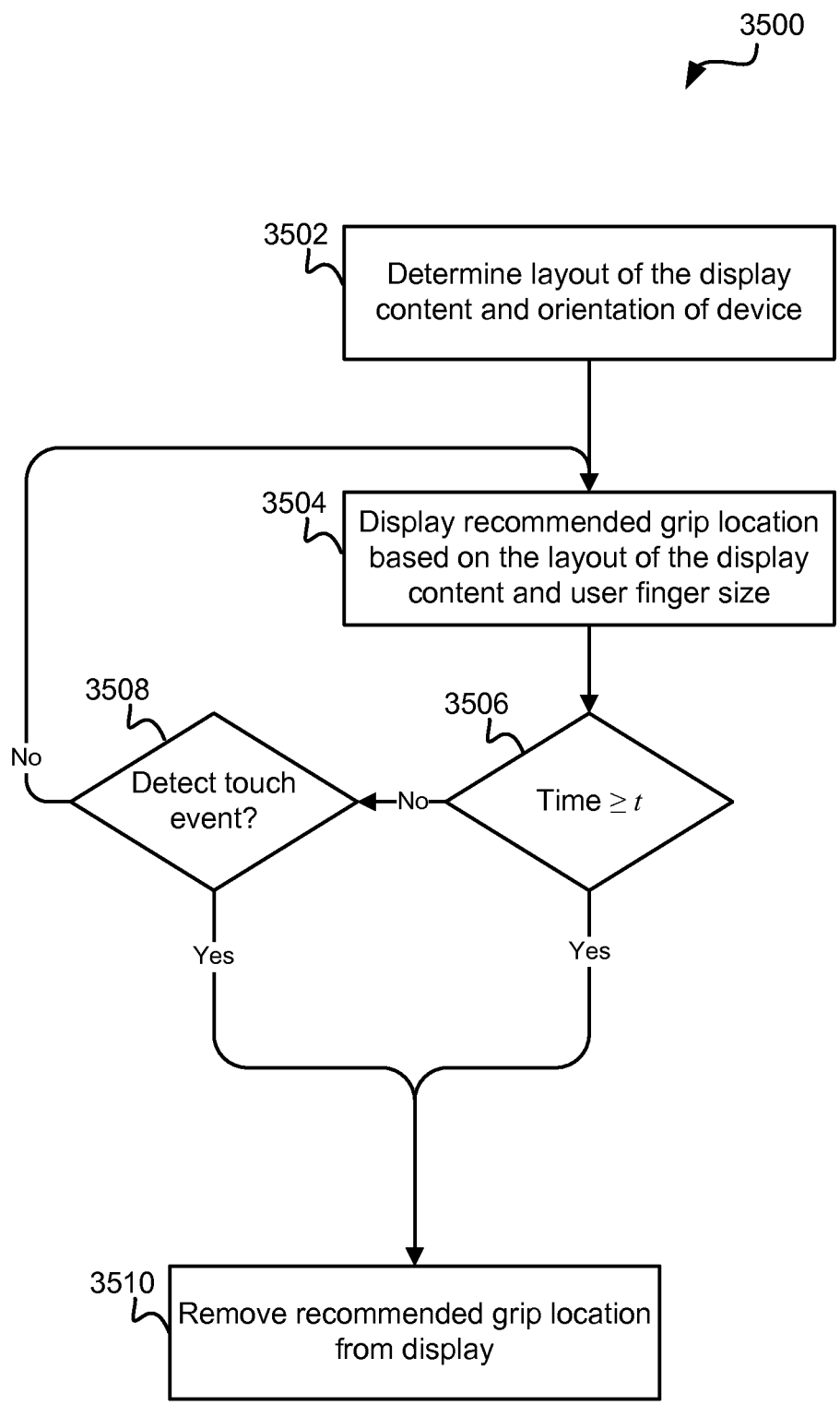
FIG. 35 is a process flow diagram of an embodiment method for suggesting a grip location based on a layout of the displayed content.

FIG. 35 illustrates an embodiment method 3500 that may be executed by a processor of a mobile device for suggesting to users a recommended location for gripping the display based upon the displayed content. A mobile device 100 may analyze the displayed content including assessing the layout of the content as it appears on the touchscreen in step 3502. Based upon the layout of the display content, the mobile device may determine a recommended location for the user to grip the mobile device via the touchscreen in step 3504. This determination may be based upon the size of the user's thumb or fingers that typically grip the mobile device, which may be a primer stored within a data table of the device. By overlaying the size of concealed area associated with the user's typical grip event, the mobile device may identify one or more locations which will require the least amount of modifications and adjustments or distortions to the display presentation. For example, if the displayed content is a webpage on which there are areas of insignificant or invariant content (e.g., legal fine print, logos, banners, static shapes, etc.), the mobile device may determine that the user's grip may be positioned on such materials without the need to reposition concealed content on the display. This determination may also take into account the nature of the content that would be concealed by the user's grip in particular locations and the ease by which the content can be repositioned. For example, a text file may be easy to reposition sense of the text can scroll up or down beyond the margins of the display, while a photograph is not so easy to reposition without distorting the image. Once the recommended grip location is determined, the mobile device may display an outline of the location as part of step 3504. The mobile device may continue to display the recommended grip location for a predetermined period of time "t," such as by starting a clock and determining whether the clock has expired in determination step 3506. If the clock has not expired (i.e., determination step 3506="no"), the mobile device may determine whether a grip event is detected in determination step 3508. If a grip event is not detected (i.e., determination step 3508="No"), the mobile device may continue to display the recommended grip location on the touchscreen display, returning to step 3504. If a grip event is detected (i.e., determination step 3508="Yes"), the mobile device may clear the recommended grip location indication from the display in step 3510 since the indication is no longer necessary. Similarly, when the clock expires (i.e., determination step 3504="Yes"), the mobile device may remove the recommended grip location indication from the display in step 3510.

Figure 36:
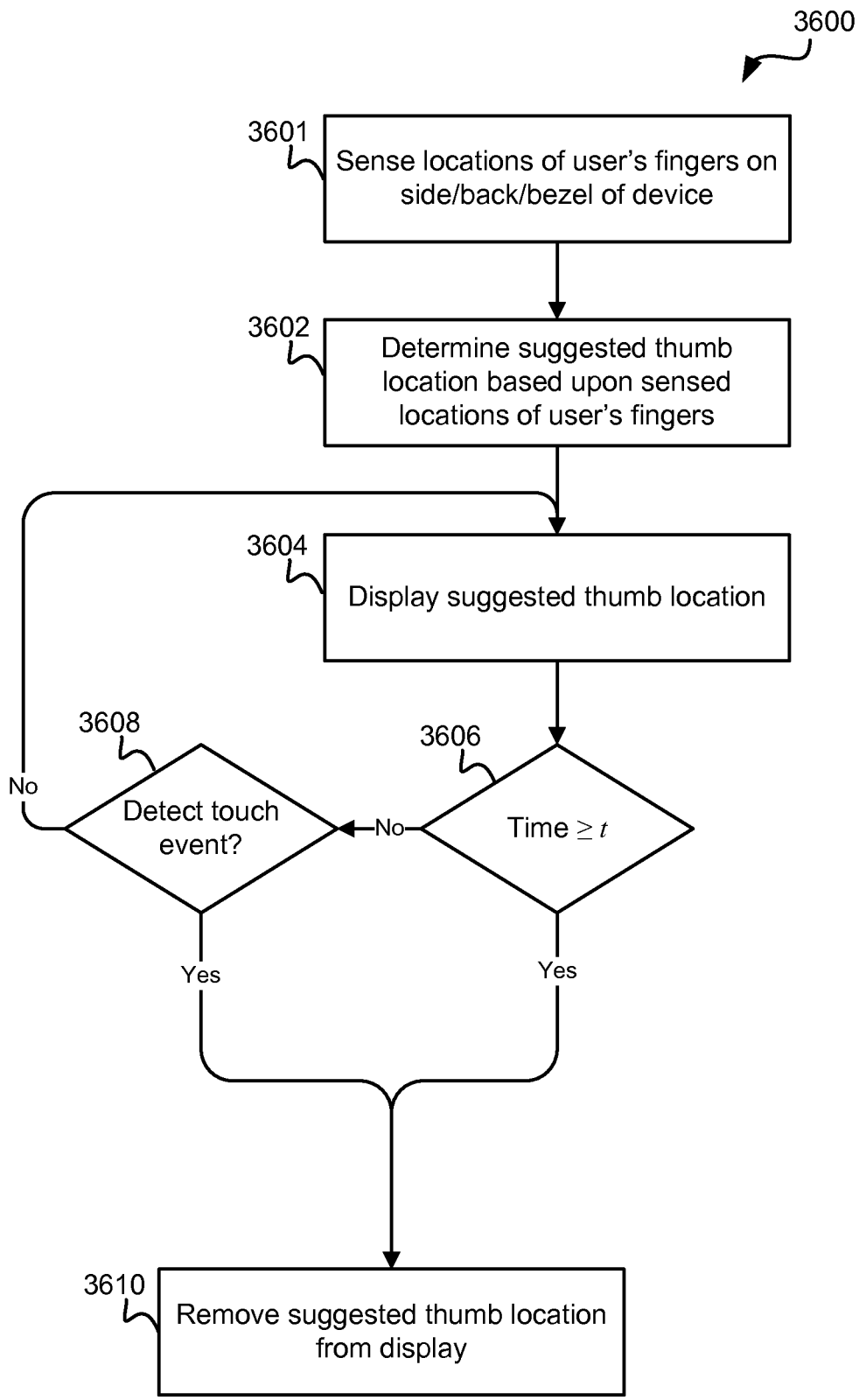
FIG. 36 is a process flow diagram of an embodiment method for suggesting a grip location based on sensed positions of the user's fingers on a portion of the mobile device other than the touchscreen display.

FIG. 36 illustrates an embodiment method 3600 that may be executed by a processor of a mobile device for suggesting a grip location based on sensed positions of the user's fingers on a portion of the mobile device other than the touchscreen display. In method 3600 in step 3601, the mobile device 100 equipped with a touch sensor other than the touchscreen display (e.g., a capacitance sensor on a back surface of the device) may sense locations of a user's fingers and hand on the side, back, bezel or other portion of the device that is not part of the touch screen display. In step 3602, the mobile device may analyze the sensed positions of the user's fingers in order to determine a suggested thumb location consistent with the user's hand position. This determination may be based upon an anatomical model of a typical user's hand, user preference settings, or saved user hand dimensional parameters, such as may be determined in a training routine, such as similar to that described above with reference to FIG. 29. As mentioned above, in step 3601, the mobile device may recognize each user's finger based upon their order in a series of touches, such as by determining the vertical direction of the device (e.g., by use of an accelerometer which senses the gravity vector), and assuming the first finger touch from the top of the device is the index finger, the second finger touch from the top of the device is the middle finger, and so forth. In step 3604, the mobile device may display the determined suggested thumb location on the touchscreen display, such as in the form of a dashed outline or shaded portion of the display. The mobile device may continue to display the suggested thumb location for a predetermined period of time "t," such as by starting a clock and determining whether the clock has expired in determination step 3606. If the clock has not expired (i.e., determination step 3606="No"), the mobile device may determine whether a grip event is detected in determination step 3608. If a grip event is not detected (i.e., determination step 3608="No"), the mobile device may continue to display the suggested thumb location on the touchscreen display, returning to step 3604. If a grip event is detected (i.e., determination step 3608="Yes"), the mobile device may clear the suggested thumb location indication from the display in step 3610 since the indication is no longer necessary. Similarly, when the clock expires (i.e., determination step 3604="Yes"), the mobile device may remove the suggested thumb location indication from the display in step 3610.

In a further embodiment, a mobile device may determine from the layout of the displayed content and the grip location that there are multiple adjusted display options, and provide a user with an opportunity to select one of the multiple alternatives. In this embodiment, a computed least disruptive option may be displayed briefly, followed by one or more alternate adjusted display configuration displays. A user input may be received, such as a shifting of a finger in a rolling motion (e.g., towards the direction of a desired option) to enable the user to indicate a preferred adjusted display configuration. If no user selection is received, the mobile device may select a default alternative, such as the alternative computed as being least disruptive. In an embodiment, the alternative display adjustments may be presented in order of computed disruption to the presentation display, such as from least disruptive to the most disruptive. In such an embodiment, the first displayed alternative, which is calculated to be the least disruptive, may be selected as the default in the event the user fails to indicate a preference.

Figure 37:
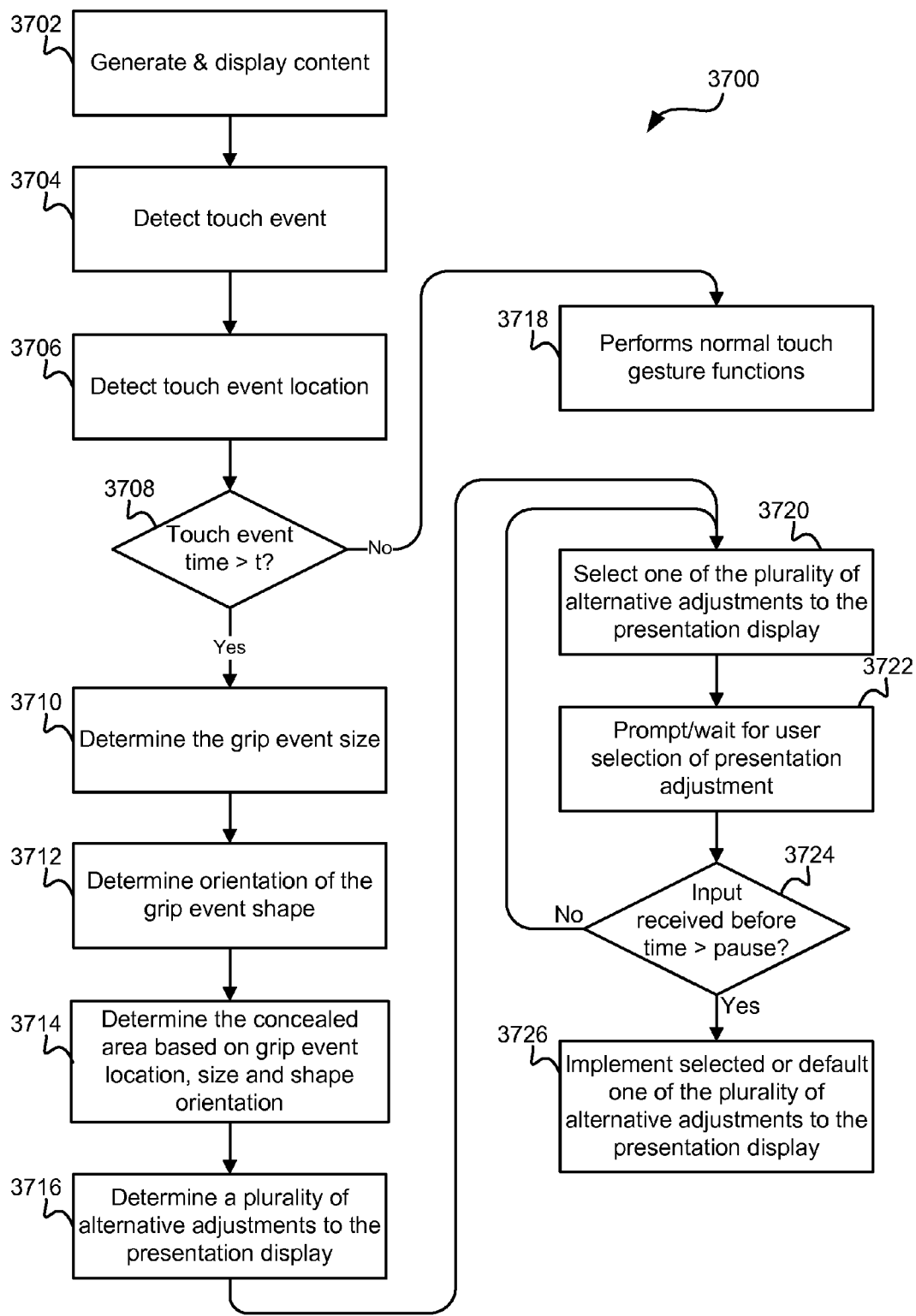
FIG. 37 is a process flow diagram of an embodiment method displaying alternative adjustments to the presentation display so as to enable a user to select a preferred alternative adjustment.

An example embodiment method 3700 for presenting the user with a number of alternative display adjustment options is a shown in FIG. 37. In method 3700 in step 3702, the mobile device may generate and display content to the user. When a user touches the touchscreen display, the mobile device may detect the touch event, step 3704, and the touch event location, step 3706. The mobile device may recognize a grip event by determining whether the touch event remains in contact with the touchscreen display at the same location for a predetermined threshold duration "t" in determination step 3708. If the touch event remains in contact with the touchscreen display for less than the threshold duration (i.e., determination step 3708="No"), the mobile device may implement the normal touch gesture functionality in step 3718.

If the touch event remains in contact with the touchscreen display longer than the threshold duration (i.e., determination step 3708="Yes"), the mobile device may treat the event as a grip event and determine the grip event size (i.e., the area of the on-class contact), step 3710, and the shape and orientation of the grip event, step 3712. In determining the orientation of the grip event in step 3712, the mobile device may analyze the shape of the touchscreen area contacted by the user's finger to determine the long and short axes of the shape, the relative orientation of the shape's long axis and, optionally, a measure of the degree to which the shape is asymmetrical (e.g., teardrop or oval in shape). In step 3714, the mobile device may determine the location, size, shape and orientation of the touch event, as well as the displayed content, to determine the concealed area and concealed content.

In step 3716, the mobile device may analyze the displayed and concealed content, as well as the location and orientation of the concealed content to determine a plurality of alternative adjustments to the presentation display that could be made based upon a layout of the displayed content and the determining displayed content that is concealed by the user's hand. The determination of the alternative presentation display adjustments may utilize any of the embodiments described herein. For example, the mobile device might determine that a first alternative may be to reposition text and graphics within covered tiles to adjacent uncovered tiles, a second alternative may involve reducing the size of the displayed content (or reducing the font size in the case of a text content) so that all displayed content fits within the uncovered portion of the display, a third alternative may involve distorting the display using image processing algorithms, a fourth alternative may involve adjusting margins in a text document while allowing text to scroll beyond the top and/or bottom of the display, while a fifth alternative may involve leaving the display image as is but indicating when the concealed portion of the image changes, such as with a flashing outline surrounding the user's thumb.

With a plurality of alternative adjustments determined, the mobile device may sequentially implement each of the determined plurality of alternative adjustments to the presentation display, such as by selecting and implementing one of the plurality of alternative adjustments in step 3720. In step 3722, the mobile device may implement the selected one of the plurality of alternative adjustments for a period of time to enable a user to implement a user interface gesture to select the display alternative. As part of this step, the mobile device may display a prompt inviting the user to perform a recognizable gesture to indicate selection of the displayed alternative adjustment. As an example, the mobile device may be configured to recognize a rolling of the user's thumb in a particular direction as indicating selection of the current alternative display adjustment.

In determination step 3724, the mobile device may determine whether a user input has been received before a predefined pause duration has expired. If no user input was received before the predetermined pause duration expired (i.e., determination step 3724="No"), the mobile device may return to step 3720 to select a next one of the plurality of alternative adjustments to the presentation display. When a user input is received before the predetermined pause duration expires (i.e., determination step 3724="Yes"), the mobile device may implement the selected one of the plurality of alternative adjustments to presentation display in step 3726.

The process of sequentially displaying each of the plurality of alternative adjustments in steps 3720 through 3724 may continue for a period of time, including more than one cycle through all of the alternatives in order to enable a user to evaluate all of the different alternative display adjustments. However, if no input is received after a predetermined time or number of cycles through the plurality of alternatives, the mobile device may be configured to select a default one of the plurality of alternative adjustments in step 3726. As mentioned above, the default alternative may be the alternative which is computed by the mobile device to involve the least amount of disruption or change to the presentation display. Also as mentioned above, the order in which each of the plurality of alternative adjustments to the presentation display are selected may be based upon the computed degree to which each alternative distorts the presentation display, such as beginning with the least disruptive alternative and ending with the most disruptive alternative.

Figure 38:
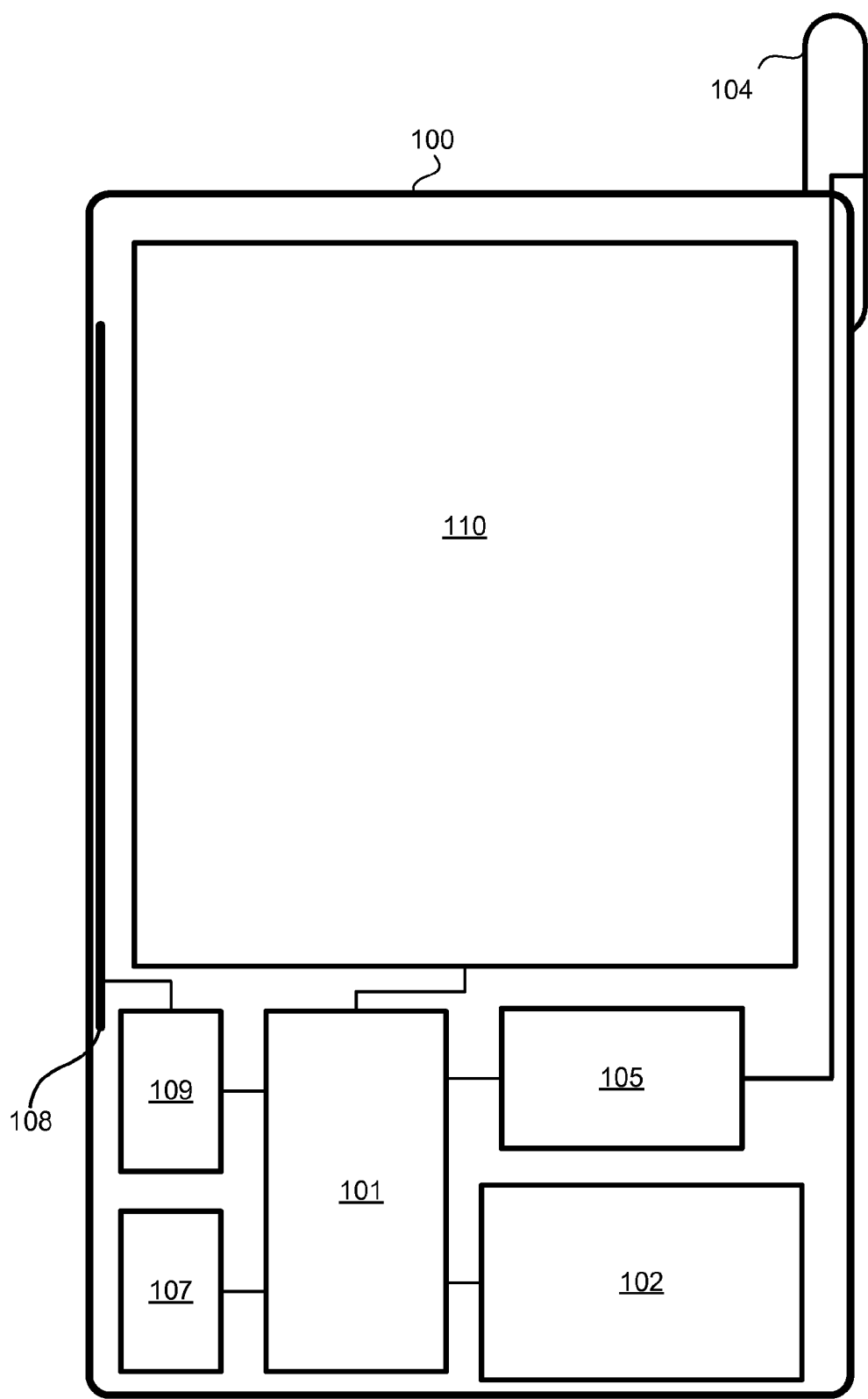
FIG. 38 is a component block diagram of a mobile device suitable for implementing the various embodiments.

Typical mobile devices 100 suitable for use with the various aspects will have in common the components illustrated in FIG. 38. For example, an exemplary mobile device 100 may include a processor 101 coupled to internal memory 102 and a touchscreen display 110. Additionally, the mobile device 100 may have an antenna 104 for sending and receiving electromagnetic radiation that is connected to a wireless data link and/or cellular telephone transceiver 105 coupled to the processor 101. Some mobile devices 100 may also include an accelerometer 107 coupled to the processor 101 configured to enable the processor 101 to determine the horizontal versus vertical orientation of the mobile device 100 by sensing the gravity gradient.

In an embodiment, the mobile device 100 may further include a touch sensor 108 separate from the touchscreen display 110, which is coupled to the processor 101, such as via a touch sensor processing circuit 109, and positioned on or near a case of the mobile device 100 and. Such a touch sensor 108 may be a differential capacitance sensor, differential inductance sensor, thermal sensor, pressure sensor, ultrasound vibrations sensor, or any other sensor capable of detecting the touch of a user's hand and/or fingers to the case. Such a touch sensor 108 may be positioned on the sides and back of the mobile device 100 case, as well as long the bezel surrounding the touchscreen display 110.

The mobile device processor 101 may be any programmable microprocessor, microcomputer or multiple processor chip or chips that can be configured by software instructions (applications) to perform a variety of functions, including the functions of the various aspects described herein. In some mobile devices, multiple processors 101 may be provided, such as one processor dedicated to wireless communication functions and one processor dedicated to running other applications. Typically, software applications may be stored in the internal memory 102 before they are accessed and loaded into the processor 101. In some mobile devices, additional memory chips (e.g., a Secure Data (SD) card) may be plugged into the mobile device 100 and coupled to the processor 101. In many mobile devices, the internal memory 102 may be a volatile or nonvolatile memory, such as flash memory, or a mixture of both. For the purposes of this description, a general reference to memory refers to all memory accessible by the processor 101, including internal memory 102, removable memory plugged into the mobile device, and memory within the processor 101 itself.

The foregoing method descriptions and process flow diagrams are provided merely as illustrative examples and are not intended to require or imply that the steps of the various aspects must be performed in the order presented. As will be appreciated by one of skill in the art the order of steps in the foregoing aspects may be performed in any order. Further, references to step identifiers and words such as "thereafter," "then," "next," etc. are not intended to limit the order of the steps; such identifiers and words are simply used to guide the reader through the description of the methods.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a computer-readable medium. The steps of a method or algorithm disclosed herein may be embodied in a processor-executable software module executed which may reside on a computer-readable medium. Computer-readable media includes computer storage media that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a machine readable medium and/or computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the scope of the invention. Thus, the present invention is not intended to be limited to the aspects shown herein but is to be accorded the widest scope consistent with the principles and novel features disclosed herein.

What is claimed is:

1. A method for adjusting a presentation display on a mobile device equipped with a touchscreen display, comprising:
    detecting a grip event corresponding to a user touching the touchscreen display;
    determining displayed content that is concealed by the user's hand based on the grip event; and
    adjusting the presentation display to inform the user of the concealed displayed content by:
        determining a plurality of alternative adjustments to the presentation display based upon a layout of the displayed content and the concealed displayed content;
        sequentially implementing one of the determined plurality of alternative adjustments to the presentation display;
        detecting a user input indicating selection of one of the determined plurality of alternative adjustments to the presentation display; and
        implementing the selected one of the determined plurality of alternative adjustments to the presentation display.

2. The method of claim 1, wherein detecting a grip event comprises:
    determining when a touch event remains at a single location for a threshold duration;
    determining a location of the grip event on the touchscreen display;
    determining a shape of the grip event; and
    determining an orientation of the grip event based on the shape of the grip event.

3. The method of claim 2, wherein determining displayed content that is concealed by the user's hand based on the grip event comprises:
    estimating an area of the touchscreen display covered by the user's hand based on the determined grip event location, shape and orientation; and
    determining displayed content that is presented within the estimated area of the touchscreen display covered by the user's hand.

4. The method of claim 3, wherein estimating an area of the touchscreen display covered by the user's hand based on the determined grip event location, shape and orientation comprises applying the determined grip event location, shape and orientation to an algorithm configured to calculate an area of the display based on those parameters.

5. The method of claim 3, wherein estimating an area of the touchscreen display covered by the user's hand based on the determined grip event location, shape and orientation comprises using the determined grip event location, shape and orientation as search parameters for identifying a best match within a database stored in the mobile device.

6. The method of claim 3, determining displayed content that is presented within the estimated area of the touchscreen display covered by the user's hand comprises:
    segmenting the touchscreen display into a plurality of tiles;
    correlating the estimated area of the touchscreen display covered by the user's hand with the plurality of tiles to identify those tiles covered by the user's hand; and
    determining the content displayed in the identified covered tiles.

7. The method of claim 3, further comprising positioning display contents close to the estimated area of the touchscreen display covered by the user's hand.

8. The method of claim 3, further comprising positioning menu icons close to the estimated area of the touchscreen display covered by the user's hand.

9. The method of claim 2, wherein the threshold duration is no less than 2 seconds.

10. The method of claim 1, wherein adjusting the presentation display to inform the user of the concealed displayed content comprises repositioning the concealed displayed content to an uncovered portion of the touchscreen display.

11. The method of claim 10, wherein repositioning the concealed displayed content to an uncovered portion of the touchscreen display comprises adjusting the presentation display to fit the concealed content into the uncovered portion of the touchscreen display.

12. The method of claim 11, wherein adjusting the presentation display to fit the concealed content into the uncovered portion of the touchscreen display is limited so that text is not presented in a font size less than a predefined minimum.

13. The method of claim 10, wherein repositioning the concealed displayed content to an uncovered portion of the touchscreen display comprises distorting the presentation display so that the concealed content appears with the uncovered portion of the touchscreen display.

14. The method of claim 1, wherein adjusting the presentation display to inform the user of the concealed displayed content comprises alerting the user to concealed displayed content that has changed.

15. The method of claim 14, wherein alerting the user to concealed displayed content that has changed comprises displaying an indication in the vicinity of the concealed area.

16. The method of claim 1, further comprising positioning menu icons on the display away from a location of the grip event.

17. The method of claim 1, further comprising:
identifying a user of the mobile device;
recalling a usual grip event location from a database on the mobile device; and
displaying the usual grip event location on the touchscreen display.

18. The method of claim 1, further comprising:
sensing locations of the user's fingers on a surface of the mobile device other than the touchscreen display;
determining a suggested grip location on the touchscreen display for gripping the mobile device based upon the sensed location of the user's fingers; and
displaying the suggested grip location on the touchscreen display.

19. The method of claim 18, wherein sensing locations of the user's fingers on a surface of the mobile device other than the touchscreen display comprises sensing locations of the user's fingers on the back surface of the mobile device.

20. The method of claim 1, further comprising:
analyzing displayed content to determine a recommended grip location on the touchscreen display for the grip event that would result in a least amount of repositioning or distortion of the displayed content; and
displaying the recommended grip location on the touchscreen display.

21. The method of claim 1, further comprising:
receiving an identifier of a user of the mobile device;
prompting the user to touch the touchscreen display at a point;
detecting the user's touch to the touchscreen display;
determining a size and shape of a grip event area corresponding to a portion of the touchscreen display contacted by the user's touch;
estimating an area of the display concealed from the user by the user's hand touching the touchscreen display;
displaying on the touchscreen display an indication of the estimated area concealed by the user's hand;
receiving user feedback regarding the displayed indication of the estimated area concealed by the user's hand; and
storing in a database on the mobile device parameters used for estimating the area concealed by the user's hand based on the determined size and shape of the grip event area.

22. The method of claim 1, wherein adjusting the presentation display includes adjusting a margin of the display in a vicinity of the grip event.

23. The method of claim 1, further comprising maintaining the adjusted presentation display for a predetermined duration after the user's hand is removed from touching the touchscreen display associated with the grip event.

24. A mobile device, comprising:
a front surface;
a back surface;
a touchscreen display disposed on the front surface;
a processor coupled to the touchscreen display; and
a memory coupled to the processor,
wherein the processor is configured with processor-executable instructions to perform operations comprising:
detecting a grip event corresponding to a user touching the touchscreen display;
determining displayed content that is concealed by the user's hand based on the grip event; and
adjusting the presentation display to inform the user of the concealed displayed content by:
determining a plurality of alternative adjustments to the presentation display based upon a layout of the displayed content and the concealed displayed content;
sequentially implementing one of the determined plurality of alternative adjustments to the presentation display;
detecting a user input indicating selection of one of the determined plurality of alternative adjustments to the presentation display; and
implementing the selected one of the determined plurality of alternative adjustments to the presentation display.

25. The mobile device of claim 24, wherein the processor is configured with processor-executable instructions such that detecting a grip event comprises:
determining when a touch event remains at a single location for a threshold duration;
determining a location of the grip event on the touchscreen display;
determining a shape of the grip event; and
determining an orientation of the grip event based on the shape of the grip event.

26. The mobile device of claim 25, wherein the processor is configured with processor-executable instructions such that determining displayed content that is concealed by the user's hand based on the grip event comprises:
estimating an area of the touchscreen display covered by the user's hand based on the determined grip event location, shape and orientation; and
determining displayed content that is presented within the estimated area of the touchscreen display covered by the user's hand.

27. The mobile device of claim 26, wherein the processor is configured with processor-executable instructions such that estimating an area of the touchscreen display covered by the user's hand based on the determined grip event location, shape and orientation comprises applying the determined grip event location, shape and orientation to an algorithm configured to calculate an area of the display based on those parameters.

28. The mobile device of claim 26, wherein the processor is configured with processor-executable instructions such that estimating an area of the touchscreen display covered by the user's hand based on the determined grip event location, shape and orientation comprises using the determined grip event location, shape and orientation as search parameters for identifying a best match within a database stored in the mobile device.

29. The mobile device of claim 26, wherein the processor is configured with processor-executable instructions such that determining displayed content that is presented within the estimated area of the touchscreen display covered by the user's hand comprises:
  segmenting the touchscreen display into a plurality of tiles;
  correlating the estimated area of the touchscreen display covered by the user's hand with the plurality of tiles to identify those tiles covered by the user's hand; and
  determining the content displayed in the identified covered tiles.

30. The mobile device of claim 26, wherein the processor is configured with processor-executable instructions to perform operations further comprising positioning display contents close to the estimated area of the touchscreen display covered by the user's hand.

31. The mobile device of claim 26, wherein the processor is configured with processor-executable instructions to perform operations further comprising positioning menu icons close to the estimated area of the touchscreen display covered by the user's hand.

32. The mobile device of claim 25, wherein the processor is configured with processor-executable instructions such that the threshold duration is no less than 2 seconds.

33. The mobile device of claim 24, wherein the processor is configured with processor-executable instructions such that adjusting the presentation display to inform the user of the concealed displayed content comprises repositioning the concealed displayed content to an uncovered portion of the touchscreen display.

34. The mobile device of claim 33, wherein the processor is configured with processor-executable instructions such that repositioning the concealed displayed content to an uncovered portion of the touchscreen display comprises adjusting the presentation display to fit the concealed content into the uncovered portion of the touchscreen display.

35. The mobile device of claim 34, wherein the processor is configured with processor-executable instructions such that adjusting the presentation display to fit the concealed content into the uncovered portion of the touchscreen display is limited so that text is not presented in a font size less than a predefined minimum.

36. The mobile device of claim 33, wherein the processor is configured with processor-executable instructions such that repositioning the concealed displayed content to an uncovered portion of the touchscreen display comprises distorting the presentation display so that the concealed content appears with the uncovered portion of the touchscreen display.

37. The mobile device of claim 24, wherein the processor is configured with processor-executable instructions such that adjusting the presentation display to inform the user of the concealed displayed content comprises alerting the user to concealed displayed content that has changed.

38. The mobile device of claim 37, wherein the processor is configured with processor-executable instructions such that alerting the user to concealed displayed content that has changed comprises displaying an indication in the vicinity of the concealed area.

39. The mobile device of claim 24, wherein the processor is configured with processor-executable instructions to perform operations further comprising positioning menu icons on the display away from a location of the grip event.

40. The mobile device of claim 24, wherein the processor is configured with processor-executable instructions to perform operations further comprising:
  identifying a user of the mobile device;
  recalling a usual grip event location from a database stored in the memory; and
  displaying the usual grip event location on the touchscreen display.

41. The mobile device of claim 24, further comprising a touch sensor coupled to the processor and configured to sense a user touch to a portion of the mobile device,
  wherein the processor is configured with processor-executable instructions to perform operations further comprising:
    sensing locations of the user's fingers on a surface of the mobile device other than the touchscreen display;
    determining a suggested grip location on the touchscreen display for the grip event based upon the sensed location of the user's fingers; and
    displaying the suggested grip location on the touchscreen display.

42. The mobile device of claim 41, wherein:
  the touch sensor is positioned on the back surface of the mobile device; and
  the processor is configured with processor-executable instructions such that sensing locations of the user's fingers on a surface of the mobile device other than the touchscreen display comprises sensing locations of the user's fingers on the back surface of the mobile device.

43. The mobile device of claim 24, wherein the processor is configured with processor-executable instructions to perform operations further comprising:
  analyzing displayed content to determine a recommended grip location on the touchscreen display for the grip event that would result in a least amount of repositioning or distortion of the displayed content; and
  displaying the recommended grip location on the touchscreen display.

44. The mobile device of claim 24, wherein the processor is configured with processor-executable instructions to perform operations further comprising:
  receiving an identifier of a user of the mobile device;
  prompting the user to touch the touchscreen display at a point;
  detecting the user's touch to the touchscreen display;
  determining a size and shape of a grip event area corresponding to a portion of the touchscreen display contacted by the user's touch;
  estimating an area of the display concealed from the user by the user's hand touching the touchscreen display;
  displaying on the touchscreen display an indication of the estimated area concealed by the user's hand;
  receiving user feedback regarding the displayed indication of the estimated area concealed by the user's hand; and
  storing in a database in the memory parameters used for estimating the area concealed by the user's hand based on the determined size and shape of the grip event area.

45. The mobile device of claim 24, wherein the processor is configured with processor-executable instructions such that adjusting the presentation display includes adjusting a margin of the display in a vicinity of the grip event.

46. The mobile device of claim 24, wherein the processor is configured with processor-executable instructions to perform operations further comprising maintaining the adjusted presentation display for a predetermined duration after the user's hand is removed from touching the touchscreen display associated with the grip event.

47. A mobile device, comprising:
a front surface;
a back surface;
a touchscreen display disposed on the front surface;
means for detecting a grip event corresponding to a user touching the touchscreen display;
means for determining displayed content that is concealed by the user's hand based on the grip event; and
means for adjusting the presentation display to inform the user of the concealed displayed content, comprising:
means for determining a plurality of alternative adjustments to the presentation display based upon a layout of the displayed content and the concealed displayed content;
means for sequentially implementing one of the determined plurality of alternative adjustments to the presentation display;
means for detecting a user input indicating selection of one of the determined plurality of alternative adjustments to the presentation display; and
means for implementing the selected one of the determined plurality of alternative adjustments to the presentation display.

48. The mobile device of claim 47, wherein detecting a grip event comprises:
means for determining when a touch event remains at a single location for a threshold duration;
means for determining a location of the grip event on the touchscreen display;
means for determining a shape of the grip event; and
means for determining an orientation of the grip event based on the shape of the grip event.

49. The mobile device of claim 48, wherein means for determining displayed content that is concealed by the user's hand based on the grip event comprises:
means for estimating an area of the touchscreen display covered by the user's hand based on the determined grip event location, shape and orientation; and
means for determining displayed content that is presented within the estimated area of the touchscreen display covered by the user's hand.

50. The mobile device of claim 49, wherein means for estimating an area of the touchscreen display covered by the user's hand based on the determined grip event location, shape and orientation comprises means for applying the determined grip event location, shape and orientation to an algorithm configured to calculate an area of the display based on those parameters.

51. The mobile device of claim 49, wherein means for estimating an area of the touchscreen display covered by the user's hand based on the determined grip event location, shape and orientation comprises means for using the determined grip event location, shape and orientation as search parameters for identifying a best match within a database stored in the mobile device.

52. The mobile device of claim 49, wherein means for determining displayed content that is presented within the estimated area of the touchscreen display covered by the user's hand comprises:
means for segmenting the touchscreen display into a plurality of tiles;
means for correlating the estimated area of the touchscreen display covered by the user's hand with the plurality of tiles to identify those tiles covered by the user's hand; and
means for determining the content displayed in the identified covered tiles.

53. The mobile device of claim 49, further comprising means for positioning display contents close to the estimated area of the touchscreen display covered by the user's hand.

54. The mobile device of claim 49, further comprising means for positioning menu icons close to the estimated area of the touchscreen display covered by the user's hand.

55. The mobile device of claim 48, wherein the threshold duration is no less than 2 seconds.

56. The mobile device of claim 47, wherein means for adjusting the presentation display to inform the user of the concealed displayed content comprises repositioning the concealed displayed content to an uncovered portion of the touchscreen display.

57. The mobile device of claim 56, wherein means for repositioning the concealed displayed content to an uncovered portion of the touchscreen display comprises means for adjusting the presentation display to fit the concealed content into the uncovered portion of the touchscreen display.

58. The mobile device of claim 57, wherein means for adjusting the presentation display to fit the concealed content into the uncovered portion of the touchscreen display comprises means for adjusting the presentation display to fit the concealed content into the uncovered portion of the touchscreen display so that text is not presented in a font size less than a predefined minimum.

59. The mobile device of claim 56, wherein means for repositioning the concealed displayed content to an uncovered portion of the touchscreen display comprises means for distorting the presentation display so that the concealed content appears with the uncovered portion of the touchscreen display.

60. The mobile device of claim 47, wherein means for adjusting the presentation display to inform the user of the concealed displayed content comprises means for alerting the user to concealed displayed content that has changed.

61. The mobile device of claim 60, wherein means for alerting the user to concealed displayed content that has changed comprises means for displaying an indication in the vicinity of the concealed area.

62. The mobile device of claim 47, further comprising means for positioning menu icons on the display away from a location of the grip event.

63. The mobile device of claim 47, further comprising:
means for identifying a user of the mobile device;
means for recalling a usual grip event location from a database on the mobile device; and
means for displaying the usual grip event location on the touchscreen display.

64. The mobile device of claim 47, further comprising:
means for sensing locations of the user's fingers on a surface of the mobile device other than the touchscreen display;
means for determining a suggested grip location on the touchscreen display for the grip event based upon the sensed location of the user's fingers; and
means for displaying the suggested grip location on the touchscreen display.

65. The mobile device of claim 64, wherein means for sensing locations of the user's fingers on a surface of the mobile device other than the touchscreen display comprises means for sensing locations of the user's fingers on the back surface of the mobile device.

66. The mobile device of claim 47, further comprising:
means for analyzing displayed content to determine a recommended grip location on the touchscreen display for gripping the mobile device that would result in a least amount of repositioning or distortion of the displayed content; and
means for displaying the recommended grip location on the touchscreen display.

67. The mobile device of claim 47, further comprising:
means for receiving an identifier of a user of the mobile device;
means for prompting the user to touch the touchscreen display at a point;
means for detecting the user's touch to the touchscreen display;
means for determining a size and shape of a grip event area corresponding to a portion of the touchscreen display contacted by the user's touch;
means for estimating an area of the display concealed from the user by the user's hand touching the touchscreen display;
means for displaying on the touchscreen display an indication of the estimated area concealed by the user's hand;
means for receiving user feedback regarding the displayed indication of the estimated area concealed by the user's hand; and
means for storing in a database on the mobile device parameters used for estimating the area concealed by the user's hand based on the determined size and shape of the grip event area.

68. The mobile device of claim 47, wherein the means for adjusting the presentation display comprises a means for adjusting a margin of the display in a vicinity of the grip event.

69. The mobile device of claim 47, further comprising means for maintaining the adjusted display for a predetermined duration after the user's hand is removed from touching the touchscreen display associated with the grip event.

70. A non-transitory processor-readable storage medium having stored thereon processor-executable instructions configured to cause a processor of a mobile device to perform operations, comprising:
detecting a grip event corresponding to a user touching the touchscreen display;
determining displayed content that is concealed by the user's hand based on the grip event; and
adjusting the presentation display to inform the user of the concealed displayed content by:
determining a plurality of alternative adjustments to the presentation display based upon a layout of the displayed content and the concealed displayed content;
sequentially implementing one of the determined plurality of alternative adjustments to the presentation display;
detecting a user input indicating selection of one of the determined plurality of alternative adjustments to the presentation display; and
implementing the selected one of the determined plurality of alternative adjustments to the presentation display.

71. The non-transitory processor-readable storage medium of claim 70, wherein the stored processor-executable instructions are configured such that detecting a grip event comprises:
determining when a touch event remains at a single location for a threshold duration;
determining a location of the grip event on the touchscreen display;
determining a shape of the grip event; and
determining an orientation of the grip event based on the shape of the grip event.

72. The non-transitory processor-readable storage medium of claim 71, wherein the stored processor-executable instructions are configured such that determining displayed content that is concealed by the user's hand based on the grip event comprises:
estimating an area of the touchscreen display covered by the user's hand based on the determined grip event location, shape and orientation; and
determining displayed content that is presented within the estimated area of the touchscreen display covered by the user's hand.

73. The non-transitory processor-readable storage medium of claim 72, wherein the stored processor-executable instructions are configured such that estimating an area of the touchscreen display covered by the user's hand based on the determined grip event location, shape and orientation comprises applying the determined grip event location, shape and orientation to an algorithm configured to calculate an area of the display based on those parameters.

74. The non-transitory processor-readable storage medium of claim 72, wherein the stored processor-executable instructions are configured such that estimating an area of the touchscreen display covered by the user's hand based on the determined grip event location, shape and orientation comprises using the determined grip event location, shape and orientation as search parameters for identifying a best match within a database stored in the mobile device.

75. The non-transitory processor-readable storage medium of claim 72, wherein the stored processor-executable instructions are configured such that determining displayed content that is presented within the estimated area of the touchscreen display covered by the user's hand comprises:
segmenting the touchscreen display into a plurality of tiles;
correlating the estimated area of the touchscreen display covered by the user's hand with the plurality of tiles to identify those tiles covered by the user's hand; and
determining the content displayed in the identified covered tiles.

76. The non-transitory processor-readable storage medium of claim 72, wherein the stored processor-executable instructions are configured to cause a processor of a mobile device to perform operations further comprising positioning display contents close to the estimated area of the touchscreen display covered by the user's hand.

77. The non-transitory processor-readable storage medium of claim 72, wherein the stored processor-executable instructions are configured to cause a processor of a mobile device to perform operations further comprising positioning menu icons close to the estimated area of the touchscreen display covered by the user's hand.

78. The non-transitory processor-readable storage medium of claim 71, wherein the stored processor-executable instructions are configured such that the threshold duration is no less than 2 seconds.

79. The non-transitory processor-readable storage medium of claim 70, wherein the stored processor-executable instructions are configured such that adjusting the presentation display to inform the user of the concealed displayed content comprises repositioning the concealed displayed content to an uncovered portion of the touchscreen display.

80. The non-transitory processor-readable storage medium of claim 79, wherein the stored processor-executable instructions are configured such that repositioning the concealed displayed content to an uncovered portion of the touchscreen display comprises adjusting the presentation display to fit the concealed content into the uncovered portion of the touchscreen display.

81. The non-transitory processor-readable storage medium of claim 80, wherein the stored processor-executable instructions are configured such that adjusting the presentation display to fit the concealed content into the uncovered portion of the touchscreen display is limited so that text is not presented in a font size less than a predefined minimum.

82. The non-transitory processor-readable storage medium of claim 79, wherein the stored processor-executable instructions are configured such that repositioning the concealed displayed content to an uncovered portion of the touchscreen display comprises distorting the presentation display so that the concealed content appears with the uncovered portion of the touchscreen display.

83. The non-transitory processor-readable storage medium of claim 70, wherein the stored processor-executable instructions are configured such that adjusting the presentation display to inform the user of the concealed displayed content comprises alerting the user to concealed displayed content that has changed.

84. The non-transitory processor-readable storage medium of claim 83, wherein the stored processor-executable instructions are configured such that alerting the user to concealed displayed content that has changed comprises displaying an indication in the vicinity of the concealed area.

85. The non-transitory processor-readable storage medium of claim 70, wherein the stored processor-executable instructions are configured to cause a processor of a mobile device to perform operations further comprising positioning menu icons on the display away from a location of the grip event.

86. The non-transitory processor-readable storage medium of claim 70, wherein the stored processor-executable instructions are configured to cause a processor of a mobile device to perform operations further comprising:
   identifying a user of the mobile device;
   recalling a usual grip event location from a database stored in the memory; and
   displaying the usual grip event location on the touchscreen display.

87. The non-transitory processor-readable storage medium of claim 70, wherein the stored processor-executable instructions are configured to cause a processor of a mobile device to perform operations further comprising:
   determining locations of the user's fingers from one or more sensors positioned on a surface of the mobile device other than the touchscreen display;
   determining a suggested grip location on the touchscreen display for the grip event based upon the sensed location of the user's fingers; and
   displaying the suggested grip location on the touchscreen display.

88. The non-transitory processor-readable storage medium of claim 87, wherein the stored processor-executable instructions are configured to cause a processor of a mobile device such that sensing locations of the user's fingers on a surface of the mobile device other than the touchscreen display comprises sensing locations of the user's fingers on the back surface of the mobile device.

89. The non-transitory processor-readable storage medium of claim 70, wherein the stored processor-executable instructions are configured to cause a processor of a mobile device to perform operations further comprising:
   analyzing displayed content to determine a recommended grip location on the touchscreen display for gripping the mobile device that would result in a least amount of repositioning or distortion of the displayed content; and
   displaying the recommended grip location on the touchscreen display.

90. The non-transitory processor-readable storage medium of claim 70, wherein the stored processor-executable instructions are configured to cause a processor of a mobile device to perform operations further comprising:
   receiving an identifier of a user of the mobile device;
   prompting the user to touch the touchscreen display at a point;
   detecting the user's touch to the touchscreen display;
   determining a size and shape of a grip event area corresponding to a portion of the touchscreen display contacted by the user's touch;
   estimating an area of the display concealed from the user by the user's hand touching the touchscreen display;
   displaying on the touchscreen display an indication of the estimated area concealed by the user's hand;
   receiving user feedback regarding the displayed indication of the estimated area concealed by the user's hand; and
   storing in a database in the memory parameters used for estimating the area concealed by the user's hand based on the determined size and shape of the grip event area.

91. The non-transitory processor-readable storage medium of claim 70, wherein the stored processor-executable instructions are configured such that adjusting the presentation display includes adjusting a margin of the display in a vicinity of the grip event.

92. The non-transitory processor-readable storage medium of claim 70, wherein the stored processor-executable instructions are configured to cause a processor of a mobile device to perform operations further comprising maintaining the adjusted presentation display for a predetermined duration after the user's hand is removed from touching the touchscreen display associated with the grip event.

* * * * *